(12) United States Patent
Short et al.

(10) Patent No.: US 12,055,259 B2
(45) Date of Patent: Aug. 6, 2024

(54) CARRIER ASSEMBLY SYSTEMS, METHODS, AND APPARATUS FOR REPAIRING PIPES IN SITU

(71) Applicant: Ballard Marine Construction, LLC, Washougal, WA (US)

(72) Inventors: Matt S. Short, Seattle, WA (US); Matthew R. Greger, Seattle, WA (US); Arild Ollestad, Sandnes (NO); Shawn Drobny, Lincoln, CA (US); Jeff A. Spoerl, Oxford, MI (US); Anthony C. Raphael, Jr., Traverse City, MI (US); Jimmy G. Johnson, Jr., Pascagoula, MS (US); Mario Rivas, Homestead, FL (US); Chris M. Bauer, Neenah, WI (US); Jesse B. Hutton, Camas, WA (US); Lewis H. Rounds, Washougal, WA (US); John Schue, Camas, WA (US); Shea M. Altadonna, Windsor (CA); Caleb M. Stanley, Detroit, MI (US); Jayme K. Newbigging, Washougal, WA (US); George Williamson, Bodega Bay, CA (US)

(73) Assignee: Ballard Marine Construction, LLC, Washougal, WA (US)

( * ) Notice: Subject to any disclaimer, the term of this patent is extended or adjusted under 35 U.S.C. 154(b) by 0 days.

(21) Appl. No.: 17/656,400

(22) Filed: Mar. 24, 2022

(65) Prior Publication Data

US 2022/0307643 A1 Sep. 29, 2022

Related U.S. Application Data

(60) Provisional application No. 63/166,855, filed on Mar. 26, 2021.

(51) Int. Cl.
*F16L 55/18* (2006.01)
*F16L 55/163* (2006.01)
(Continued)

(52) U.S. Cl.
CPC .............. *F16L 55/163* (2013.01); *F16L 55/32* (2013.01); *F16L 55/44* (2013.01); *F16L 2101/18* (2013.01); *F16L 2101/60* (2013.01)

(58) Field of Classification Search
CPC ......... F16L 55/163; F16L 55/32; F16L 55/44; F16L 2101/18; F16L 2101/60
(Continued)

(56) References Cited

U.S. PATENT DOCUMENTS

| | | | | |
|---|---|---|---|---|
| 794,635 | A * | 7/1905 | Moir | E21D 9/06 405/141 |
| 2,895,299 | A * | 7/1959 | Washabaugh | E21D 11/08 405/138 |

(Continued)

FOREIGN PATENT DOCUMENTS

| CN | 207864888 U | 9/2018 |
|---|---|---|
| CN | 111219564 A | 6/2020 |

(Continued)

OTHER PUBLICATIONS

International Searching Authority, International Search Report and the Written Opinion, dated Jul. 14, 2022, 64 pages.
(Continued)

*Primary Examiner* — James F Hook
(74) *Attorney, Agent, or Firm* — Schacht Law Office, Inc.; Michael R. Schacht

(57) ABSTRACT

A carrier assembly (10) engages a pipe ring for installing the pipe ring in an existing pipeline to repair the existing pipeline. The carrier assembly (10) has a chassis assembly (12), a support arm assembly (14) and a drive system (16).
(Continued)

The chassis assembly (12) has the support arm assembly (14) operably connected thereto. The drive system (14) is operably connected to the chassis assembly (12) wherein the chassis assembly (12) is configured to move along the pipeline. The support arm assembly (14) is configured to engage the pipe ring wherein the support arm assembly (14) is moveable relative to the chassis assembly (12) to displace the pipe ring relative to the chassis assembly (12) for installation in the existing pipeline.

16 Claims, 52 Drawing Sheets

(51) Int. Cl.
  *F16L 55/32* (2006.01)
  *F16L 55/44* (2006.01)
  *F16L 101/18* (2006.01)
  *F16L 101/60* (2006.01)

(58) Field of Classification Search
  USPC .................. 138/97, 98; 405/151, 184.2
  See application file for complete search history.

(56) References Cited

U.S. PATENT DOCUMENTS

| | | | |
|---|---|---|---|
| 3,267,967 A | | 8/1966 | Guthrie |
| 3,597,929 A | * | 8/1971 | Bodine ................ E21B 7/24 173/52 |
| 4,393,899 A | * | 7/1983 | Tsuji ................ G21C 17/00 976/DIG. 176 |
| 4,724,108 A | | 2/1988 | Jurgenlohmann et al. |
| 4,982,490 A | | 1/1991 | Franklin |
| 5,285,817 A | | 2/1994 | Sigel |
| 5,382,114 A | * | 1/1995 | Trevisani ............... E21C 25/30 405/138 |
| 5,577,864 A | * | 11/1996 | Wood .................... F16L 55/179 405/184.2 |
| 5,971,032 A | | 10/1999 | Ward |
| 6,240,965 B1 | | 6/2001 | Maimets |
| 2007/0220733 A1 | * | 9/2007 | Crocker ............... F16L 55/179 29/522.1 |
| 2009/0297275 A1 | | 12/2009 | Davis |

FOREIGN PATENT DOCUMENTS

| | | |
|---|---|---|
| DE | 4133431 C2 | 10/1993 |
| DE | 9407896 U1 | 9/1994 |
| DE | 19511295 A1 | 10/1995 |
| DE | 4418331 A1 | 11/1995 |
| DE | 19513965 C1 | 7/1997 |
| EP | 0260220 A1 | 3/1988 |
| EP | 0683347 A3 | 11/1996 |
| EP | 1070905 B1 | 10/2004 |
| KR | 101442003 B1 | 9/2014 |

OTHER PUBLICATIONS

TECHNIGEEK, Sewers inspection robot, YOUTUBE.com, TECHNIGEEK, https://www.youtube.com/watch?v=3bLrMMhcJtU Aug. 7, 2015.

* cited by examiner

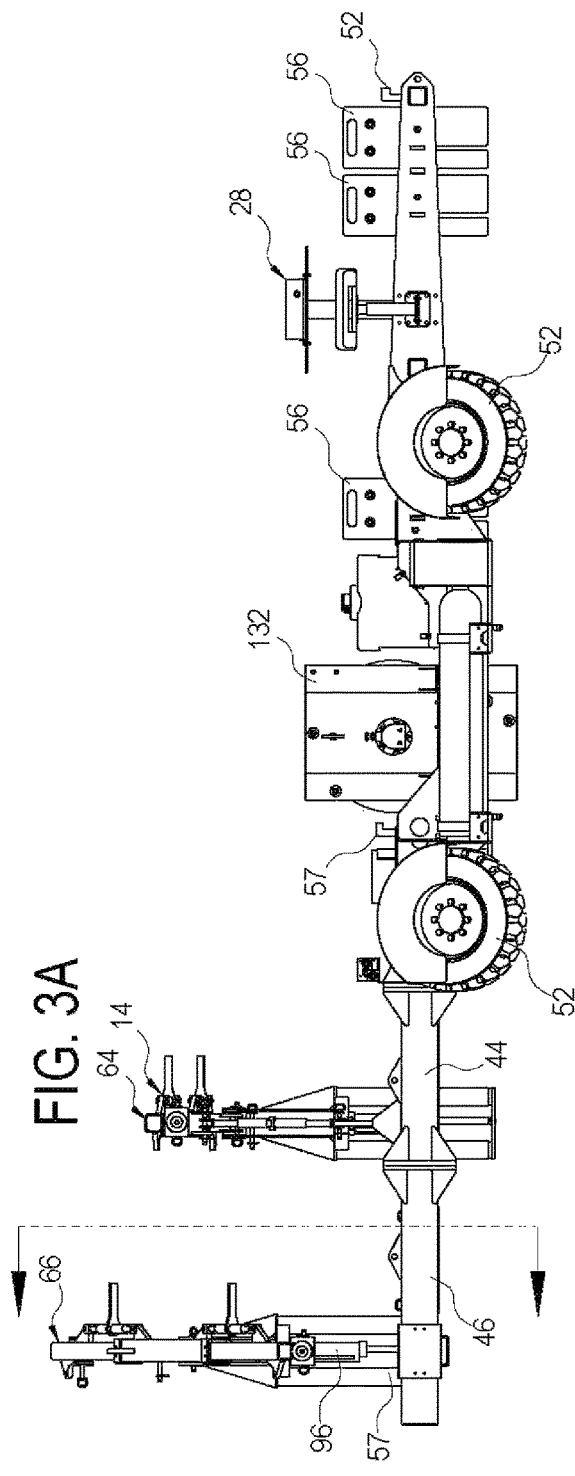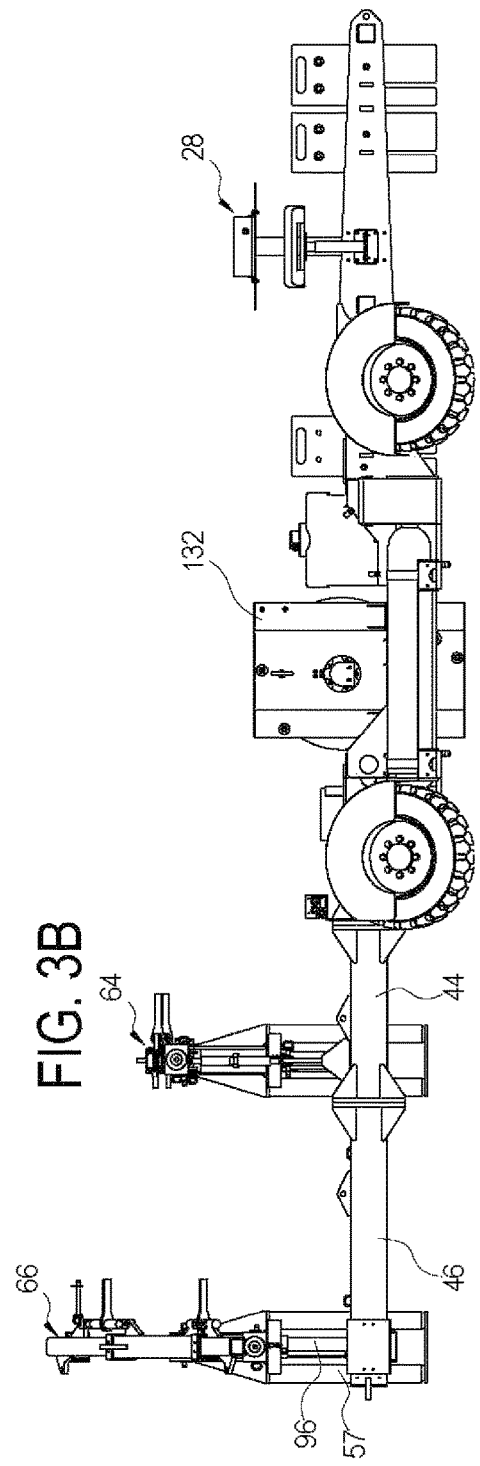

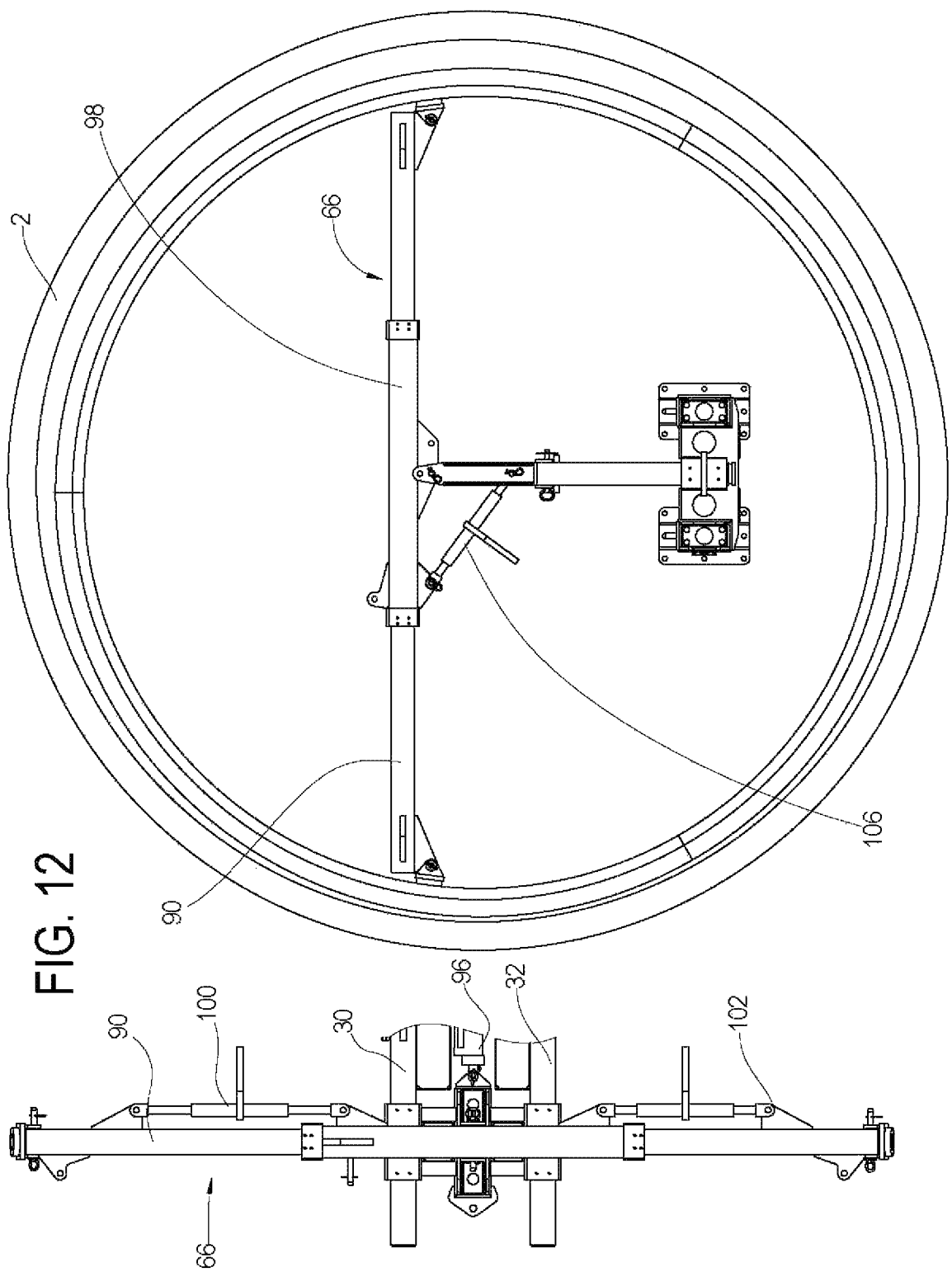

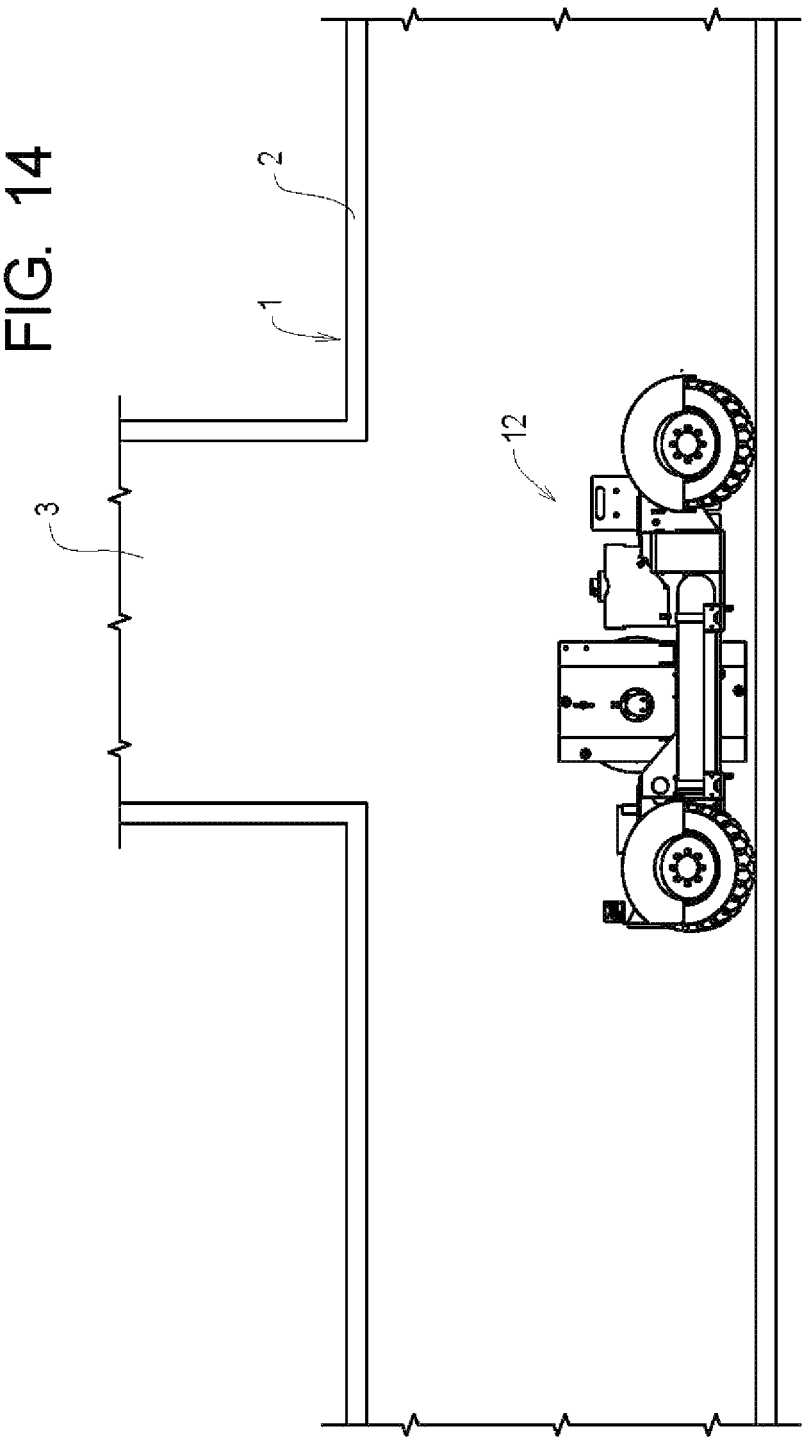

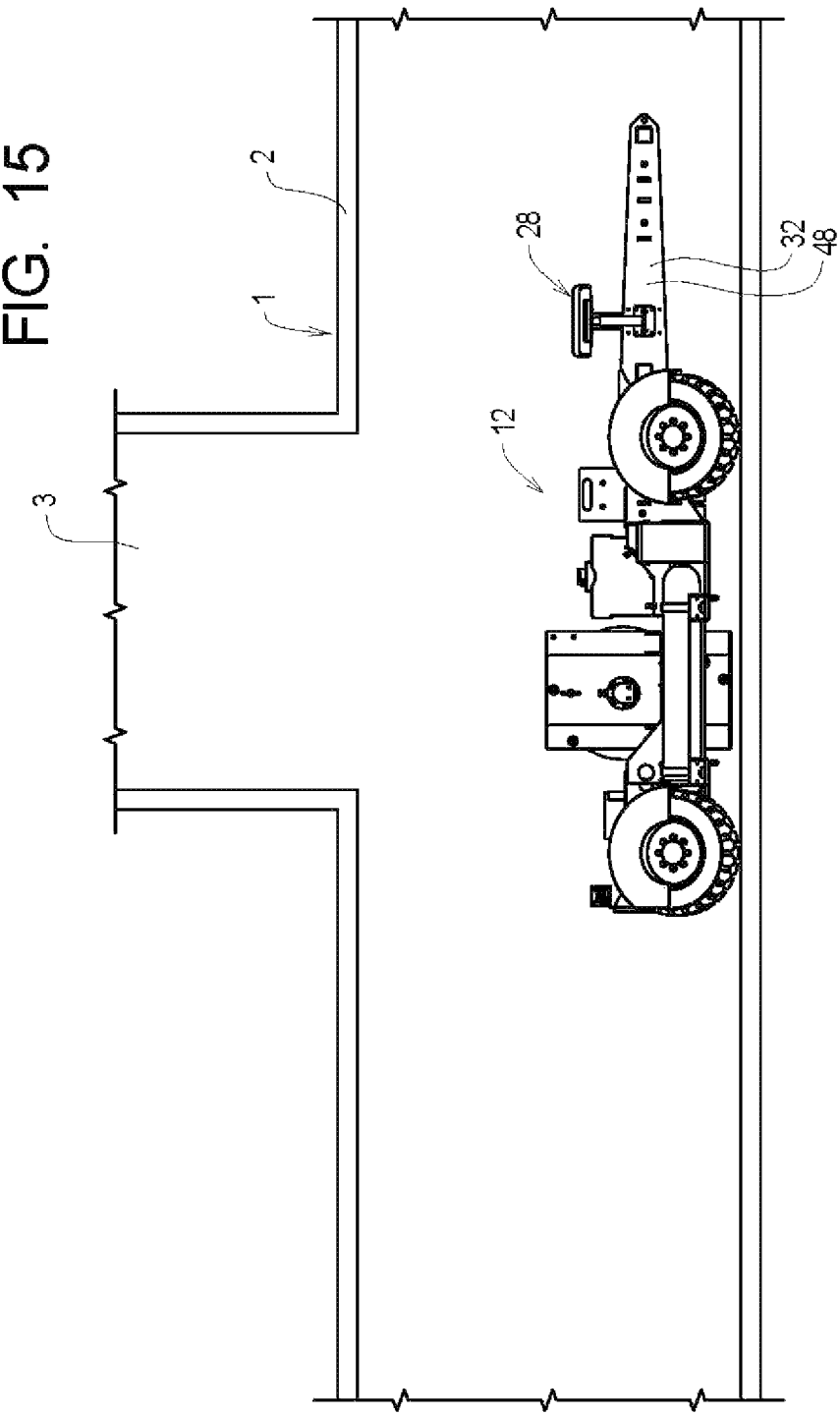

FIG. 24
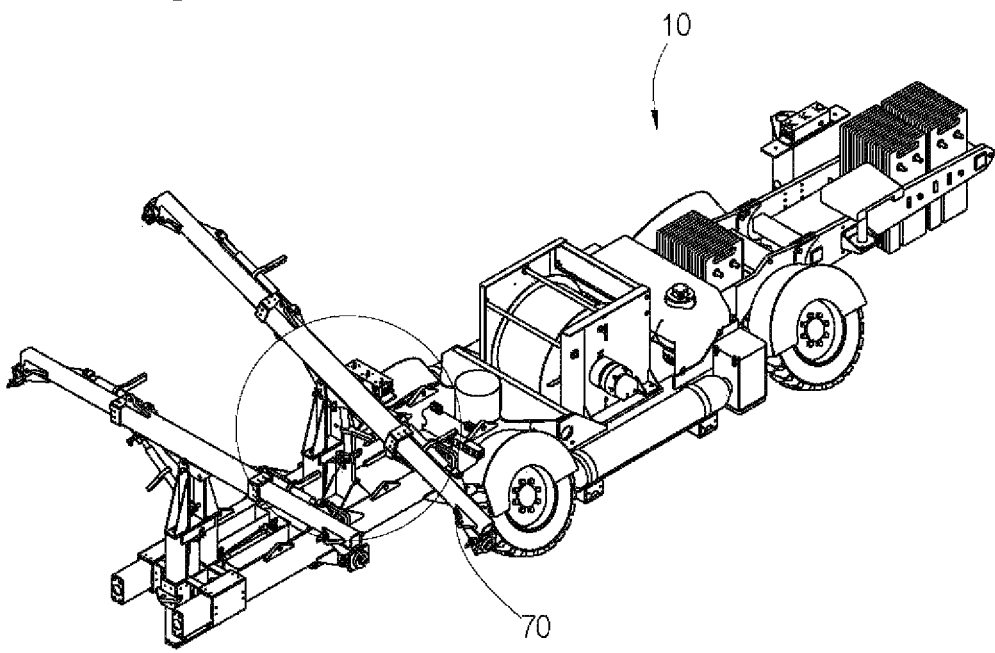
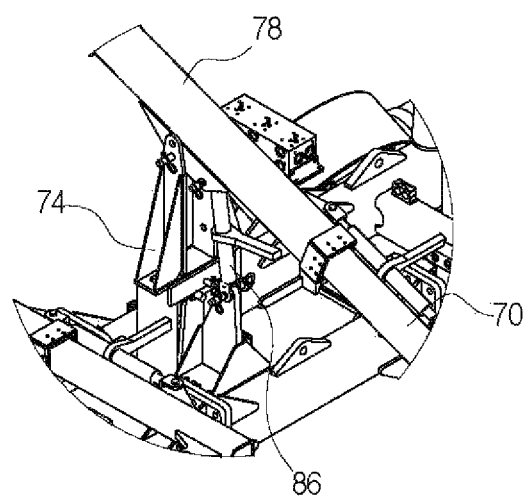

FIG. 25
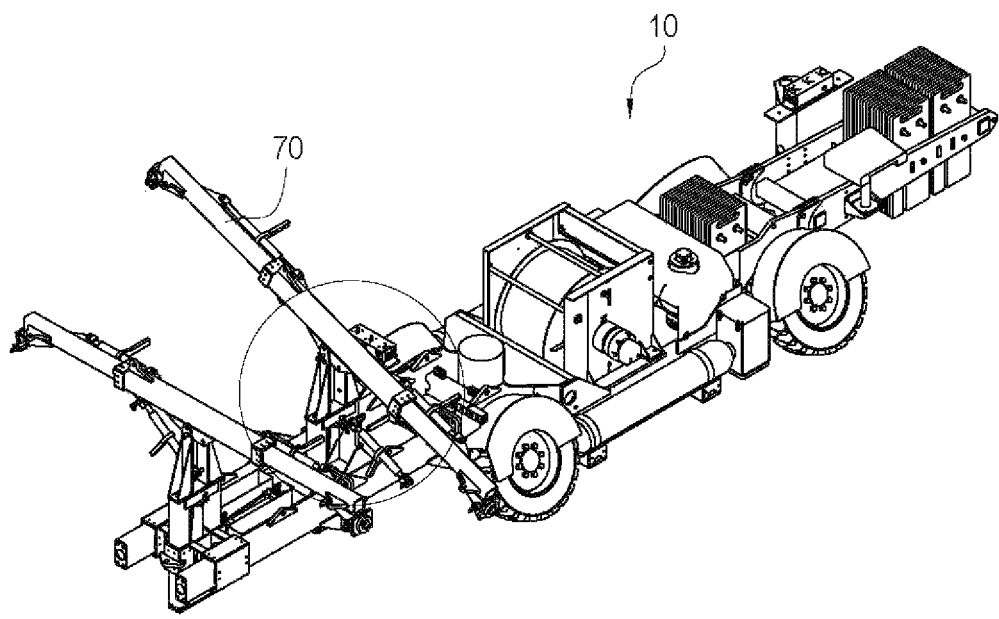
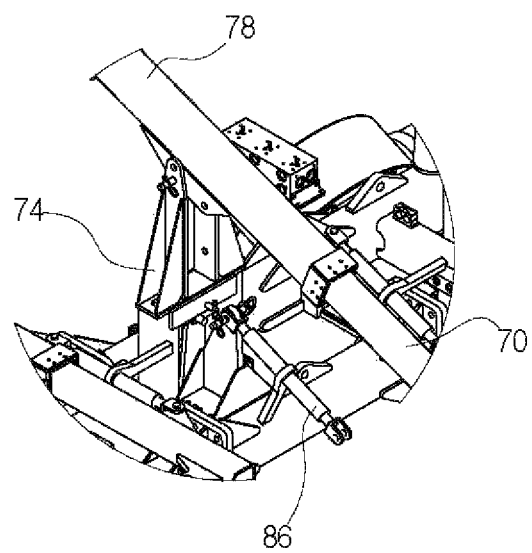

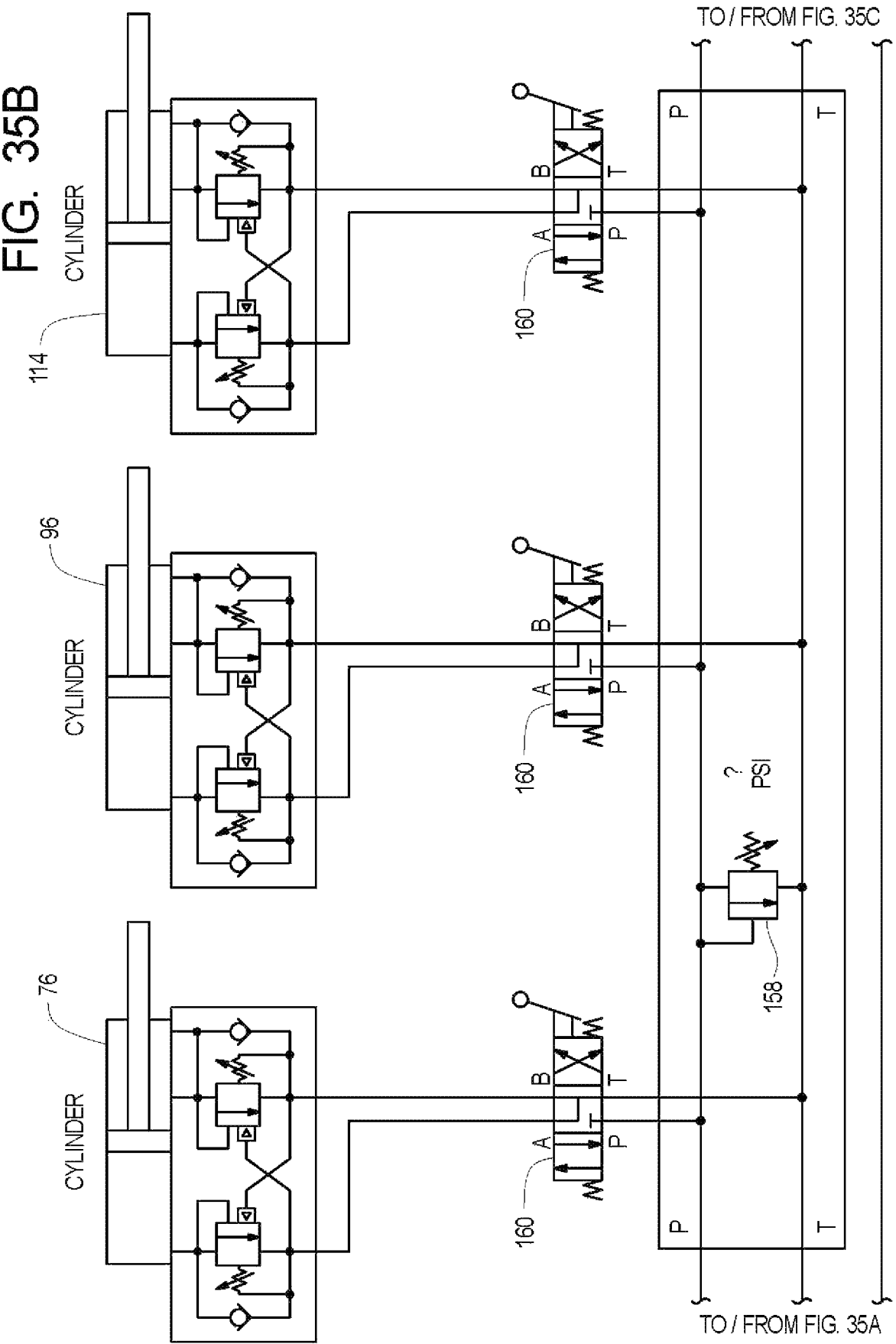

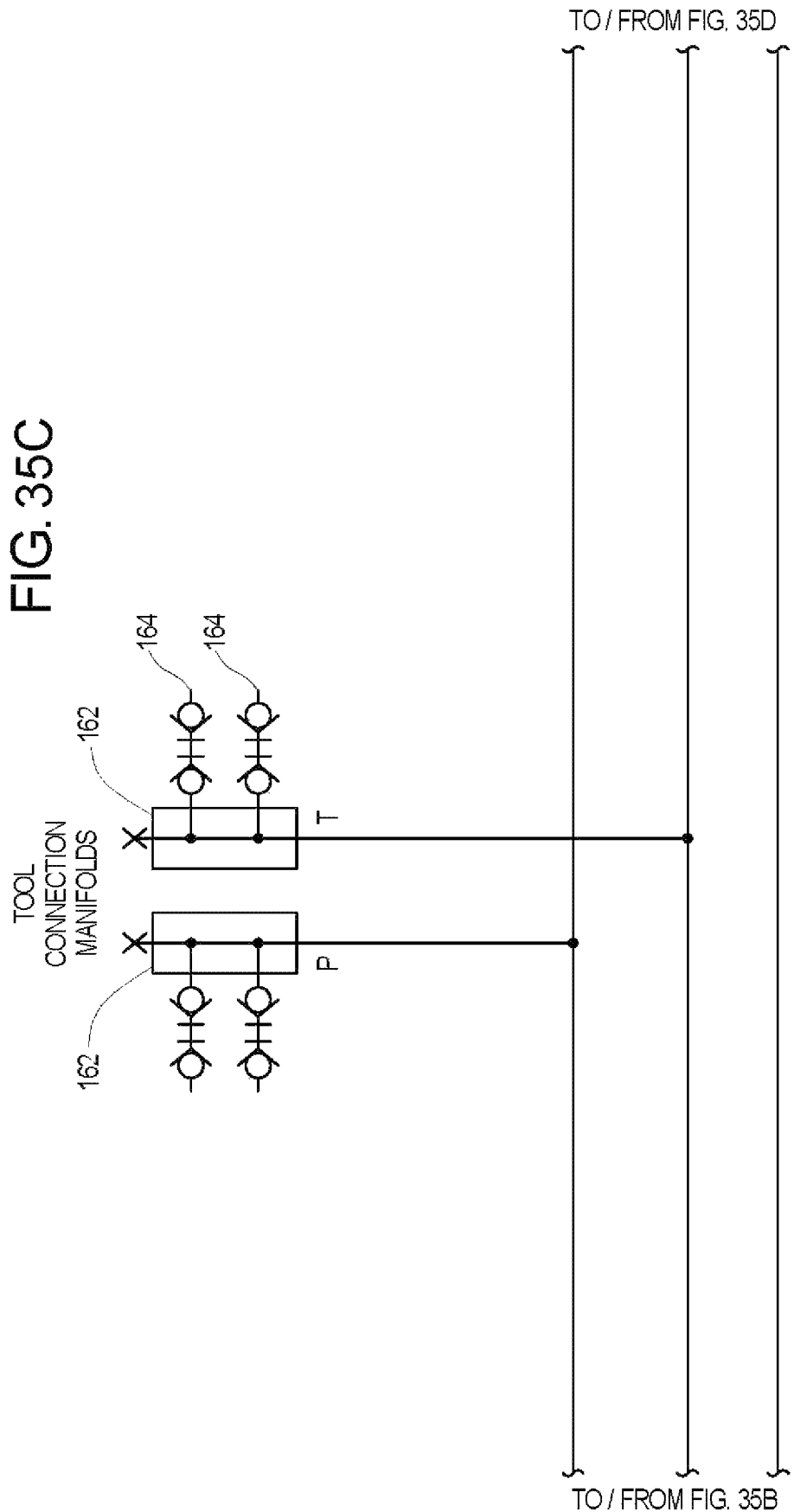

CARRIER ASSEMBLY SYSTEMS, METHODS, AND APPARATUS FOR REPAIRING PIPES IN SITU

CROSS-REFERENCE TO RELATED APPLICATIONS

This application, U.S. patent application Ser. No. 17/656,400 filed Mar. 24, 2022, claims the benefit of U.S. Provisional Patent Application Ser. No. 63/166,855 filed on Mar. 26, 2021, the contents of which are incorporated by reference and made a part hereof.

TECHNICAL FIELD

The present invention relates to pipes in situ and, in particular, to carrier assembly systems, methods, and apparatus for transporting and assembling materials within pipes for pipe repair.

BACKGROUND

Much modern infrastructure was installed many years ago and is now failing. Water supply systems are one type of infrastructure experiencing significant degradation and deterioration over time. The water supply systems have water pipes/tunnels that are installed underground. Once the water pipes are installed underground, there is limited ability to closely monitor the integrity of the system. For example, there is little opportunity to conduct regular and extensive visual inspections of the water pipes. Shifts in the ground beneath the surface can cause the water pipes to shift wherein the pipes, or connections between pipes, deteriorate and develop leaks over time. Leaks are undesirable as ground contaminants can enter into the pipe to contaminate the water supply. Leaks also result in the loss of water from the system. The pipes are also subjected to water pressure that can also contribute to degradation. Because of the underground installation, it is difficult, cumbersome and expensive to complete repair of pipes. Having to take significant portions of the water supply system offline adds to the overall difficulties and challenges in completing repairs. The carrier assembly of the present invention is of particular significance when used to repair the underground water pipes/tunnels. The carrier assembly of the present invention, however, may be used in environments other than underground water pipes.

Other types of carrier assemblies exist in the prior art to carry and manipulate large objects such as pipes or pipe segments. While such carrier assemblies according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

The present invention may be embodied as an underwater carrier assembly for carrying pipe segments comprising a main body, at least one pipe support arm, and a drive system. The main body supports wheels. The at least one pipe support arm is supported by the main body. The drive system displaces the at least one pipe support arm relative to the main body. The at least one pipe support arm supports at least one pipe segment. The drive system displaces the at least one pipe support arm to displace the at least one pipe segment relative to the main body. Other structures may provide for manual displacement of the support arm with respect to the main body. While the carrier assembly may be used in an underwater environment in an exemplary embodiment, it is understood the carrier assembly can also be employed in other types of environments.

According to another aspect of the invention, a carrier assembly engages a pipe ring for installing the pipe ring in an existing pipeline to repair the existing pipeline. The carrier assembly has a chassis assembly and at least one support arm assembly operably connected to the chassis assembly. A drive system is operably connected to the chassis assembly wherein the chassis assembly is configured to move along the pipeline. The at least one support arm assembly is configured to engage the pipe ring wherein the at least one support arm assembly is moveable relative to the chassis assembly to displace the pipe ring relative to the chassis assembly for installation in the existing pipeline.

Other features and advantages of the invention will be apparent from the following specification taken in conjunction with the following drawings.

DESCRIPTION OF THE DRAWINGS

To understand the present invention, it will now be described by way of example, with reference to the accompanying drawings in which:

FIG. 3A is a side elevation view of the carrier assembly of FIG. 1;

FIG. 3B is a side elevation view of the carrier assembly of FIG. 1;

FIGS. 11 and 12 are an end elevation view of the carrier assembly engaged with a pipe ring and showing lateral movement of the pipe ring and a partial top plan view of a support arm assembly;

FIGS. 14-23 are partial schematic side elevation views showing the carrier assembly of FIG. 1 separated into modules and inserted into an access port of a legacy pipe of a water supply system and connected together;

FIGS. 24-25 are perspective views and partial enlarged views of the carrier assembly of FIG. 1 and showing a ratchet member connected and disconnected from a support arm assembly;

FIGS. 35A-35E are collectively a general hydraulic schematic associated with the drive system of the carrier assembly of the present invention;

DETAILED DESCRIPTION

Figure 1:
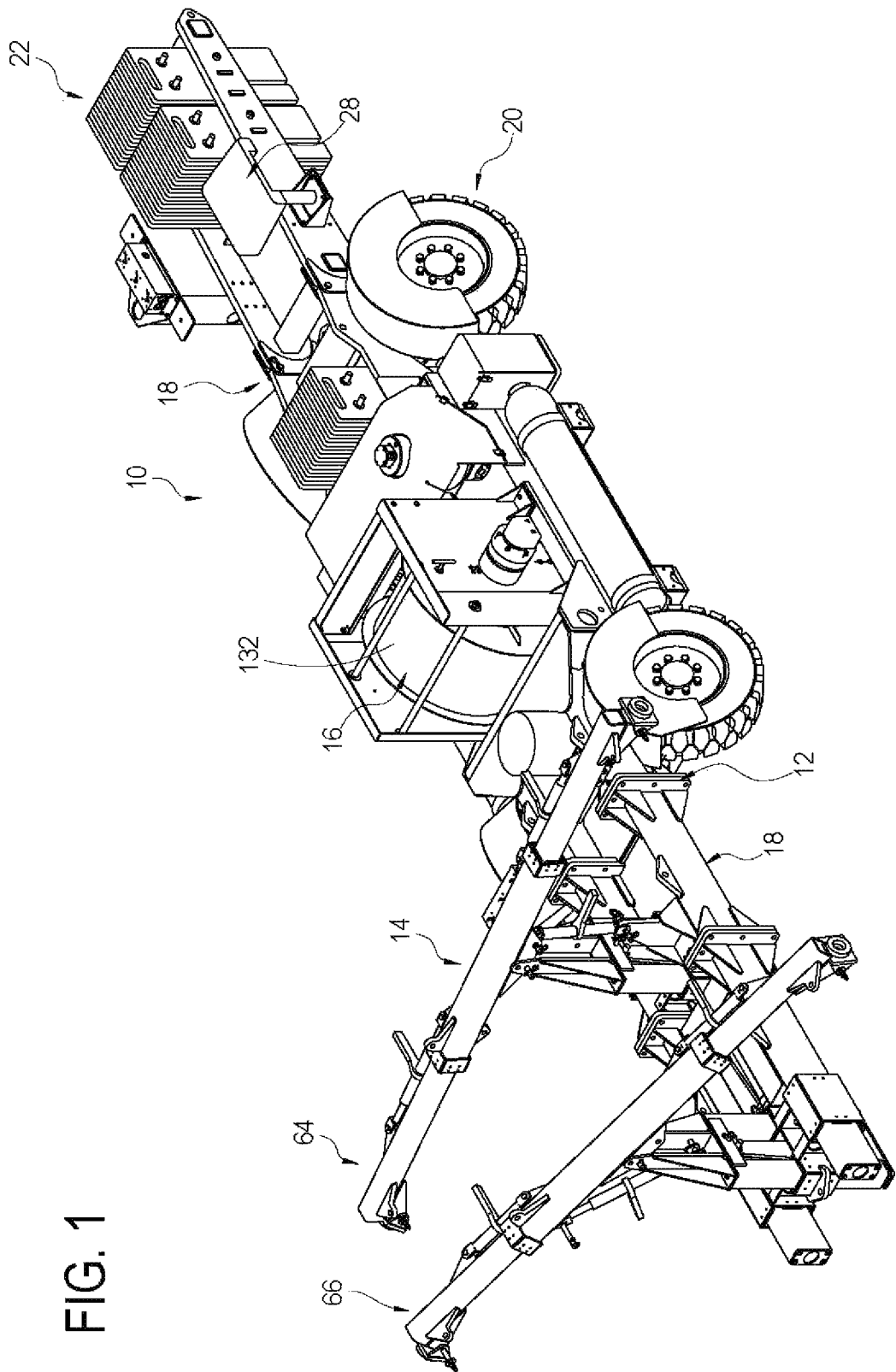
FIG. 1 is a front perspective view of a carrier assembly according to an exemplary embodiment of the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

As discussed, the present invention discloses a carrier assembly capable of transporting, displacing, manipulating and otherwise installing pipe/tunnel segments in the repair of existing pipe sections, or legacy pipe sections, of a water supply system.

As discussed above, a water supply system is the typical environment that the carrier assembly of the present invention is utilized. It is understood, however, that the carrier assembly could be used in other environments.

A water supply system may be, for example, a municipal water supply system having various components and structures to deliver, from a water source, potable and treated water to industrial, commercial and residential consumers. The water supply system may include among other things, a pipe network that include water mains, a pumping station(s), a water source or water storage facilities and other accessories such as valves, service lines, meters and fire hydrants etc. It is understood that water treatment systems are typically operably associated with the water supply system.

Pipe networks can take various forms but typically include a main artery, which may commonly be referred to as a water main. Water mains may have large diameters such as large as 12 feet. A pumping station may include a pump or plurality of pumps to draw water from the water storage facility, which may take the form of water tanks, reservoirs or water towers. Other accessories and components are operably incorporated into the water supply system to allow the system to consistently deliver a supply of water as needed by consumers of the system. As discussed above, the water mains of the system may degrade such that leaks develop requiring repair. It is highly expensive, inconvenient or sometimes not feasible to take the water supply system offline. As explained herein, the carrier assembly of the present invention allows for the repair of the water supply system without taking the system offline.

As shown in FIGS. 1-6, a carrier assembly is disclosed and generally designated with the reference numeral 10. The carrier assembly 10 generally includes a chassis assembly 12 or main body 12, a support arm assembly 14 and a drive system 16. The structure of the carrier assembly 10 will be described followed by a description of an operation of the carrier assembly in a water supply system.

In an exemplary embodiment, the carrier assembly 10 is used in a water supply system while the water supply system remains online and in use. Thus, the carrier assembly 10 is designed to operate in an underwater environment, e.g., submerged in a freshwater environment. Accordingly, the carrier assembly 10 is designed to be positioned in the water main of the water supply system (which may be referred to a legacy pipe), and traverse the water main while preparing, manipulating and installing replacement pipe sections within the water main. Multiple diver operators in a crew are employed to operate the carrier assembly 10 in the underwater environment. While one exemplary embodiment contemplates a freshwater environment, the carrier assembly can also be utilized in a salt water environment such as in the repair of ocean intake pipes/tunnels. The carrier assembly can be utilized in any large diameter pipe or tunnel including a sewer environment. It is further understood, however, that the carrier assembly 10 can also be used in non-underwater environments.

As will be explained in greater detail below, the carrier assembly 10 will have at least the following features. The carrier assembly 10 will have a manual pipe adjustment capability including ratcheting screw jacks for diver control of pipe placement that further includes: side shift, rotation, ovality control, and lift. Hydraulic systems are included for hydraulic lift and forward shift. Hydraulic cylinders are utilized that are capable of assisting diver operators with high load movements. The vertical lift and forward shift features will both have dedicated hydraulic cylinders with manual alternatives. Hydraulic motors will be utilized for transit of the carrier assembly 10. A submerged hydraulic power unit (HPU) is utilized, e.g., 3000 psi, 18 kw submerged HPU with manual controls. The carrier assembly 10 utilizes a submerged cable reel including a single line 1000 ft capacity electrical supply cable/umbilical member. In a further exemplary embodiment, the electrical supply cable/umbilical member is 1,148 ft. The carrier assembly 10 will have electrical safety features such as following IMCA 1045 guidelines for the safe use of electricity underwater (International Marine Contractors Association—Code of Practice For The Safe Use Of Electricity Under Water). The carrier assembly 10 will have the capacity for two 4' 6" length pipe rings formed from a plurality of pipe segments to be described. The carrier assembly 10 will further have front and rear tow points, an emergency air tank and auxiliary power for powering a lighting system. The carrier assembly 10 further has diver tools, which includes a bulkhead with underwater breakable connections for hydraulic hand tools, tool trays and storage space. The carrier assembly 10 further utilizes a counterweight system. In a further embodiment, the counterweight system includes a manually adjustable counterweight. Finally, the carrier assembly 10 may employ a removeable platform for personnel or equipment, a pipe tunnel cleanout attachment, and a dredging attachment.

As the carrier assembly 10 operates in an underwater environment in an exemplary embodiment, all systems on the example underwater carrier assembly 10 are configured to function with the following conditions. The carrier assembly 10 is submerged for up to 6 months at a time with minimal to no component servicing. The water pressure may be 3 Bar. The water flow rate in the water supply system may be up to 4 ft/s (2 ft per second during operation). The water temperature is in the range of 36 to 39° F. The carrier assembly 10 can also be used in water temperatures of 33 to 80° F. The underwater environment is typically a fresh water environment but may be submersible in other fluids with appropriate precautions and/or more frequent servicing.

FIG. 1 depicts a first example underwater pipe carrier assembly 10 configured to assist divers in the placement of segmented stainless steel liners, or pipe rings, for water utilities or other operators of water supply systems. The intent of the system is to repair and improve degrading infrastructure without interrupting utility functions and/or services, wherein the water supply system remains online during repairs. The first example underwater carrier assembly 10 is a pipe carrier system adapted to transport, displace, adjust, and place 9'-3" segmented tunnel liners and/or 11'-3" segmented liners, and also provides diver support with carrying tools, emergency air, and lighting. FIGS. 1-6 illustrates major components of the first example underwater pipe carrier assembly 10 configured to facilitate the repair of extensive cracking and degradation of the tunnels (legacy pipes) adapted to transport water in a water supply system. As will be described in greater detail below, the carrier assembly 10 has a modular design wherein the assembly 10 can be separated into a plurality of component modules. Individual component modules, smaller in size than the overall fully constructed assembly 10, are lowered into an access port into a legacy pipe of a water supply system. The modules are then attached in the legacy pipe water main of the water supply system wherein the carrier assembly 10 is ready to complete necessary repairs of the legacy pipe. It is further understood that the electrical supply cable/umbilical member is operably connected to supply power, video and a computer interface.

As discussed and further shown in FIGS. 1-6, the carrier assembly 10 generally includes the chassis assembly 12 or main body 12, the support arm assembly 14 and the drive system 16. The carrier assembly 10 may generally be considered to have a forklift-style design. Repair pipe segments forming pipe rings will be carried on one end of the machine, which maximizes workspace and minimizes machine complexity. As explained in greater detail below, three pipe segments are connected together to form one replacement pipe ring wherein multiple pipe rings are connected to one another in the water main of the water supply system. A plurality of connected pipe rings is considered to form a tunnel liner in the legacy pipe.

FIGS. 1-6 further disclose the chassis assembly 12. It is understood that the chassis assembly 12 supports the support arm assembly 14 and the drive system 16 as explained in greater detail below. The chassis assembly 12 includes a frame assembly 18, a wheel assembly 20, and a counter weight system 22. The chassis assembly 12 also includes a lighting system 24, a camera system 26 (FIG. 36), operator station 28 and other features to be described.

The frame assembly 18 generally includes a first elongated frame member 30 and a second elongated frame member 32. The elongated frame members 30, 32 are spaced apart and connected by a plurality of cross-members at various locations along the length of the elongated frame members 30, 32. The first elongated frame member 30 has a central segment 34, a first fore segment 36 or front segment 36 and a second fore segment 38 or front segment 38, and an aft segment 40 or rear segment 40. Similarly, the second elongated frame member 32 has a corresponding central segment 42, a first fore segment 44 or first front segment 44 and a second fore segment 46 or second front segment 46, and an aft segment 48 or rear segment 48. Cross-members 50 connect the elongated frame members at locations along the length of the respective elongated frame members. The first front segment extends 36 from the central segment 34 of the first elongated frame member 30. The second front segment 38 extends from the first front segment 36 of the first elongated frame member 30. A free end of the second front segment defines an end of the first elongated frame member 30. The first front segment 44 extends from the central segment 42 of the second elongated frame member 32. The second front segment 46 extends from the first front segment 44 of the second elongated frame member 32, A free end of the second front segment 46 defines an end of the second elongated frame member 32. The rear segment 40 of the first elongated member 30 extends from an opposite end of the central segment 42 and generally opposite to the first and second front segments 36, 38. Similarly, the rear segment 48 of the second elongated member 32 extends from an opposite end of the central segment 42 and generally opposite to the first and second front segments 44, 46. It is understood that the respective segments of the first and second elongated members 30, 32 could be integral to form the elongated frame members 30, 32. In an exemplary embodiment, the respective segments are removably connected such as via bolt fasteners which assists in the modularity features as further described below. For example, as can be appreciated from FIGS. 1-6, the front segments 36, 38, 44, 46 are removably fastened together with bolt fasteners. The elongated frame members 30, 32 can vary in length and also define proximal ends and distal ends. The proximal ends are more proximate to the support arm assembly 14 and the distal ends are more proximate to the rear segments and counterweight system to be described. It is further understood that that the front segments 36, 38, 44, 46 can be considered part of the support arm assembly as described below.

FIGS. 1-6 further disclose the wheel assembly 20. In an exemplary embodiment, the chassis assembly 12 has four wheels 52. Two front wheels 52 are positioned proximate a front of the central segments 34, 42 of the first and second elongated frame members 30, 32, and two rear wheels 52 are positioned proximate a rear of the central segments 34, 42 of the first and second elongated frame members 30, 32. Thus, the wheels 52 moveably support the elongated frame members 30, 32 at proximate a central portion of the chassis assembly 12. Thus, the wheels 52 collectively provide for wheeled conveyance, translation or locomotion of the chassis assembly 12. As further shown in FIGS. 4-5, each wheel 52 is positioned on the chassis assembly 12 in an angled configuration. Thus, the two front wheels 52 are angled towards one another and the two rear wheels 52 are angled towards one another. Accordingly, each wheel 52 is supported on the chassis assembly 12 having a negative camber angle A as shown for example in FIG. 5. The negative camber angle positions treads of the respective wheels on annular surfaces of the legacy pipe of the water supply system as can be appreciated from the Figures. In an exemplary embodiment, the camber angle from a vertical axis is in a range of degrees to suitably engage the inner surfaces of the pipes/tunnels. Other ranges are also possible, which could also depend on the inner diameter of the legacy pipe being repaired. As will be further described below, the wheel assembly 20 is operably connected to the drive system 16 to provide linear movement or locomotion of the carrier assembly 10 along the legacy pipe. In an exemplary embodiment, the wheels 52 are powered hydraulically via the drive system 16.

Figure 4:
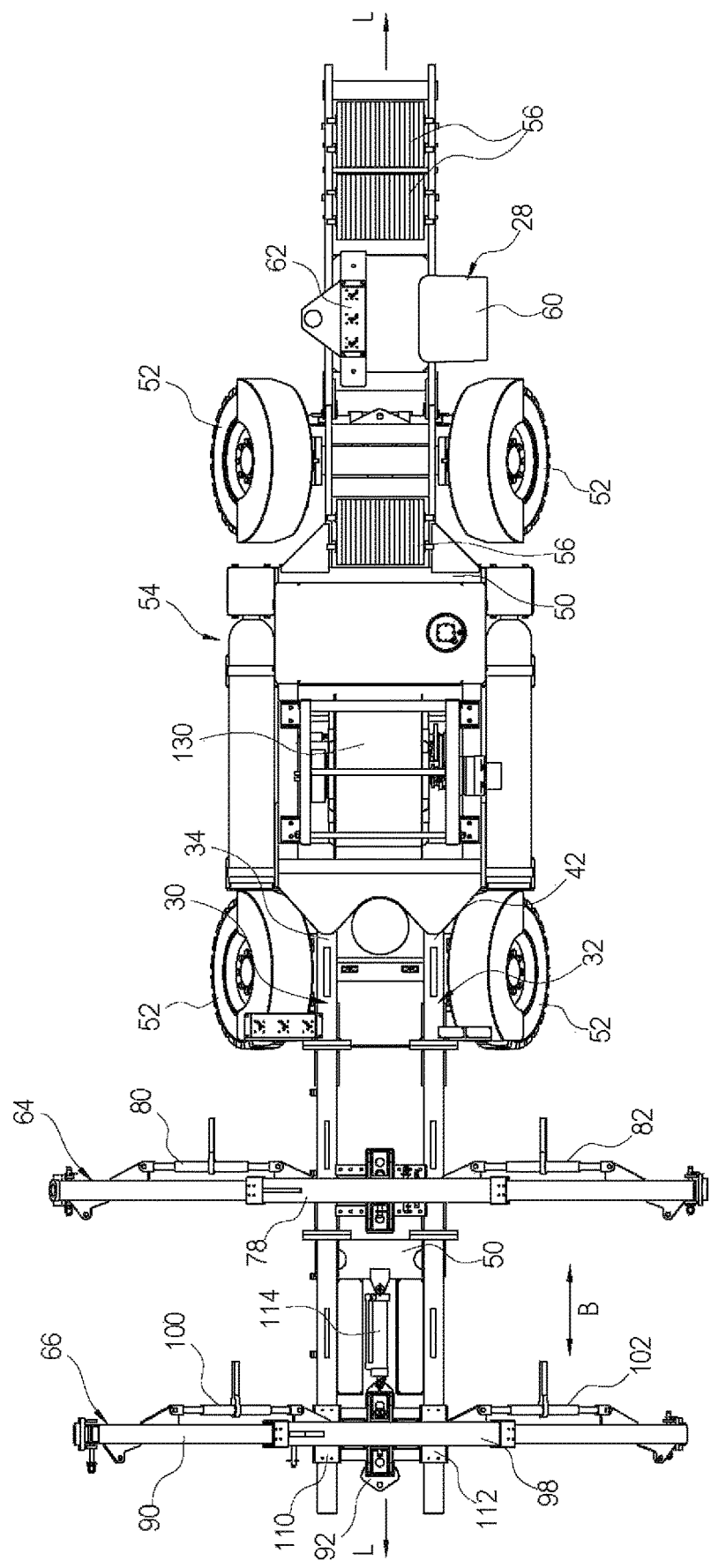
FIG. 4 is a top plan view of the carrier assembly of FIG. 1.
Figure 5:
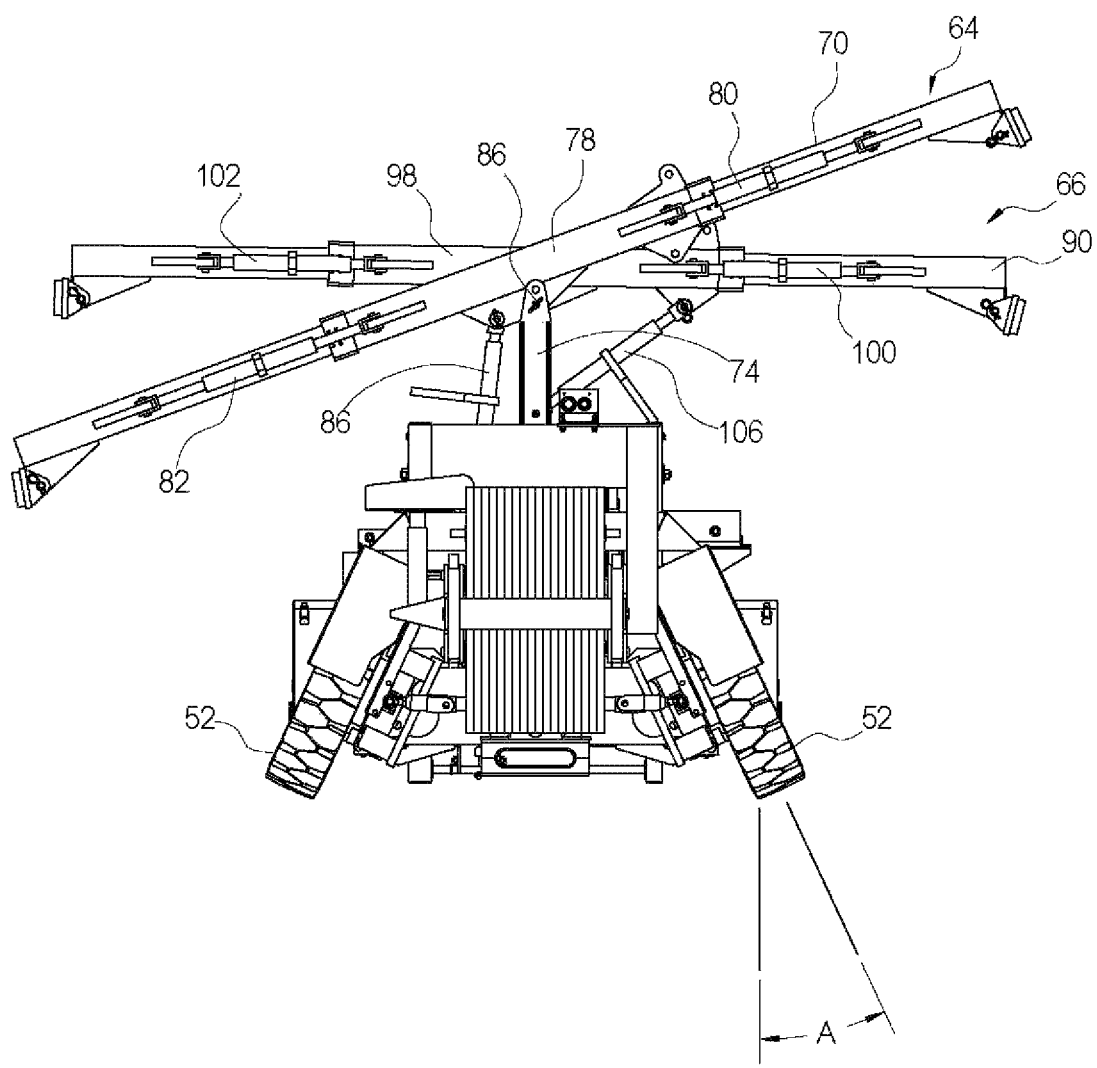
FIG. 5 is a rear end elevation view of the carrier assembly of FIG. 1.
Figure 6:
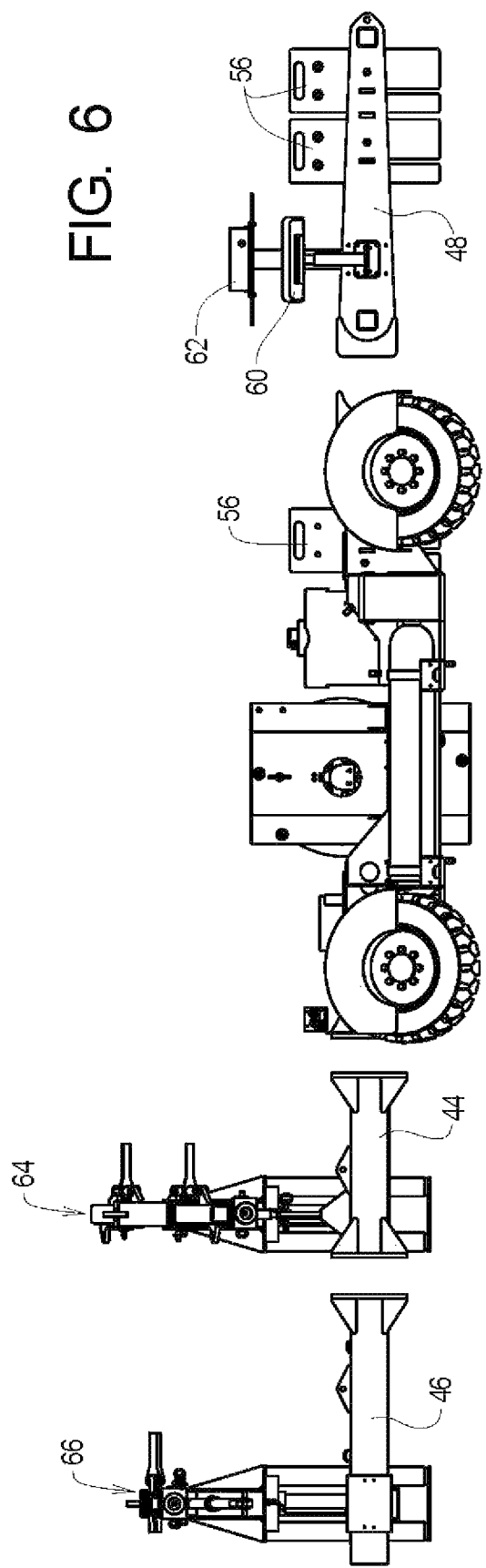
FIG. 6 is a schematic exploded view of the carrier assembly of FIG. 1 showing main components in a modular construction.

As further shown in FIG. 4, the central segments 34, 42 of the elongate members define a central area 54 generally between the central segments and within the wheel assembly. The central 54 may also be considered to be between the front wheels 52 and the rear wheels 52. As described in greater detail below, portions of the drive system 16 are supported by the chassis assembly 12 at the central area 54. It is understood that a central longitudinal axis L is defined through the chassis assembly 12.

FIGS. 1-6 further show the counter weight system 22. The counter weight system 22 is supported on the frame assembly 18 and provides stability to the carrier assembly 10. The counter weight system 22 includes a plurality of weighted members 56. In an exemplary embodiment, three groups of weighted members 56 are positioned on the frame assembly 18. Groups of weighted members 56 can be bolted together in an exemplary embodiment. A first group of interconnected weighted members 56 are connected to and mounted on the elongated frame members 30, 32 proximate the rear wheels. A second group of interconnected weighted members 56 and a third group of interconnected weighted members 56 are connected to and mounted on the rear segments 40, 48 of the elongated frame members 30, 32 and generally proximate a rear end of the elongated frame members 30, 32. The interconnectivity of the weighted members provides for adjustment of the total counter weight as required.

The total dry weight of the burdened pipe carrier assembly 10 will exceed 20,000 lb, Larger segments weigh roughly 2800 lbs. In other embodiments, segments weigh roughly 3000 lbs. for a 12 ft. diameter ring and 4400 lbs. for a bulkhead ring. As the center of gravity (CG) of the segments will be offset well in front of the pipe carrier, the carrier assembly CG will shift significantly during operation. To prevent tipping of the carrier assembly, the counterweight system 22 may possess a large counterweight of more than 4000 lbs. In an exemplary embodiment, the counterweight is three 2000 lb. counterweight members totaling 6000 lbs. When carrying a pair of pipe rings to be described, the location of the center of gravity of the carrier assembly may be approximately located proximate the front wheels of the chassis assembly 12.

The carrier assembly 10 may also have the lighting system 24 (Fla 36). The lighting system of the chassis assembly 12 includes underwater LED lighting technology rated to operate at the suitable underwater environments. The lighting system 24 includes a plurality of lights/lamps 57 strategically positioned at various locations on the frame assembly or other locations associated with the carrier assembly 10. The example lamps are manufactured with aluminum housing, with options for titanium or stainless steel, which is anodized offering proven corrosion resistance. Preferably, an 80° diagonal wide beam angle light is produced, which is ideal for color video inspection of viewing tasks. Black light and leak detection system options are available. The lights may be dimmable and typically eight lights/lamps will be mounted around the carrier assembly 10 to provide low intensity ambient light.

The lighting system provides several features such as: LED technology; available in different lumen outputs up to 5000 lumens; wide 80° diagonal beam angle; increased efficiency approximately 140 lumens/watt; compact and rugged design, 3000 m depth rated; low power requirements; low lifetime cost of ownership; multifunctional lamp; high reliability; ease of integration a converter; and battery storage for running the ambient lights may be included. The battery storage is designed to have the capacity to run half the lights for several hours in case of power loss.

Figure 36:
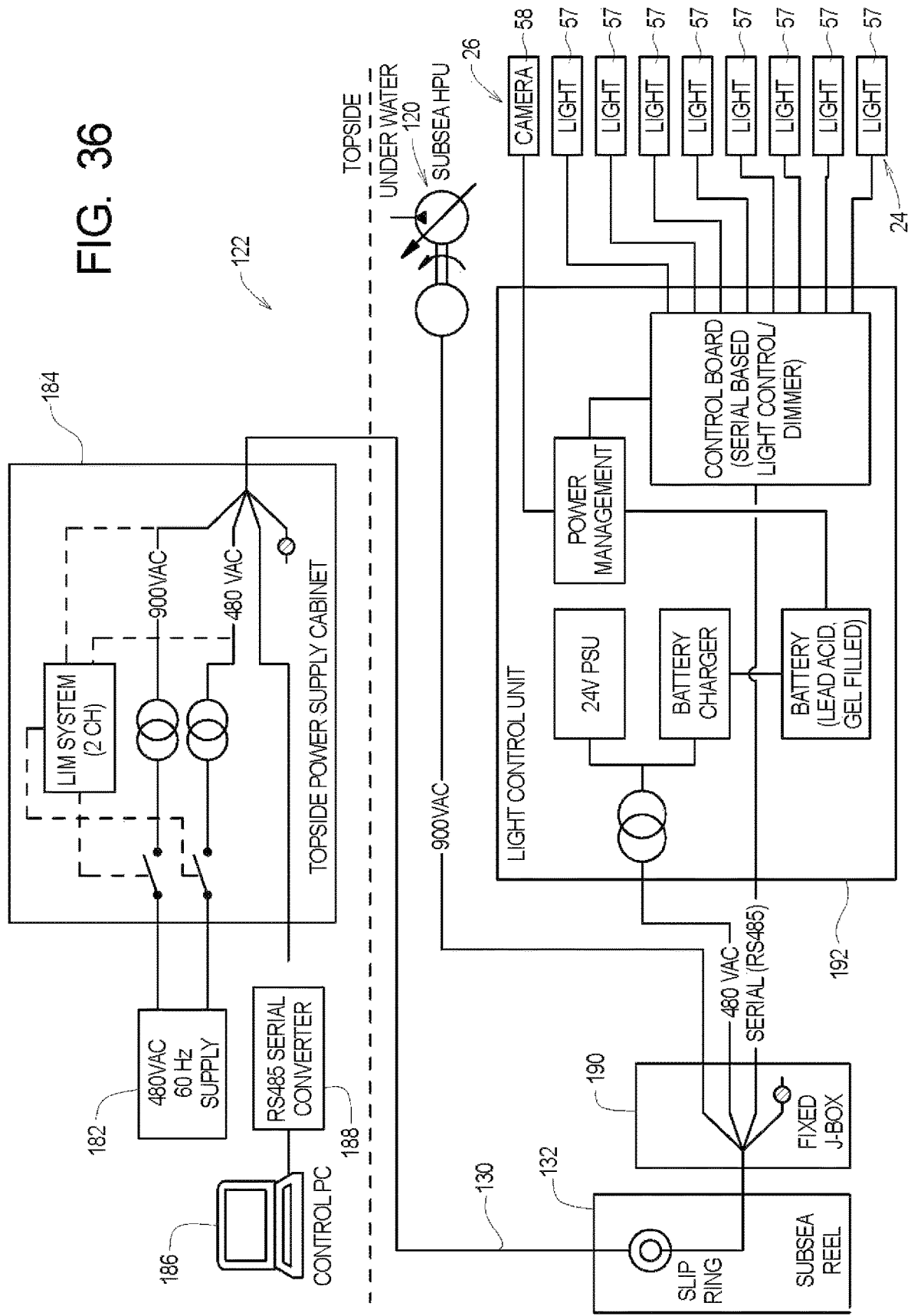
FIG. 36 is a general electrical schematic associated with the drive system of the carrier assembly of the present invention.
Figure 37:
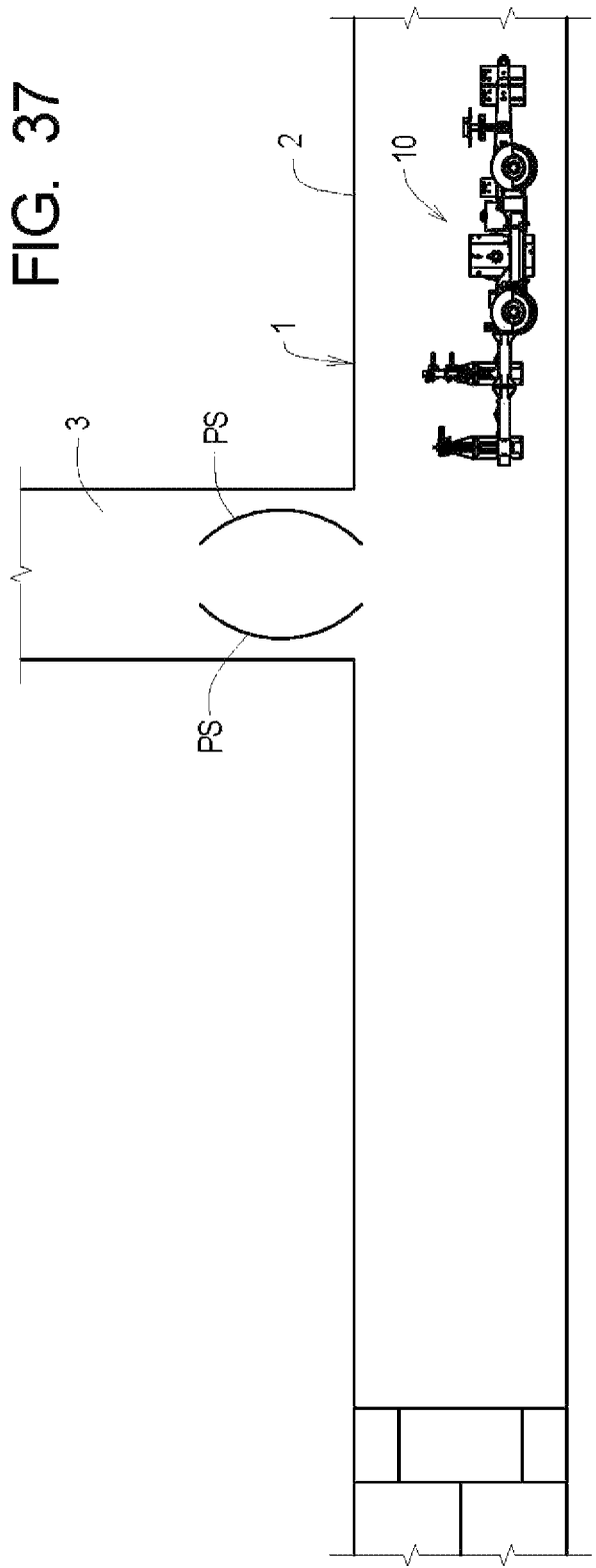
FIGS. 37-47 are partial schematic views showing the carrier assembly of FIG. 1 in operation in displacement, movement and installation of pipe rings in the legacy pipe of a water supply system.

The chassis assembly 12 also has the camera system 26 (FIG. 36). The camera system includes a plurality of cameras 58 supported on the frame assembly 18 such as proximate a front of the chassis assembly 12. The cameras 58 provide views proximate a front of the chassis assembly 12 to assist diver operators in operation of the carrier assembly 10.

The chassis assembly 12 supports the operator station 28 thereon. As shown in FIGS. 3-4, the operator station 28 is positioned proximate a rear of the chassis assembly 12 on the rear segments of the elongated frame members. The operator station includes a seat member 60 supported on the second elongated frame member 32. It is understood that the operator station 28 may include a standing platform for a diver operator suitably attached to the chassis assembly 12 in place of the seat member 60. The operator station also includes a control system pedestal 62 that supports components of a control system such as monitors and input controls associated with the drive system 16 and camera system 26.

It is understood that the chassis assembly 12 has other miscellaneous features such as storage compartments and other support members. The chassis assembly 12 may also support emergency air sources for operator divers that operate the carrier assembly 10 in the underwater environment. The chassis assembly 12 is thus an elongated structure defining the longitudinal central axis L. In an exemplary embodiment, from end to end, the chassis assembly may be approximately 25 feet in length with an overall width of approximately 5 feet and 10 inches. The elongated frame members 30, 32 at the support arm assemblies 64, 66 are spaced approximately 2 feet from one another. The central portion of the chassis assembly 12 from front wheels 52 to rear wheels 52 may be approximately 11 feet and 7 inches.

FIGS. 1-13 further disclose the support arm assembly 14. The support arm assembly 14 is operably connected to the chassis assembly 12. The support arm assembly 14 engages, displaces and manipulates pipe rings formed from a plurality of pipe segments for the repair of legacy pipes in the water supply system. In one exemplary embodiment of the present invention, a single support arm assembly 14 is utilized. The single support arm assembly 14 may be fixedly supported on the chassis assembly 12. In a further exemplary embodiment of the present invention, the support arm assembly 14 has a first support arm assembly 64 and a second support arm assembly 66. In this exemplary embodiment, the first support arm assembly 64 is fixedly supported on the chassis assembly 12, and the second support arm assembly 66 is moveably supported on the chassis assembly 12 as further described below. In other alternative embodiments, both the first support arm assembly 64 and the second support arm assembly 66 are independently moveable on the chassis assembly 12.

FIGS. 1-13 further show the first support arm assembly 64. The first support arm assembly generally includes a first support post assembly 68 and a first support arm 70.

The first support post assembly 68 is generally operably connected to and supported by the chassis assembly 12. The first support post assembly 68 has a first base post member 72 and a first extendable post member 74. The first extendable post member 74 is moveable with respect to or slidably supported by the first base post member. It is understood that the first base post member 72 and the first extendable post member 74 can have alternative operable connections to achieve a slidable or moveable connection between the post members 72, 74. As further shown in FIG. 2, the first base post member 72 has connection structures to fixedly connect the first base post member 72 to the first elongated frame member 30 and the second elongated frame member 32. In an exemplary embodiment, the first base post member 72 is fixedly connected to the chassis assembly 12 between the first elongated frame member 30 and the second elongated frame member 32. In an exemplary embodiment, the first base post member 72 and the first extendable post member 74 have spaced apart, dual member constructions. A distal end of the first extendable post member 74 has a connection structure to cooperate with the first support arm 70 to be further described. In the dual member construction, the distal end defines a gap therein to receive the first support arm 70. The first support post assembly 68 also has a first hydraulic cylinder 76 operably connected between the post members 72, 74. A fixed end of the hydraulic cylinder 76 is fixedly and operably connected to one of the first base post member 72 (and may also be operably connected to connection structures connecting the first base support member to the chassis assembly) and the first extendable post member 74. An extendable end of the hydraulic cylinder is operably connected to the other of the first base post member 72 and the first extendable post member 74, Thus, the first hydraulic cylinder 76 can be connected on alternate ends, but it is understood that actuation of the first hydraulic cylinder 76 raises the first extendable post member 74. As explained in greater detail below and shown for example in FIG. 3A-3B, the first hydraulic cylinder 76 can vertically raise the first extendable post member 74 with respect to the first base post member 72 and chassis assembly 12.

FIGS. 2-5 further show the first support arm 70. The first support arm 70 has an elongated configuration and is slidably supported by a first base 78. The first base 78 is generally centrally located on the first support arm 70. In an exemplary embodiment, the first base 78 has a squared cross-section defining an internal opening therethrough. The first support arm 70 also has a squared cross-section of slightly lesser dimension and received through the internal opening in confronting relation. A first ratchet member 80 is operably connected between the first base 78 and the first support arm 70. The first ratchet member 80 has one end attached to the first base 78 and an opposite end attached proximate a first end of the first support arm 70. Similarly, a second ratchet member 82 is operably connected to the first base 78 and the first support arm. The second ratchet member 82 has one end attached to the first base 78 and an opposite end attached proximate a second end of the first support arm 70. The first ratchet member 80 and the second ratchet member 82 define eyelets at distal ends, which cooperate with openings on connection flanges on the first support arm 70 and the first base 78 to form a pinned connection as known in the art. Pipe segment connection members are supported at opposite distal ends of the first support arm 70 and in a depending configuration to be further described below. As further shown in FIGS. 2-5, the first support arm 70 is operably connected to the first post member assembly 68. In an exemplary embodiment, the first base 78 is positioned proximate the gap defined by the first extendable post member 74 and a first pivotable connection, or first pinned connection 84 is formed between the first base 78 and the first extendable post member 74. As described in greater detail below, the first support arm 70 is rotatable about the first post member assembly 68.

The ratchet members 80, 82 are known in the art and are sometimes referred to as ratchet turnbuckles. Ratchet turnbuckles are specialty ratchet binders that use a tensioning mechanism as part of an assembly that can place opposite ends of the ratchet into an extended position or a retracted position. Ratchet members can be used to secure a stabilize or potentially loose object. In an exemplary embodiment of the present inventions, cooperative actuation of the ratchet members 80, 82 laterally moves or translates the first support arm 70 with respect to the first base 78 fixed on the first support post assembly 68. The ratchet member 80, 82 has an actuation lever to be engaged by operators. As explained in greater detail below, operators rotate the levers of the ratchet members 80, 82, and depending on an associated setting, the ratchet member 80, 82 extends or retracts as desired. With such movements, the first support arm 70 moves laterally, or side-to-side with respect to the first base.

The first support arm assembly 64 also uses a first rotation ratchet member 86. The first rotation ratchet member 86 is similar in structure and operation of the first and second ratchet members 80, 82. The first rotation ratchet member 86 has distal ends defining eyelets that cooperate with connection flanges on the first base 78 and the first extendable post member 74 to form pinned connections. As described in greater detail below, in response to an operator actuating the actuation lever of the first rotation ratchet member 86, the first rotation ratchet member 86 extends or retracts depending on an associated setting wherein the first support arm 70 is rotatable about the first extendable post member 74. In an exemplary embodiment, the first rotation ratchet member 86 is capable of rotating the first support arm 70 sixty degrees.

The above-described operable connections provide multiple movements or displacements of the support arm 70 (and a pipe ring connected thereto) with respect to the chassis assembly 12. Actuation of the first vertical hydraulic cylinder 76 raises and lowers the first support arm 70. Cooperative actuation of the first ratchet member 80 and the second ratchet member 82 provides lateral or side-to-side movement of the first support arm 70. Finally, actuation of the first rotation ratchet member 86 provides for angular rotation of the first support arm 70 about the first extendable post member 74, or rotation with respect to the chassis assembly 12.

FIGS. 2-5 also show the second support arm assembly 66. The second support arm assembly 66 is generally similar in structure and function to the first support arm assembly 64 as the second support arm assembly is also configured to displace and manipulate pipe rings in the repair of legacy pipes of a water supply system. As described in greater detail below, the second support arm assembly 66 is linearly moveable with respect to the first support arm assembly 64. The second support arm assembly 66 generally includes a second support post assembly 88 and a second support arm 90.

The second support post assembly 88 is generally operably connected to and supported by the chassis assembly 12. The second support post assembly 88 has a second base post member 92 and a second extendable post member 94. The second extendable post member 94 is movably supported with respect to the second base post member 92. It is understood that the second base post member 92 and the second extendable post member 94 can have alternative operable connections to achieve a slidable or moveable connection between the post members 92, 94. As further shown in FIG. 2, the second base post member 92 has connection structures to connect the second base post member 92 to the first elongated frame member 30 and the second elongated frame member 32. In an exemplary embodiment, the second base post member 92 is slidably connected to the chassis assembly 12 between the first elongated frame member 30 and the second elongated frame member 32. Thus, as described in greater detail below, the second base post member 92 has structures to move along the first and second elongated frame members 30, 32. In an exemplary embodiment and similar to the first support arm assembly, the second base post member 92 and the second extendable post member 94 have spaced apart, dual member constructions. A distal end of the second extendable post member 94 has a connection structure to cooperate with the second support arm 90 to be further described. In the dual member construction, the distal end defines a second gap therein to receive and support the second support arm 90. The second support post assembly 88 also has a second hydraulic cylinder 96 operably connected between the second post members 92, 94.

A fixed end of the hydraulic cylinder 96 is fixedly and operably connected to one of the second base post member 92 (and may also be operably connected to connection structures connecting the second base support member to the chassis assembly) and the second extendable post member 94. An extendable end of the hydraulic cylinder is operably connected to the other of the second base post member 92 and the second extendable post member 94. Thus, the second hydraulic cylinder 96 can be connected on alternate ends, but it is understood that actuation of the second hydraulic cylinder 96 raises the second extendable post member 94. As explained in greater detail below and shown for example in FIG. 3A-3B, the second hydraulic cylinder 96 can vertically raise the second extendable post member 94 with respect to the second base post member 92 and chassis assembly 12.

FIGS. 2-6 further show the second support arm 90, which has similar structures and function to the first support arm 70. The second support arm 90 has an elongated configuration and is slidably supported by a second base 98. The second base 98 is generally centrally located on the second support arm 90. In an exemplary embodiment, the second base 98 has a squared cross-section defining an internal opening therethrough. The second support arm 90 also has a squared cross-section of slightly lesser dimension and received through the internal opening in confronting relation. A third ratchet member 100 is operably connected between the second base 98 and the second support arm 90. The third ratchet member 100 has one end attached to the second base 98 and an opposite end attached proximate a first end of the second support arm 90. Similarly, a fourth ratchet member 102 is operably connected to the second base 98 and the second support arm 90. The fourth ratchet member 102 has one end attached to the second base 98 and an opposite end attached proximate a second end of the second support arm 90. The third ratchet member 100 and the fourth ratchet member 102 define eyelets at distal ends, which cooperate with openings on connection flanges on the second support arm and the second base to form a pinned connection as known in the art. Pipe segment connection members are supported at opposite distal ends of the second support arm 90 and in a depending configuration to be further described below. As further shown in FIGS. 2-6, the second support arm 90 is operably connected to the second post member assembly 88. In an exemplary embodiment, the second base 90 is positioned in the space defined by the second extendable post member 94 and a pivotable connection is formed between the second base 98 and the second extendable post member 94. A pinned connection 104 is formed between the second base 98 and the second extendable post member 94. As described in greater detail below, the second support arm 90 is rotatable about the second support post assembly 88.

Similar to the first support arm 70, in an exemplary embodiment of the present invention, cooperative actuation of the ratchet members 100, 102 laterally moves or translates the second support arm 90 with respect to the second base 98 fixed on the second support post assembly 88. The ratchet members 100, 102 have an actuation lever to be engaged by the operator divers. As explained in greater detail below, operator divers rotate the levers of the ratchet members 100, 102 and depending on an associated setting, the ratchet member 100, 102 extends or retracts as desired. With such movements, the second support arm 90 moves laterally, or side-to-side with respect to the second base 98.

The second support arm assembly 66 also uses a second rotation ratchet member 106. The second rotation ratchet member 106 is similar to the previously-described ratchet members including the first rotation ratchet member 86. The second rotation ratchet member 106 has distal ends defining eyelets that cooperate with connection flanges on the second base and the second extendable post member to form pinned connections. As described in greater detail below, in response to an operator actuating the actuation lever of the second rotation ratchet member 106, the second rotation ratchet member 106 extends or retracts depending on an associated setting wherein the second support arm 90 is rotatable about the second extendable post member 94. In an exemplary embodiment, the first rotation ratchet member 106 is capable of rotating the second support arm 90 sixty degrees.

Figure 2:
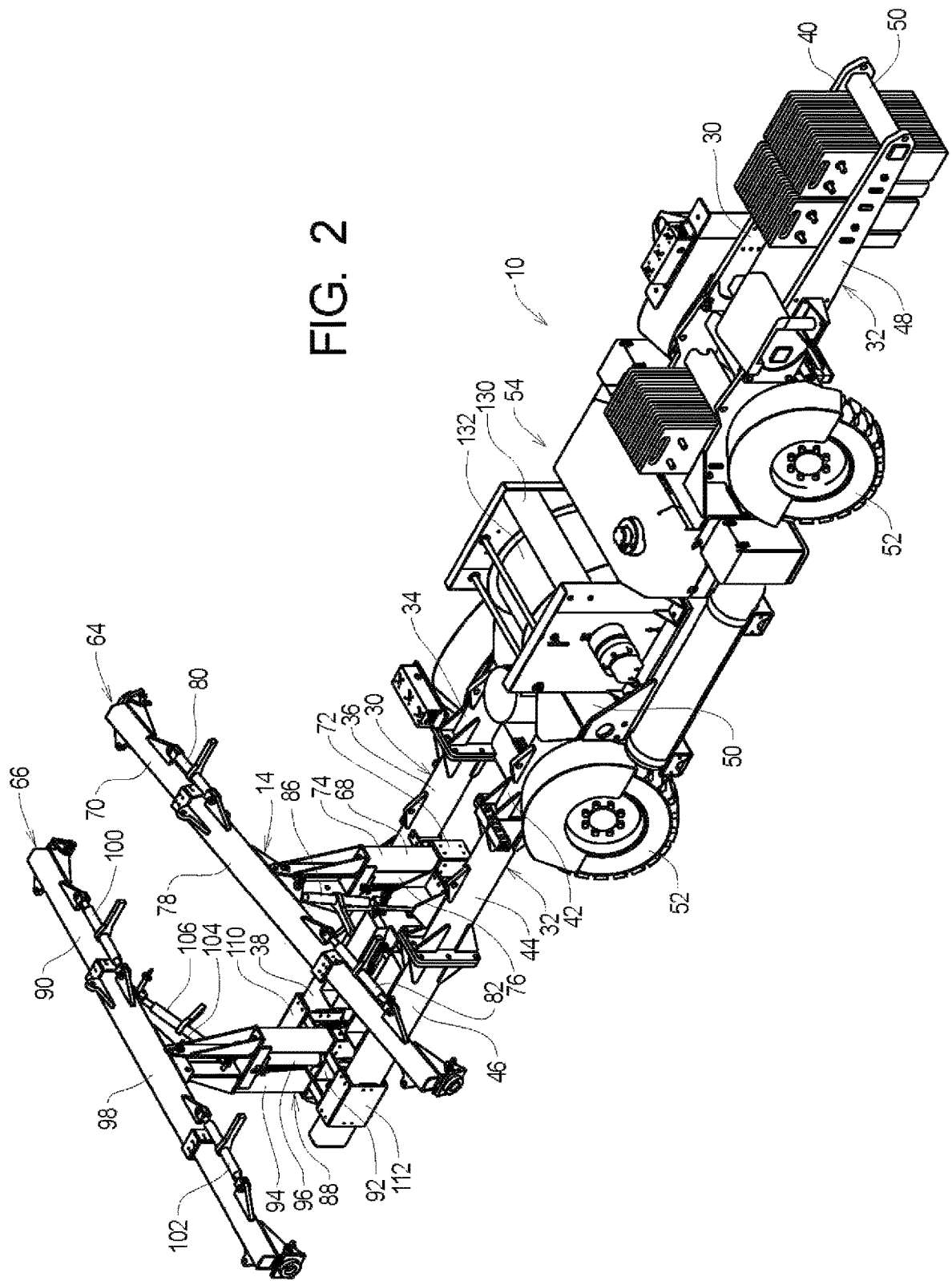
FIG. 2 is a rear perspective view of the carrier assembly of FIG. 1.

As further can be appreciated from FIGS. 2-4, the second support arm assembly 66 is moveable with respect to the chassis assembly 12 and; in particular, moveable with respect to the first support arm assembly 64. Thus, the second support arm assembly 66 is capable of moving along the chassis assembly 12 with respect to the first support arm assembly 64. The second support post assembly 68 has a carriage assembly operably connected to the second base post member 92. In an exemplary embodiment, a first carriage 110 is operably connected to the second base post member 92 and a second carriage 112 is operably connected to the second base post member 92. The first carriage 110 defines an opening and receives the first elongated frame member 30 of the chassis assembly 12, and the second carriage 112 defines an opening and receives the second elongated frame member 32 of the chassis assembly 12. Thus, the first carriage 110 is capable of riding or sliding along the first elongated frame member 30, and the second carriage 112 is capable of riding or sliding along the second elongated frame member 32. As further shown in FIG. 4, movement of the second support arm assembly 66 is effectuated by a connection hydraulic cylinder 114 or third hydraulic cylinder 114. The connection hydraulic cylinder 114 has a base end or stationary end that is fixed to the chassis assembly 12. In an exemplary embodiment, the stationary end is fixedly connected to a cross-member 50 of the chassis member defined along a length of the elongated frame members 30, 32. An extendable end of the connection hydraulic cylinder 114 is operably connected to the second base post member 92 of the second support post assembly 88. Extension and retraction of the connection hydraulic cylinder 114 moves the carriages 110, 112 along the elongated support members 30, 32 of the chassis assembly 12 wherein the second support arm assembly 66 is linearly or axially moveable with respect the first support arm assembly as referenced by the arrow B in FIG. 4.

Figure 7:
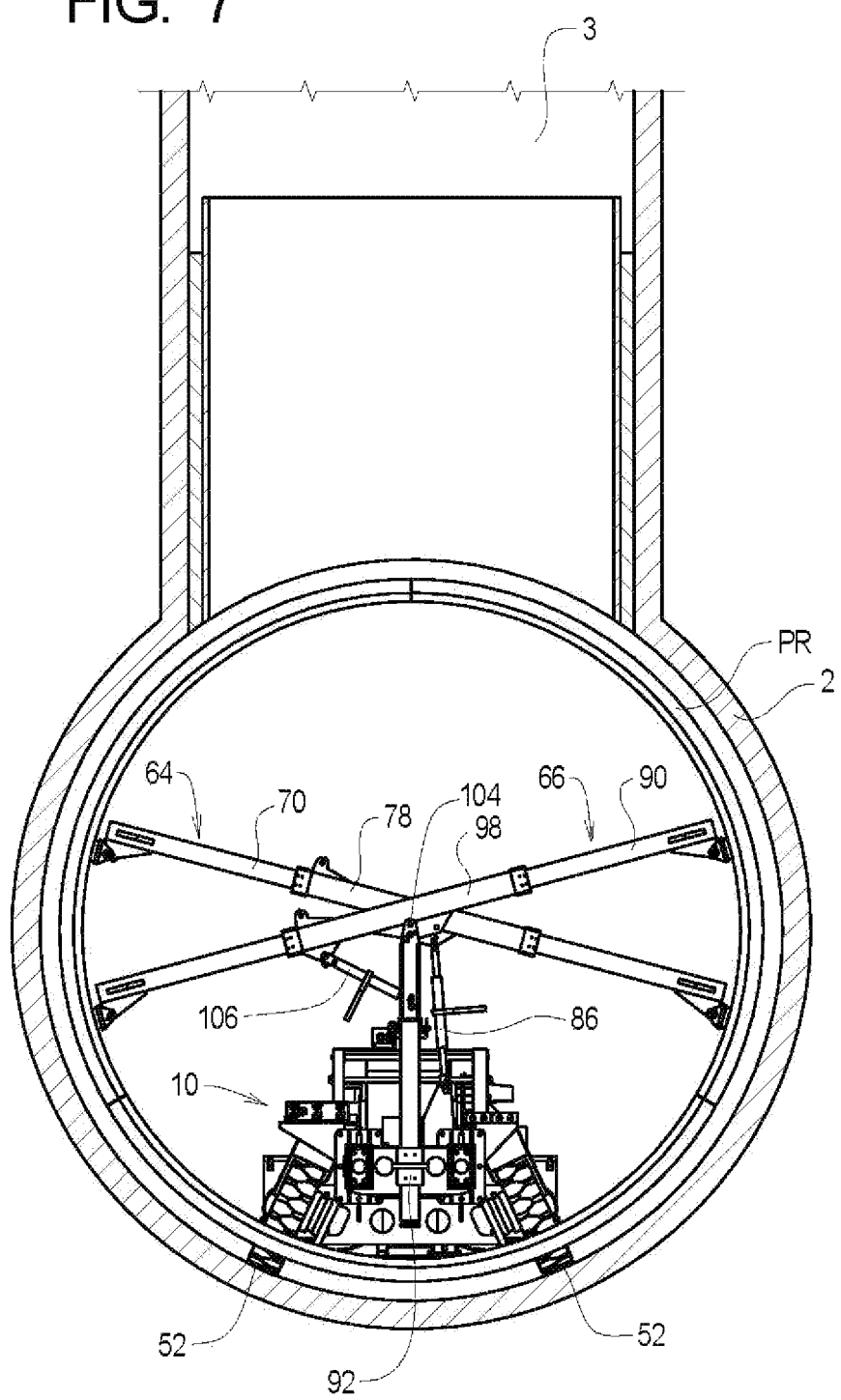
FIG. 7 is a front end elevation of the carrier assembly of FIG. 1 and positioned in a legacy pipe of a water supply system and wherein the carrier assembly is engaging pipe rings for installation in the legacy pipe.
Figure 8:
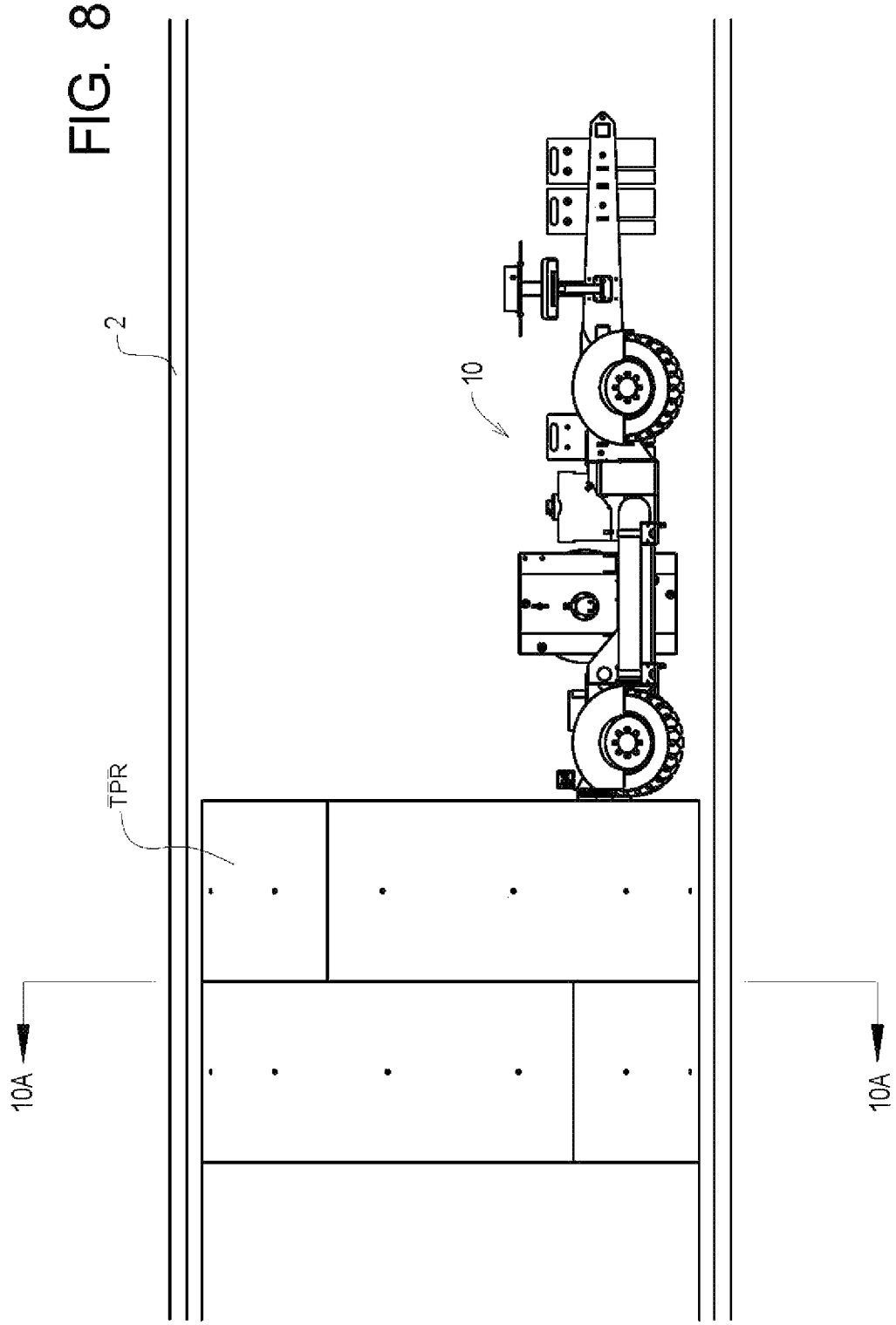
FIG. 8 is a partial side elevation view of the carrier assembly of FIG. 1 and positioned in a legacy pipe of a water supply system and wherein the carrier assembly is engaging pipe rings for installation in the legacy pipe.
Figure 9:
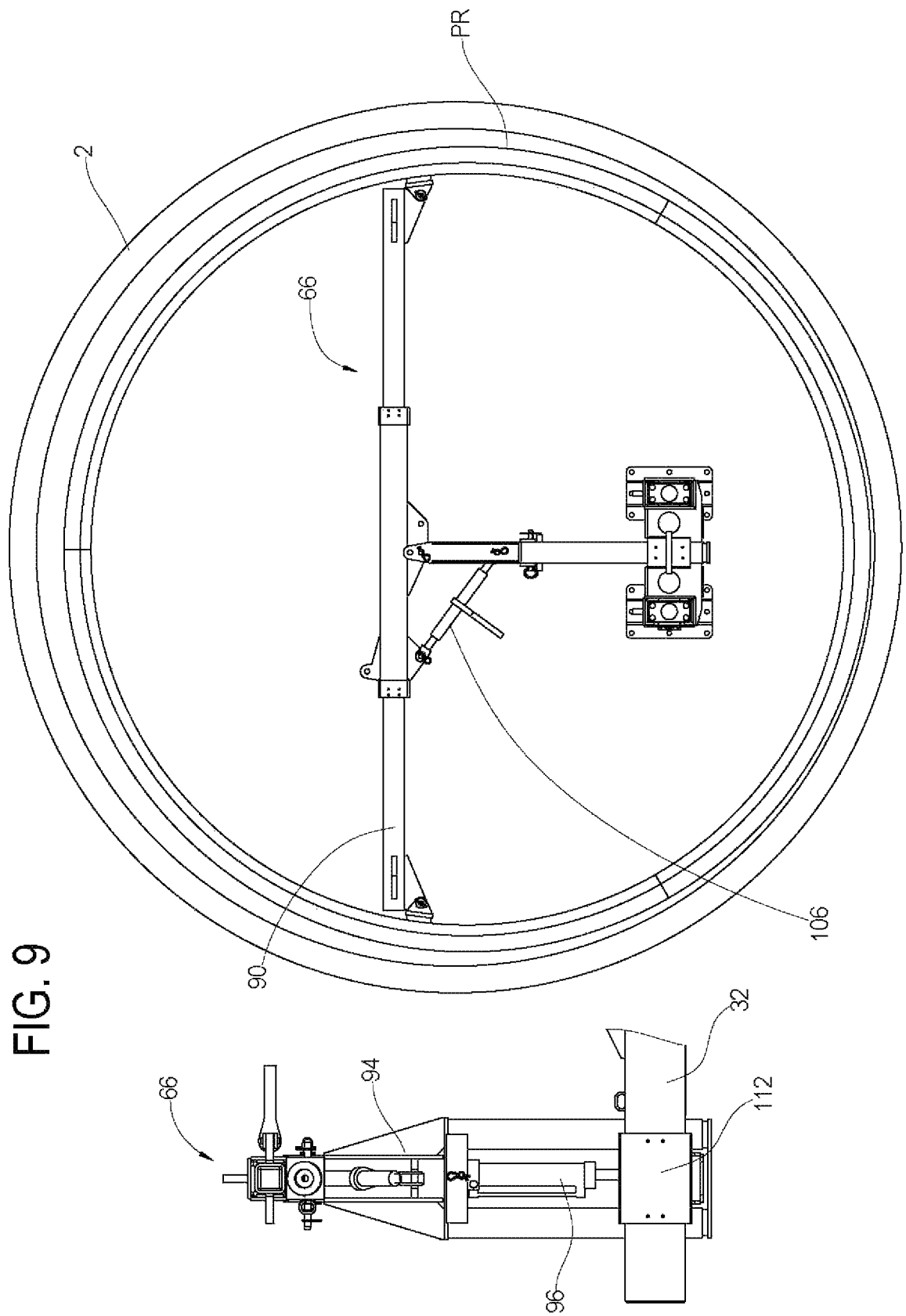
FIGS. 9 and 10 are an end elevation view of the carrier assembly engaged with a pipe ring and showing vertical movement of the pipe ring and a partial side elevation view of a post with a hydraulic cylinder.
Figure 10:
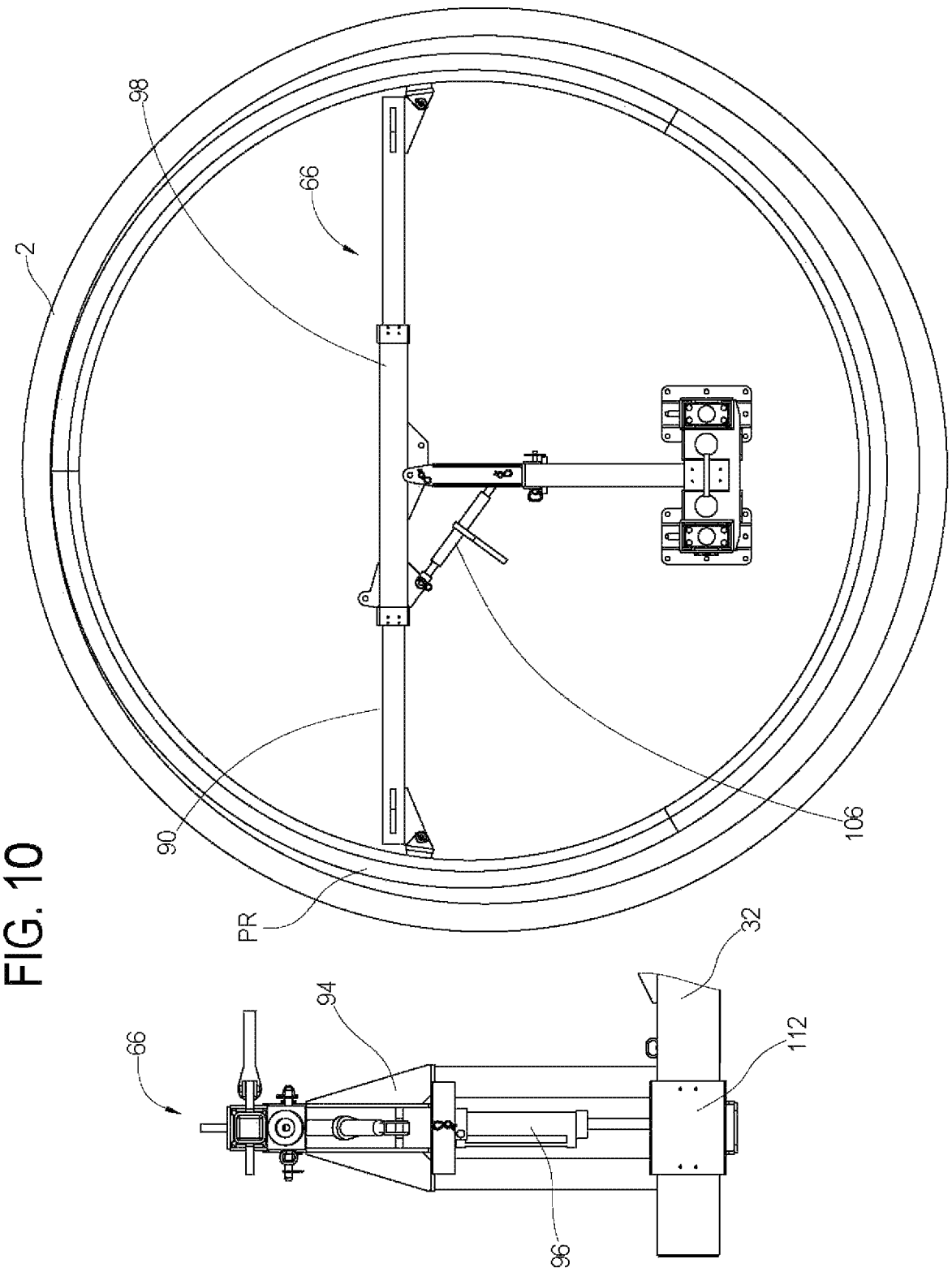
Figure 11:
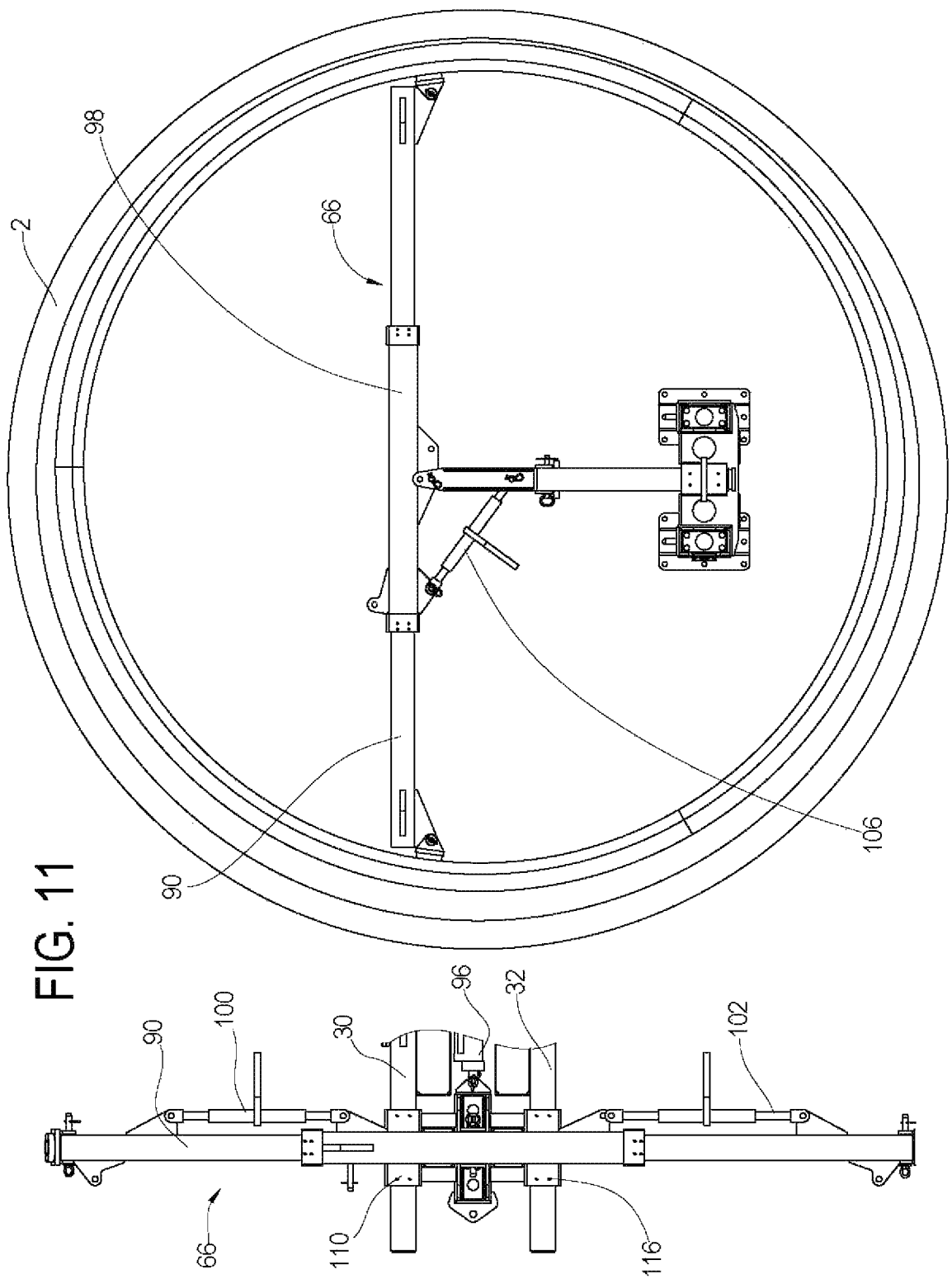
Figure 13A:
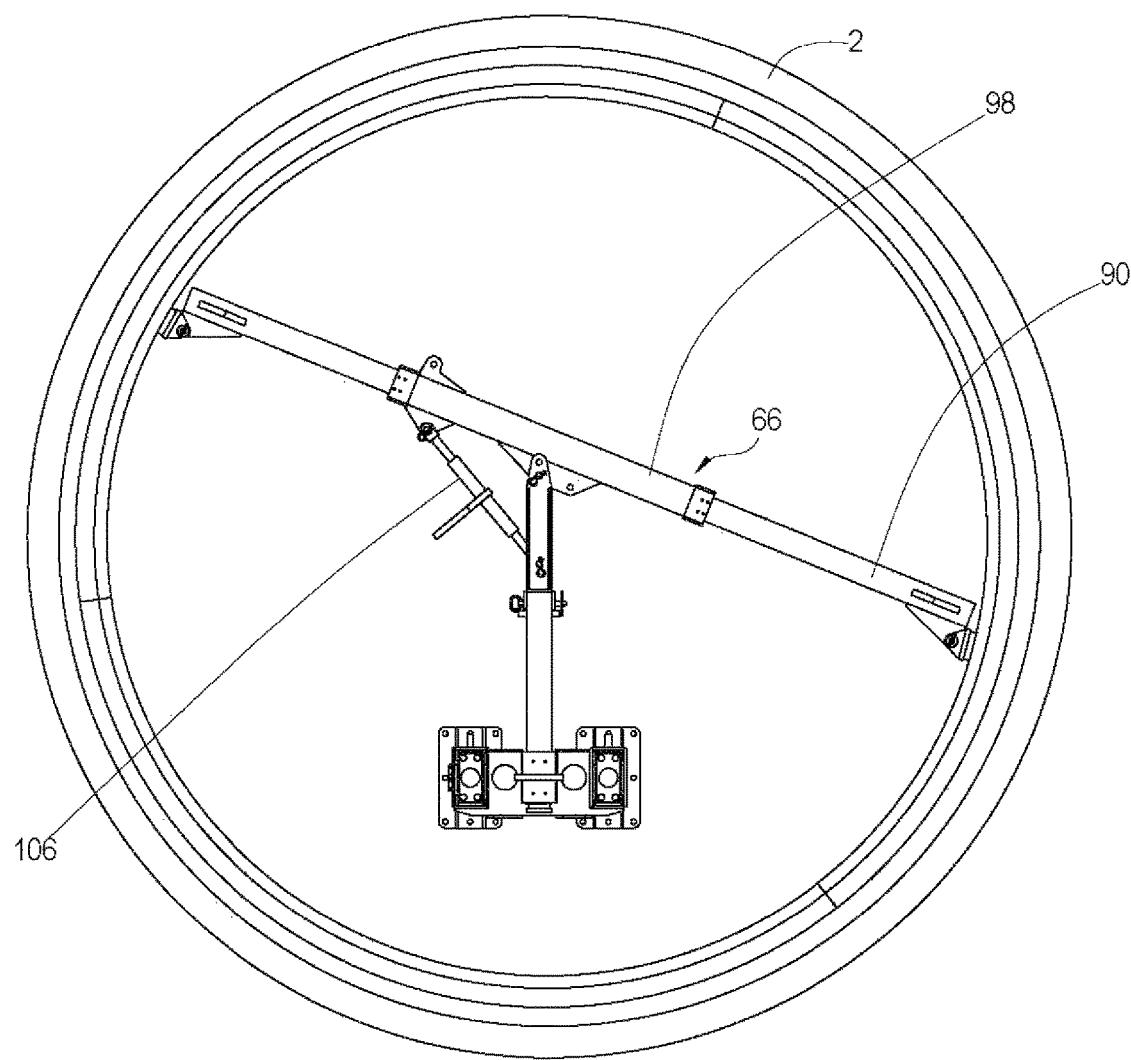
FIGS. 13A and 13B are partial end elevation views of the carrier assembly engaged with a pipe ring and showing rotation of the pipe ring.
Figure 13B:
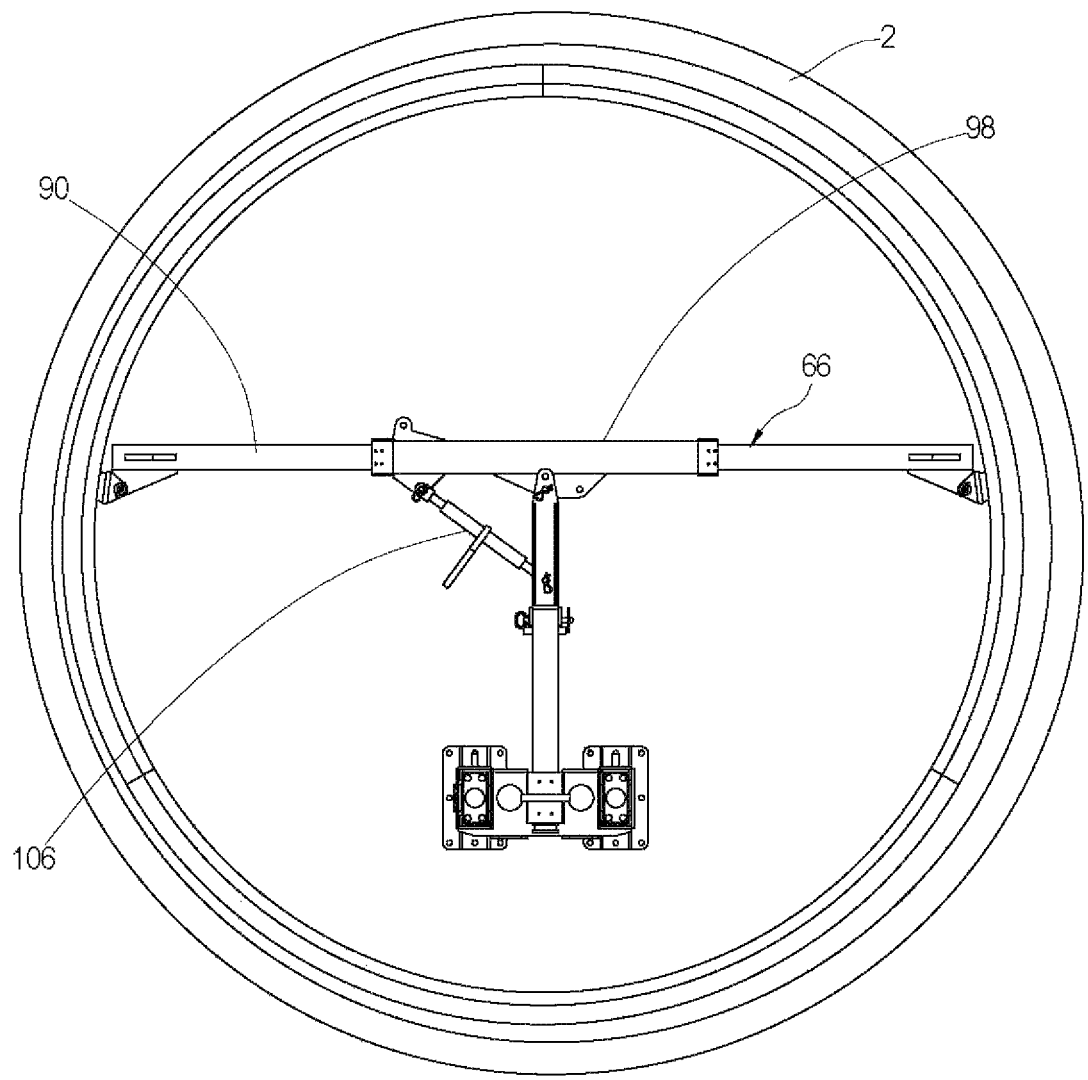

FIGS. 7-8 disclose a fully-constructed carrier assembly positioned in a legacy pipe of a water supply system. FIG. 8 further discloses the carrier assembly 10 engaging a pair of pipe rings to be described in greater detail below. The above-described operable connections regarding the second support arm assembly 66 provide multiple movements or displacements of the second support arm 90 with respect to the chassis assembly 12. FIGS. 9-13 illustrate schematically such movements. Actuation of the second hydraulic cylinder 96 raises and lowers the second support arm 90 (FIGS. 9-10). Cooperative actuation of the third ratchet member 100 and the fourth ratchet member 102 provides lateral or side-to-side movement of the second support arm 90 (FIGS. 11-12). In addition, actuation of the second rotation ratchet member 106 provides for angular rotation of the second support arm 90 about the second extendable post member 94, or rotation with respect to the chassis assembly 12 (FIGS. 13A and 13B). Finally, actuation of the connection hydraulic cylinder 114 moves the second support arm assembly 66 linearly along the chassis assembly 12 with respect to the first support arm assembly 64 (FIG. 4). It is understood that the vertical, lateral and rotational movements of the second support arm assembly 66 are also applicable to the first support arm assembly 64.

It is understood that references to first, second, third and fourth etc. are generally for identification purposes of the respective ratchet members or hydraulic cylinders. The identification nomenclature can vary depending on the features of the carrier assembly being described.

It is understood that the support arm assemblies 64, 66 could also have alternative configurations. In a further exemplary embodiment, the first support arm assembly 64 could be designed to be moveable along the chassis assembly 12 similar to the second support arm assembly 66. In such configuration, the first support arm assembly 64 and the second support arm assembly 66 can be moveable independently with respect to one another. In a further exemplary embodiment, the first support arm 70 could comprise a pair of arms wherein each support arm is slidably supported in a respect end of the first base 78. Each support arm can be moveable independently by a ratchet member. In any embodiment, the support arm could be laterally moved via hydraulic cylinders. For example, each ratchet member mounted between the support arm and base could be replaced by a hydraulic cylinder. Other mechanisms can also be utilized to achieve the various movements of the support arm assemblies 64, 66.

FIGS. 1-6 further disclose the drive system 16. The drive system 16 generally provides operational power to various components of the carrier assembly 10 for the repair of legacy pipe of the water supply system. In exemplary embodiments, a drive system 16 may turn a motor that drives gears in a gearbox that is operably connected to a load. In further exemplary embodiments, the drive system 16 generally includes a hydraulic power unit (HPU) 120 and an electrical power supply mechanism 122.

Figure 35A:
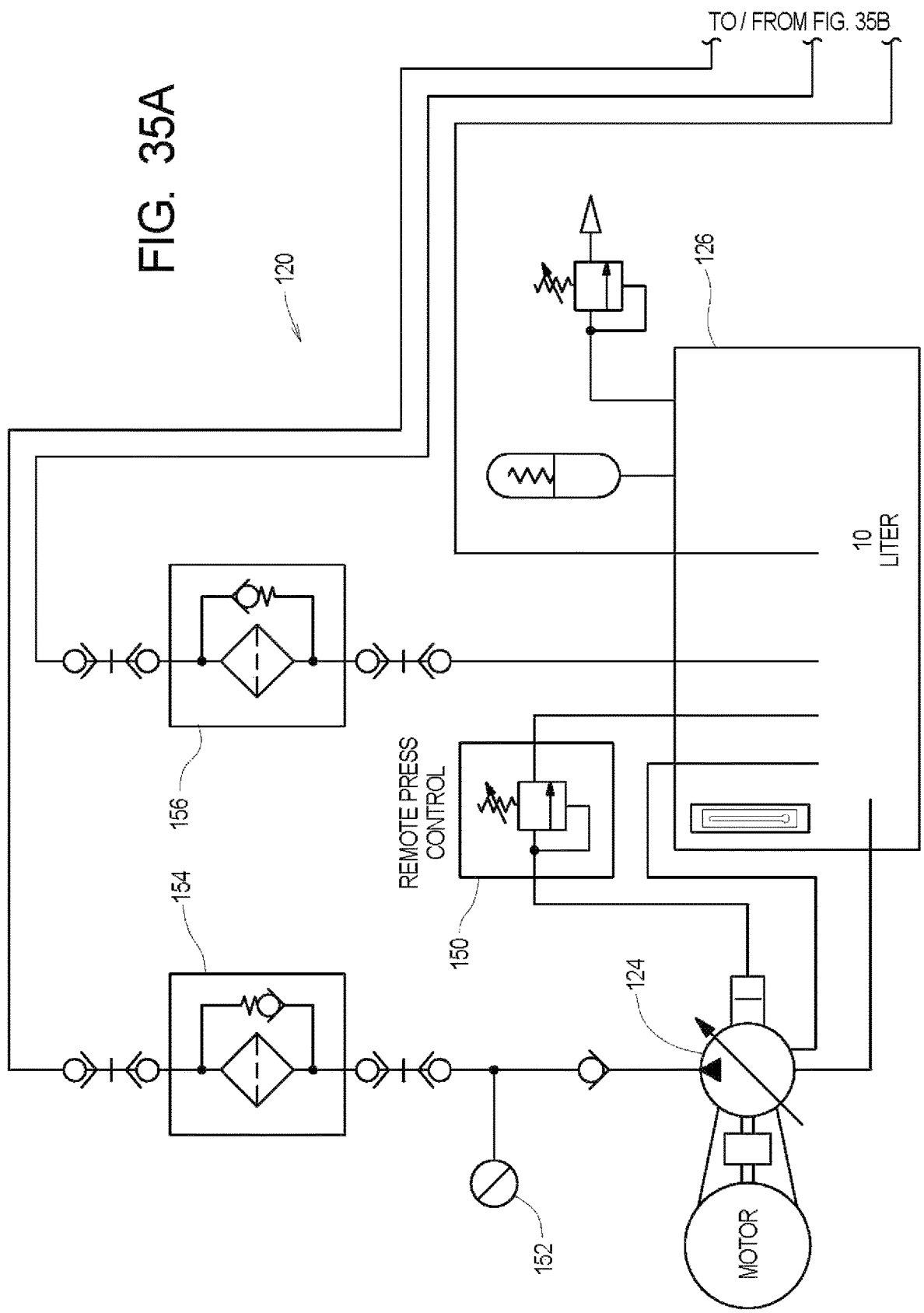

FIGS. 35A and 36 further disclose the hydraulic power unit 120. The hydraulic power unit 120 has various components that cooperate to form a hydraulic circuit to drive loads etc. that include, among other things, a hydraulic pump 124, a fluid reservoir 126, associated valve members such as directional control valves and fluid lines that are in fluid communication with the above-described hydraulic cylinders 76, 96, 114 to be described in greater detail.

Referring to FIGS. 35A-35E, the hydraulic pump 124 is in fluid communication with the hydraulic fluid reservoir 126. The hydraulic pump 124 and fluid reservoir 126 are supported by and carried on the chassis assembly 12. The associated valve members and fluid lines are operably connected to the hydraulic pump 124 and also supported by and carried by the chassis assembly 12. The fluid lines are operably connected to an outlet of the hydraulic pump 124 and to the first hydraulic cylinder 76, the second hydraulic cylinder 96 and the connection hydraulic cylinder 114. It is understood that the hydraulic pump 124 is operably connected to the electrical power supply mechanism 122 (FIG. 36). Actuation of the hydraulic pump 124 delivers pressurized fluid from the reservoir 126 and through the valves and fluid lines to extend the hydraulic cylinders 76, 96, 114 as desired to effect movement of the first support arm assembly 64 and the second support arm assembly 66. The hydraulic power unit 120 is further operated to retract the hydraulic cylinders as desired. Such operation of the hydraulic power unit 120 to extend and retract the various hydraulic cylinders 76, 96, 114 is known in the art. The hydraulic power unit 120 is also used to drive the wheels 52 of the chassis assembly 12.

It is understood that the fluid lines may define a hydraulic manifold having an outlet or a plurality of outlets. Operator divers can operably connect additional hydraulic tools to one of the outlets to assist in the repair of the legacy pipe.

FIGS. 35A-E generally disclose the hydraulic-related components in a hydraulic schematic diagram with more detail. The hydraulic schematic diagram is split up into the FIGS. 35A through 35E.

FIG. 35A discloses a first portion of the hydraulic circuit. The hydraulic pump 124, powered by an electric motor, is in fluid communication with the fluid reservoir 126. A relief valve 150 is operably connected between the hydraulic pump 124 and the fluid reservoir 126. Downstream of the supply line outlet of the hydraulic pump 124, a pressure gauge 152 and an outlet filter 154 are included. A return filter 156 is included in the return line to the fluid reservoir 126. Supply and return lines are shown in FIG. 35A that extend to corresponding lines in FIG. 35B. It is understood that the "P" nomenclature relates to the hydraulic pump (high pressure input), and the "T" nomenclature relates to the tank or reservoir (lower pressure return to the reservoir). As further shown in FIG. 35B, the hydraulic power unit 120 includes hydraulic inputs or supplies, through a manifold, to the first hydraulic cylinder 76, the second hydraulic cylinder 96 and the connection hydraulic cylinder 114. It is understood the particular supply/returns for each cylinder 76, 96, 114 can vary on the diagram depending on the routing of the lines. A directional control valve 160 is included with each cylinder 76, 96, 114. A relief valve 158 is included between the supply and return lines. The lines continue to another portion of the hydraulic circuit shown in FIG. 35C. As shown in FIG. 35C, tool connection manifolds 162 are operably connected to the supply and return lines. In an exemplary embodiment, two tool connection manifolds 162 are included while it is understood that more or less manifolds 162 can be utilized. The manifolds 162 have a quick disconnect member(s) 164 wherein operator divers can attach various hydraulic tools/implements to assist in the repair of the pipes/tunnels.

Figure 35D:
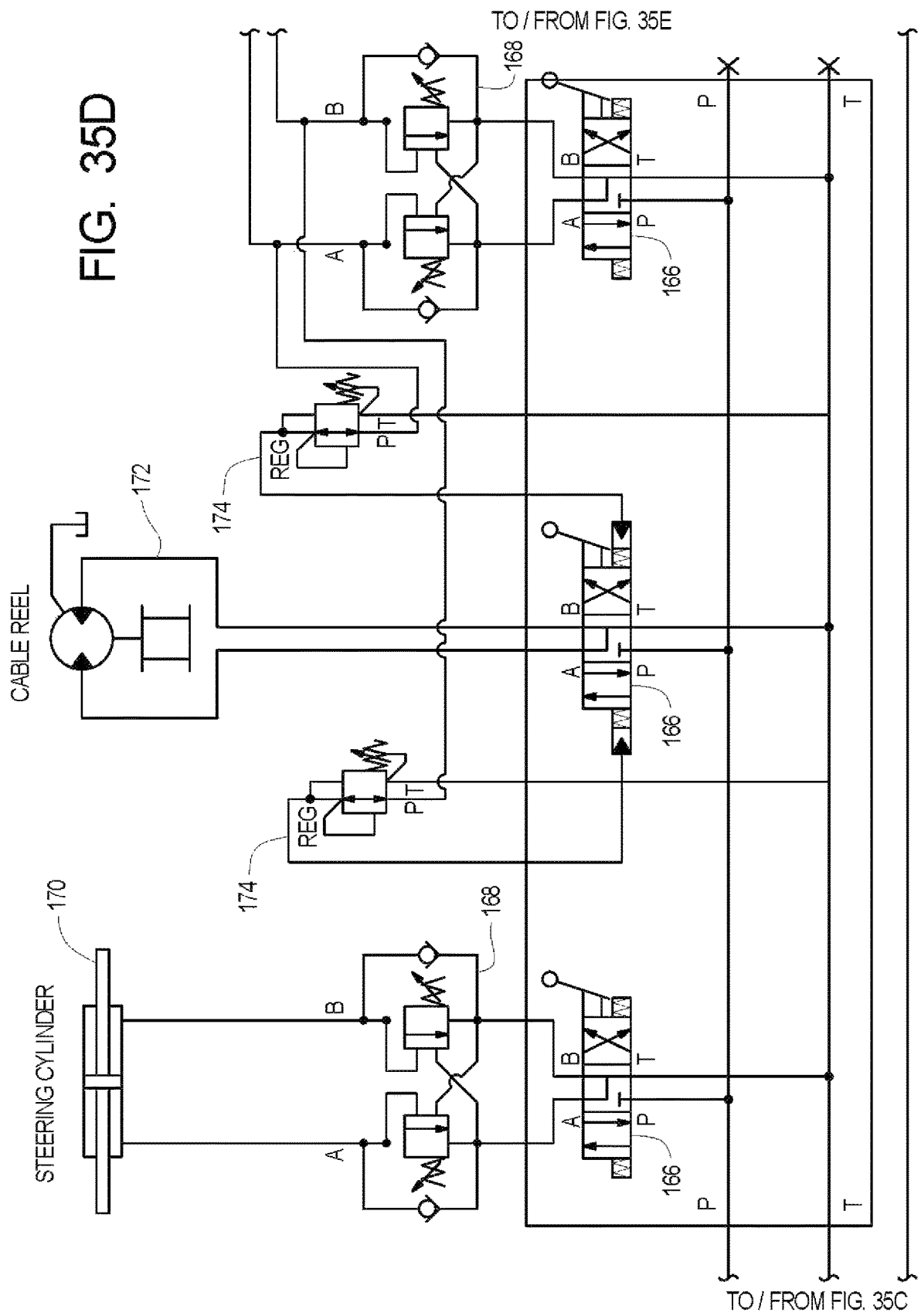
Figure 35E:
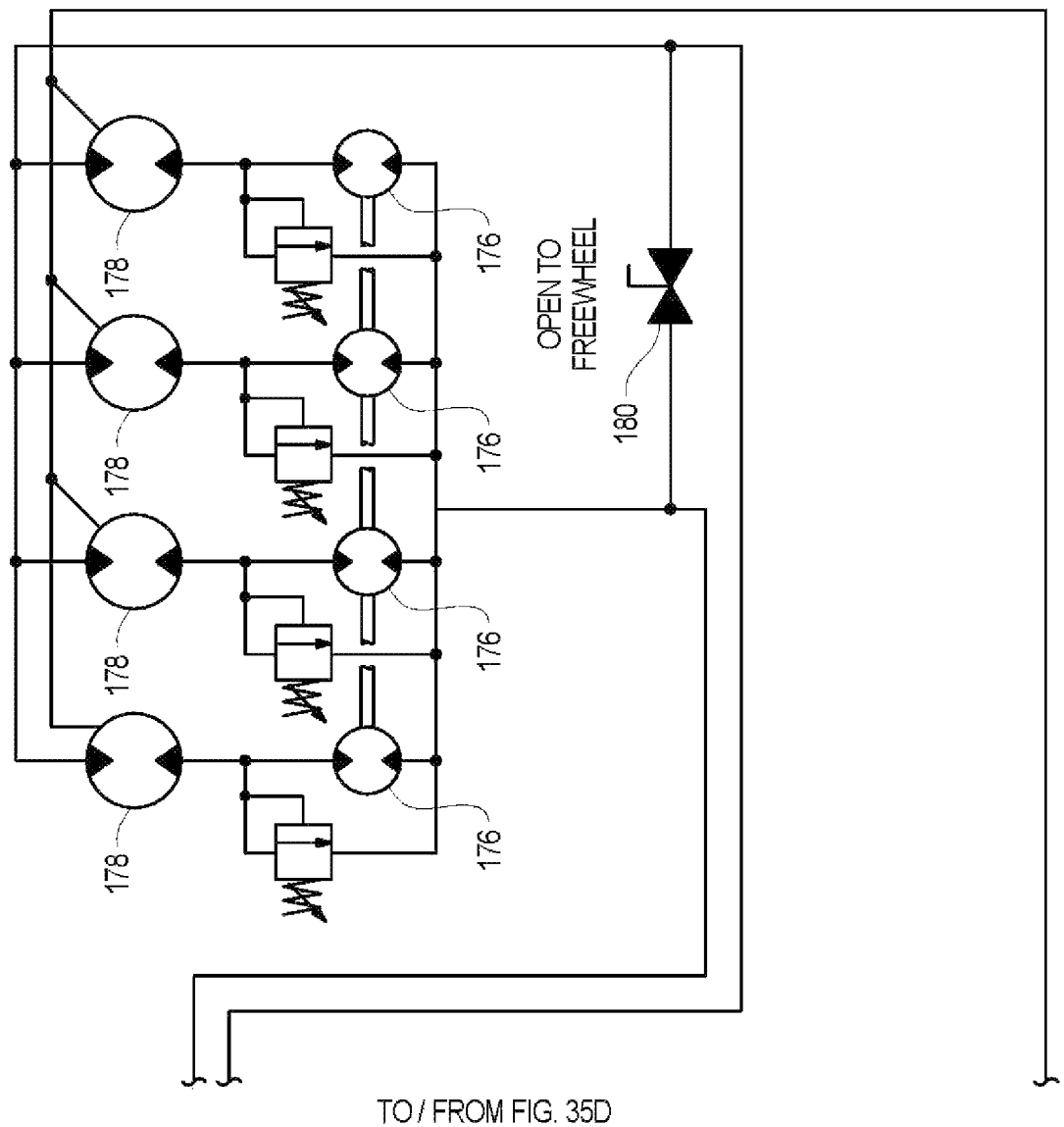

The supply and return lines from FIG. 35C extend and correspond to lines in FIG. 35D. As shown in FIG. 35D, supply and return lines are provided through a sectional valve 166 and counter balance valve 168 to a steering cylinder 170. The steering cylinder 170 is utilized to steer the carrier assembly 10. In addition, supply and return lines are provided through a sectional valve 166 to a cable reel hydraulic motor 172 that is associated with the spool member 132 for controlling positioning of the electrical power cable/umbilical 130 (FIG. 36). A pressure reducing valve 174 is also included. Finally, supply and return lines are provided through a sectional valve 166 and another counter balance valve 168 for the wheels 52 of the carrier assembly 10. As shown in FIG. 35E, the supply and return lines continue and are operably connected through a flow divider combiner 176 and a drive hydraulic motor 178 for each wheel 52. A freewheel valve 180 is included to provide for a freewheel configuration, FIGS. 35A-35E thus disclose the hydraulic circuit for operation of the hydraulic power unit 120 to operate the carrier assembly 10 as described herein.

FIGS. 1-6 and 36 further disclose the electrical power supply mechanism 122. The electrical power supply mechanism 122 generally includes an electrical power cable 130. The electrical power cable 130 is configured to be connected an electrical power source. The electrical power cable 130 is designed and rated to operate in an underwater environment in a safe manner. FIG. 36 shows a general electrical schematic of the mechanism 122. It is understood that the mechanism 122 has electrical supply wiring and other known electrical components to supply electrical power to various components of the carrier assembly 10. Electrical power is also provided to the hydraulic pump 124. Electrical power is also provided to the lighting system 24 of the chassis assembly 12. It is further understood that electrical power is also provided to the various control components associated with the operator station 28 supported on the chassis assembly 12 such as computer monitors and operator controls.

As further shown in FIG. 36, the general schematic component/connections of the electrical power supply mechanism 122 is disclosed along with additional electrical components/power source located above-ground or at a top side location over the underground water supply system 1.

At the topside location, a power supply 182 is provided and is operably connected to a topside power supply cabinet 184. A control computer 186 is operably connected to the power supply cabinet 184 through a serial converter 188. As further shown, one end of the electrical power cable 130 is operably connected to the power supply cabinet 184. FIG. 36 further shows the electrical power supply mechanism 122 of the carrier assembly 10. It is understood that the electrical power cable 130 extends through an access port of the water pipe/tunnel and is mounted on the spool member 132. Another end of the electrical power cable 130 is operably connected to a fixed junction box 190. From the junction box 190, a power supply line is operably connected to the hydraulic power unit 120. Additional connections from the junction box are operably made to a light control unit 192. The light control unit 192 houses various components such as a battery, battery charger, a power management unit and a control board. The lights 57 of the lighting system 24 are operably connected to the control board of the light control unit 192. It is also understood that electrical power is also provided to the cameras 58 of the camera system 26 utilized by the diver operators.

The carrier assembly 10 is designed to repair a significant linear distance of the legacy pipe. Thus, the carrier assembly 10 will travel significant distances along the legacy pipe. The electrical supply cable 130 is configured to be connected to an electrical power source above ground and travel down and along the legacy pipe as the carrier assembly 10 moves along the legacy pipe. The electrical supply cable 130 may have a length of 1000 feet or 1148 feet in an exemplary embodiment and is supported on a spool member 132 or cable reel 132 wherein the cable wraps arounds the spool member 132 in coil fashion. The spool member 132 is rotatably supported on a central section of the chassis assembly 12. As explained in greater detail below, the electrical supply cable 130 is rolled on an off the spool member 132 as needed depending on the position of the carrier assembly 10 in the legacy pipe. A cable tensioner can be employed with the spool member 132 for the electrical power cable 130.

Additional description regarding the hydraulic-related systems and electrical-related systems are provided below. The underwater carrier assembly 10 is expected to be fully submerged for 6 months at a time. To minimize maintenance and downtime, the carrier assembly 10 is equipped with long lasting and or easily replaceable components. Hydraulic cylinders 76, 96, 114 are stainless steel bodies and chromed or ceramic rods. Ratchet members 80, 82, 86, 100, 102, 106 are corrosion resistant with grease fittings (filled with marine grease to prolong life). The chassis assembly 12 and related components will be hot dip galvanized to offer the best possible corrosion resistance, and sacrificial anodes will be added to aid in the prevention of galvanic corrosion. Major components will be bolted or pinned together to facilitate easy service and replacement.

The example underwater carrier assembly 10 employs an electric over hydraulic system with the umbilical electrical power supply cable 130. The inventors herein have considered other options including battery operated hydraulic and fully DC electric may be used. In an exemplary embodiment. AC electric is used as the inventors have determined it to be a more reliable and functional solution.

DC underwater remote-operated vehicle (ROV) propellers have small axial loads, which makes sealing them much easier versus a packed bearing that would support the loads of a transporter. Also, to free wheel the transporter in case of power loss, direct drive hydraulics provide off the shelf solutions where an electric option would be more difficult and custom. They also provide a single bolt on item solution. Whereas an electric motor would need a gearbox, bearings, brake, and PWM controls, hydraulic wheel motors combine these into one unit. There is more control with hydraulics and a lot less risk for damage and repair downtime than with electric motors.

Another reason is movement of the tunnel liners or pipe rings to be carried by the carrier assembly 10. Fluid power systems can provide high forces at high power levels simultaneously to several actuating locations in a flexible manner. This results in higher torque/mass ratios than those available from electric motors. Another advantage of a hydraulic actuation system is that any heat generated at the load is automatically transferred to another location away from the point of heat generation, by the hydraulic fluid itself, and effectively removed by means of a heat exchanger. The carrier assembly 10 is designed to help operator divers of a crew place two 3000 lb. tunnel liners or pipe rings. To achieve this placement, it was desired that the vertical lift and horizontal shift features of the carrier assembly be powered in one alternative embodiment regarding the horizontal shift features. Although DC linear actuators are common, for this weight class and in a submerged environment, food grade stainless steel cylinders are much more available and less boutique.

The inventors herein considered various advantages and disadvantages regarding electric vs hydraulic operations, which are described below.

The following are main advantages of electric actuation systems:
1. Reduced fuel/energy consumption—especially when there is a large variation in load demand;
2. Less space occupation—increase of assembly's payload, or assembly payload;
3. High positioning accuracy—convenient control of motion profiles; and
4. No risk of leakages—removal of hoses, pipes, tanks, valves, pumps, etc.

The following are main advantages of a hydraulic actuation systems:
1. The fluid carries away the generated heat to a convenient heat exchanger;
2. It acts as a lubricant as well and extends life of drivetrain components;
3. Hydraulic actuators develop relatively large torques for comparatively small devices;
4. Motors can directly be used for dynamic braking (with relief valves protection);
5. They can be operated under continuous, intermittent, reversing, and stalled conditions without damage; and
6. Reliable and simple underwater controls.

Electric actuation systems, in general, offer higher efficiency and flexibility and may be used. Factors such as translational motion and simple underwater diver control suggests that hydraulic powertrains are favorable in the context of the example underwater carrier assembly 10 of the present invention.

While DC electric to hydraulic would be possible, the use of batteries presents challenges in the conditions in which the example underwater carrier assembly 10 is typically used because common absorbent glass mat (AGM) batteries must be de-rated for the cold and power requirements, and discharge rate leads to a very large battery pack (15×12 V 105 Amp hour batteries). Accordingly, managing and charging a large amount of stored electricity as well as the increased risk of stranding the cart is thought to outweigh the benefits of an isolated/completely self-sufficient unit.

An umbilical tethered electric over hydraulic powered pipe carrier assembly may also be used. AC tethered subsea equipment is standardized across the oil and gas industry, and components are readily available for underwater hydraulic power units (HPU's). The 480V AC motor in the unit is standard in the industry and is easily used with US grid power.

The carrier assembly 10 is capable of running at up to 10 horsepower (HP) and is expected to require 6 HP during normal use. The carrier assembly 10 will need the additional power to traverse disjointed sections within the failing pipe. In addition to the HPU, the top side equipment required by IMCA D 045 can also be provided and integrated.

The hydraulic system and components are easily replaceable and can be changed out quickly on the surface. In an exemplary embodiment, the carrier assembly 10 utilizes Bio-Oil in place of hydraulic fluid. The HPU 120 will be used to power all four wheels 52, the vertical lifting cylinders 76, 96, the horizontal connection cylinder 114, steering arms cylinder, the constant tension real, and operator diver tools.

The hydraulic installation associated with the carrier assembly 10 will meet the following requirements:
1. 3000 psi system pressure;
2. The system will supply 4 hydraulic wheel motors each with a displacement of 940 ccm to be driven at 5.6 RPM @ 3000 psi. This allows the pipe carrier assembly 10 to travel at 0.5 mph;
3. Continuous reduced pressure supply to small hydraulic motor for cable reel tensioning and spooling;
4. The pressure compensated reservoir will accommodate changes in system volume due to hydraulic cylinder movement. The max cylinder displaced volume is =725 cm$^3$ (3 ea. 12" stroke×2.5" bore×1.25" rod cylinders). The provided pressure compensator will allow for 1.2 liters of displaced fluid;
5. Cylinders and wheel motors will not be used simultaneously;
6. a Bio Oil is used (unit will operate in freshwater supply tunnel in exemplary embodiments);
7. Manual function control for diver operation on unit;
8. HPU and main frame will fit through a 7 ft ID shaft opening (or a 6 ft ID shaft opening is also possible with dimensional modifications made to the carrier assembly) assembled or be able to be connected under water; and
9. Auxiliary power and connections for diver operated hand tools. The tools are expected to have a continuous power draw of 8 GPM @2000 psi. The tools will not be used in conjunction with the hydraulic wheel motors. Tools may need to be permanently plumbed to the vehicle.

The provided HPU 120 is designed for use for contemplated loads and in an underwater environment. The example selected HPU 120 contains the hydraulic pump 124 such as a swashplate pump in an exemplary embodiment that will maintain a set system pressure.

A high-quality bio-oil hydraulic oil will be used in the system 120. Cylinders used in the system typically are factory-filled with this type of oil on delivery. The intent of using bio-oil will be to help minimize the effect of any potential spills. The oil will need to meet any local or Environmental Protection Agency (EPA) standards and NSF61. NSF-61 helps prevent issues by ensuring that all components of a water system are certified safe for contact with potable water, preserving the quality and safety of drinking water.

In the example underwater carrier assembly 10 described herein, the volume of the reservoir or tank will be 10 liters and the volume of the pressure compensator will be 1.2 liters. The total system volume is expected to be less than 20 liters. When the cylinders are in their outer position the volume of the piston rod is replaced by oil and the 1.2-liter compensator with contract. For 3 cylinders the total potential volume change is 725 cm$^3$.

The pressure compensator contains internal springs. The springs used pressurize the compensator and oil system above the ambient pressure and are located inside the oil chamber, thus removing the risk of corrosion and change of springs properties. The compensators are designed with multiple springs and can be configured for different preload pressures. The rubber bellows are robust and made from 5 mm thick reinforced rubber. The fast response time of the compensator protects the hydraulic pump from cavitation and resulting in life extension of the pump.

Once the HPU 120 is powered on, the carrier assembly 10 will be controlled by hand operated spool valves located in the operator station 28 on the carrier assembly 10. Functions will be selected by manual spool valves mounted in a protected location and configured and arranged for operation as follows:
    ALL: ALL CYLINDERS EXTEND/RETRACT;
    1. LEFT CYLINDERS EXTEND/RETRACT;
    2. TOP CYLINDERS EXTEND/RETRACT;
    3. RIGHT CYLINDERS EXTEND/RETRACT; and
    4. BOTTOM CYLINDERS EXTEND/RETRACT.

Additional aspects of the electrical power supply mechanism are described below. The example underwater carrier assembly 10 will include the below electronics, with the assumption that 480V 60 Hz power will be present on site:
1. Shore side isolation transformer;
2. 1000 ft capacity submerged electric power supply cable 130 and cable reel with voltage and current capacity to match the subsea hydraulic power unit (SHPU) 120;
3. 20 ms response time rotating control device (RCD) or line insulation monitor (LIM) with circuit breaker;
4. Carrier Dry box with DC converter and battery storage for 12 v or 24 v LED lighting; and
5. Cable reel 132 and chassis assembly 12 must fit through 6 ft ID shaft opening assembled or be able to be connected under water.

For safety and to aid in the prevention of galvanic corrosion, an isolation transformer and LIM (Line Insulation Monitor) may be used. If used, the isolation transformer eliminates any electrical continuity between AC line power and the pipe carrier assembly 10. Within the isolated circuit, the LIM continuously monitors the integrity of the insulation between the live conductors and an earth return circuit. It will give a read out on the insulation value and trigger an alarm or cut out the device should the value fall below a set level. Using the values contained in IMCAD045, the following have been established as voltage levels for the equipment that should provide the necessary level of safety for the operator divers.

The example underwater carrier assembly 10 is outfitted with the 1000 ft. electric supply cable umbilical 130, or 1,148 ft. electrical supply cable umbilical 130. The umbilical cable 130 will be mounted on the chassis assembly 12 via the cable reel 132 or spool member 132 with capacity and guidance to handle the total line length. Mounting the reel 132 on the chassis assembly 12 was chosen to minimize line drag and potential entanglement with the operator diver's umbilical. The cable reel 132 will use hydraulics to automatically tension the cable 130 and spool the cable 130 on return travel of the carrier assembly 10. The reel 132 will use a weighted cable 130 so that it rests in the invert of the legacy pipe. The cable will be a typical 5 wire 3 phase line connected to a submersible slip ring.

It is understood that the chassis assembly 12 has storage bins for various tools and supplies for operator divers. The chassis assembly 12 further supports reserve air tanks for operator divers in cases of emergency. The hydraulic power unit 120 also has additional supply ports in manifold structures wherein additional hydraulic tools can be operably connected thereto by operator divers to assist in repair of the legacy pipe.

FIGS. 37-47 disclose operation of the carrier assembly 10 in the repair of the legacy pipe water main in situ.

As can be appreciated from the Figures, the example carrier assembly 10 is intended to be submerged in a freshwater environment such as in a water supply system. All systems on the example underwater carrier assembly 10 are configured to function with the below-listed conditions:
1. The underwater carrier assembly 10 will be submerged for up to 6 months at a time or more with minimal to no component servicing;
2. Water pressure—3 Bar;
3. Water flow rate—up to 4 ft/s (2 ft per second during operation);
4. Water temperature: 36 to 39° F. (or 33 to 80° F. fluid in other environments); and
5. Water is typically fresh water but may be submersible in other fluids with appropriate precautions and/or more frequent servicing.

Before commencing a repair operation of the legacy pipe, the carrier assembly 10 is prepared for operation in the legacy pipe. Because the carrier assembly 10 can be used in the legacy pipe during operation of the water supply system, the carrier assembly 10 is inserted into the legacy pipe in separate modular sections and connected together underwater by operator divers. It is understood that a crew of operator divers are employed in the operation of the carrier assembly 10. Multiple operator divers may be used to connect the components of the carrier assembly 10 in the legacy pipe. In the repair of the legacy pipe, for example, an operator diver may be positioned on the operator station on the chassis assembly with an additional pair of operator divers positioned proximate a front end of the carrier assembly. Additional operator divers could also be utilized.

As shown in the Figures, the example carrier assembly 10 is of a forklift style design. The pipe segments forming pipe rings will be carried on one side of the machine, which maximizes workspace and minimizes machine complexity. This also allows for the underwater carrier assembly 10 to be easily split into multiple modules or sections, such as five sections, that can be lowered through a 7 ft diameter access shaft. As shown in FIG. 14, an access shaft 3 is formed by operators at a desired location in the water main legacy pipe 2 of the water supply system 1. Final assembly of the carrier assembly 10 takes place under water.

Figure 16:
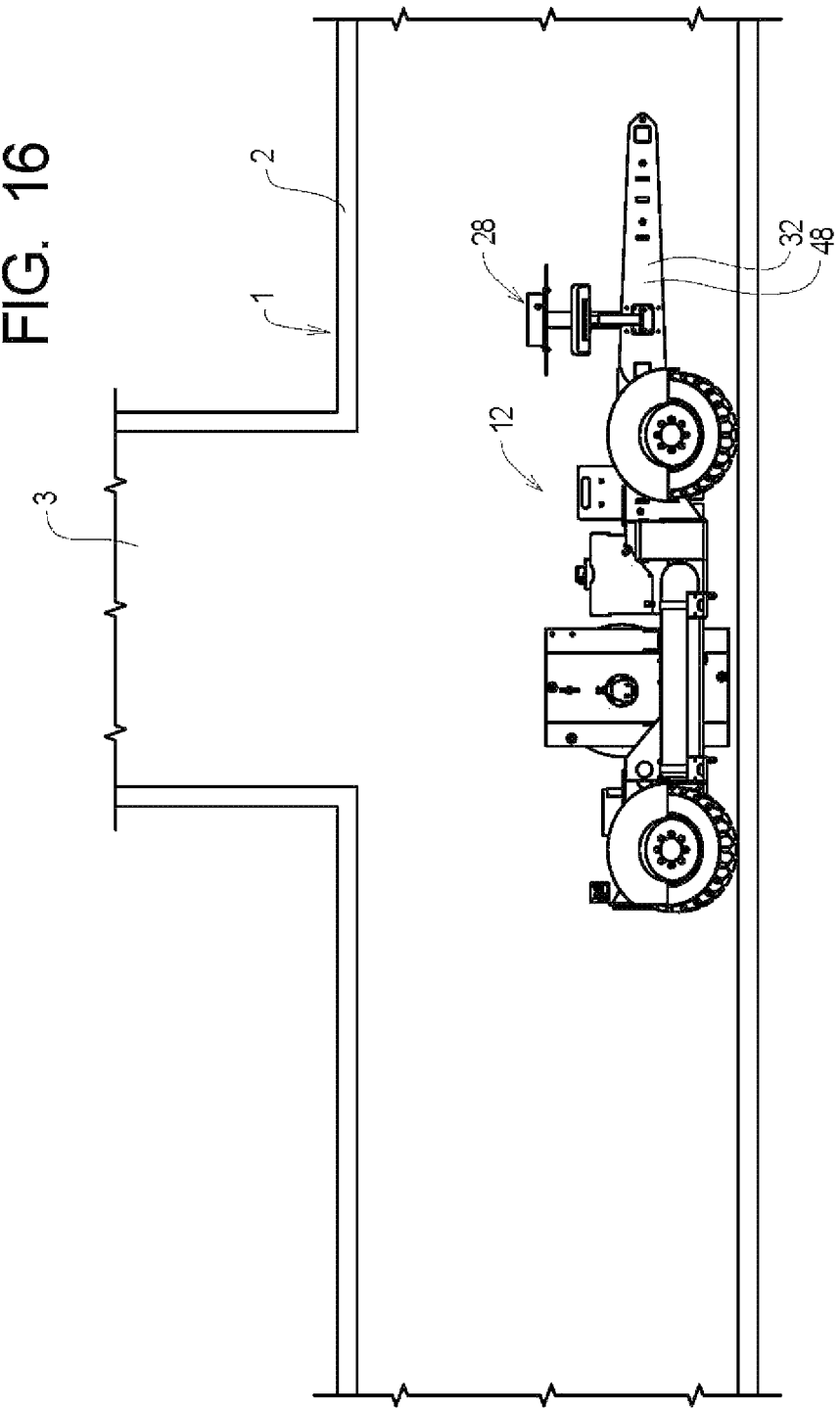
Figure 17:
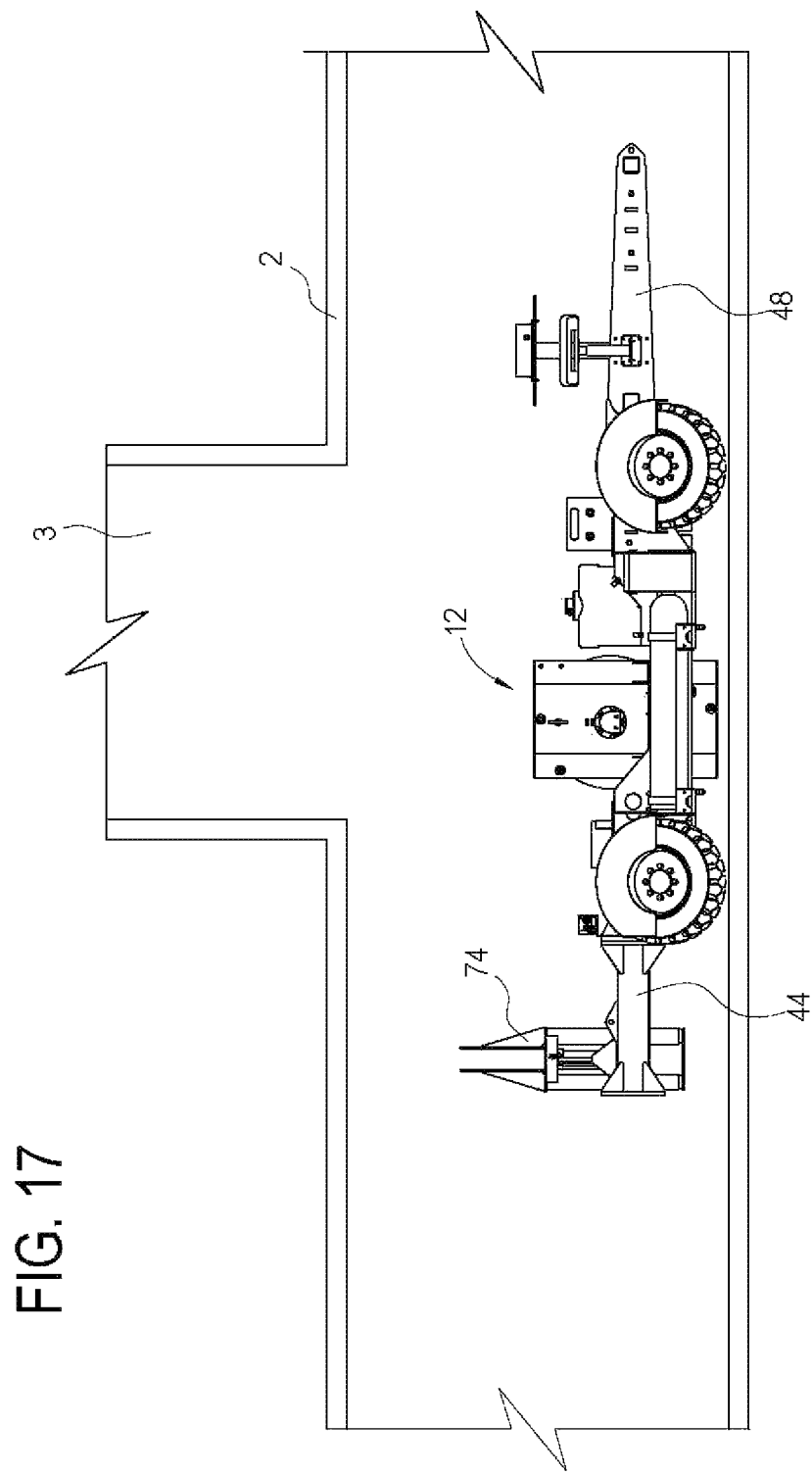
Figure 18:
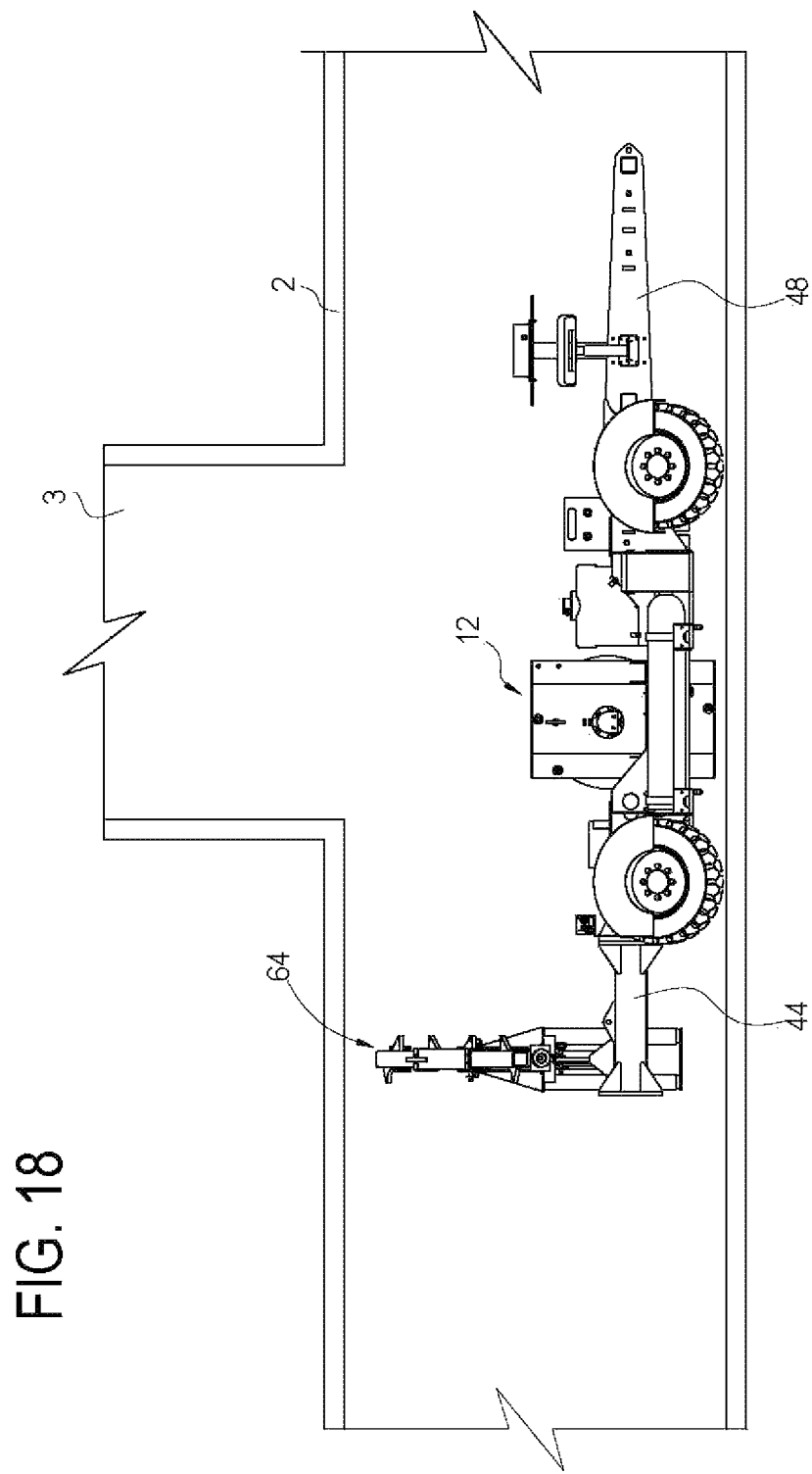
Figure 19:
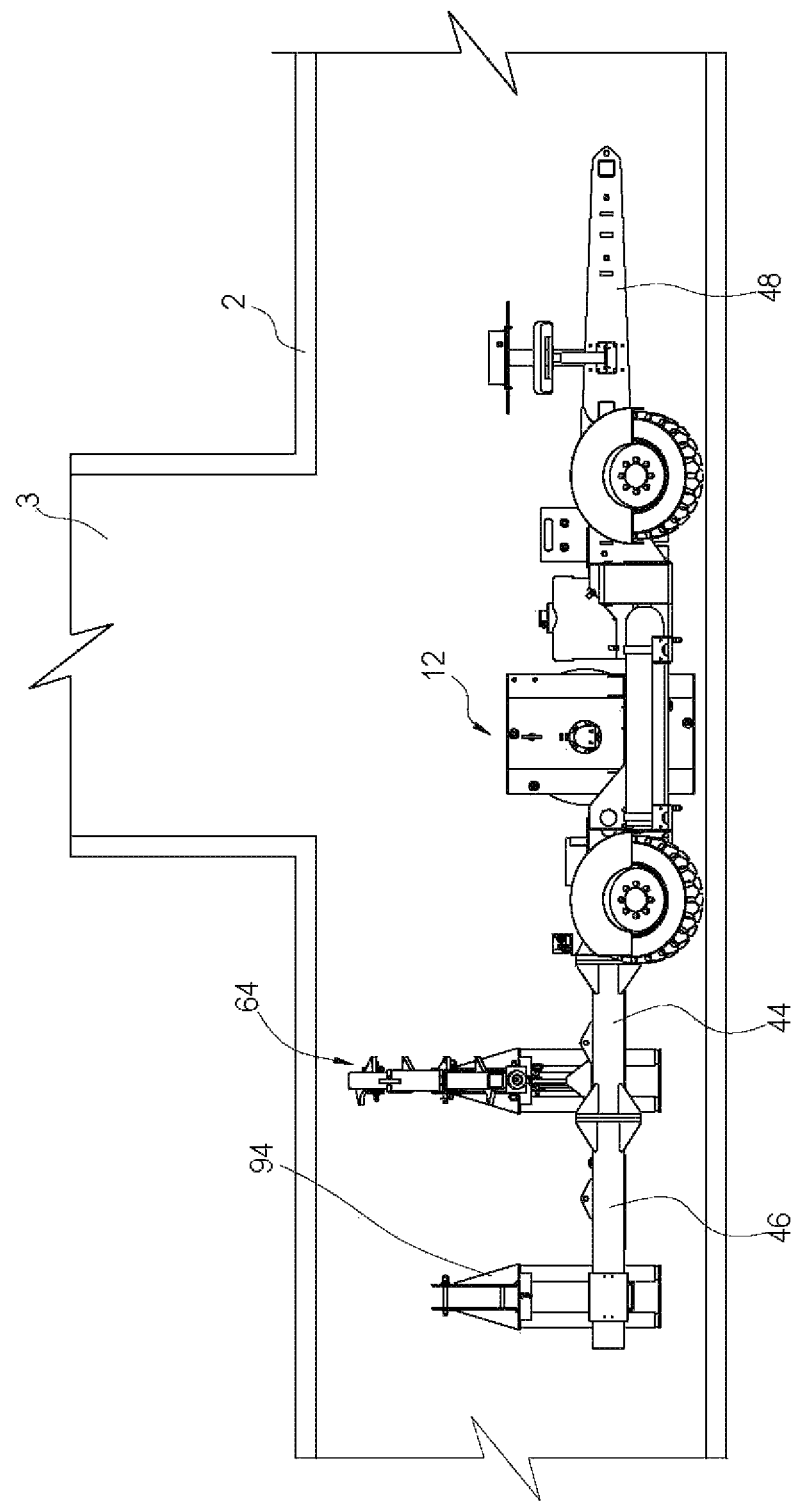
Figure 20:
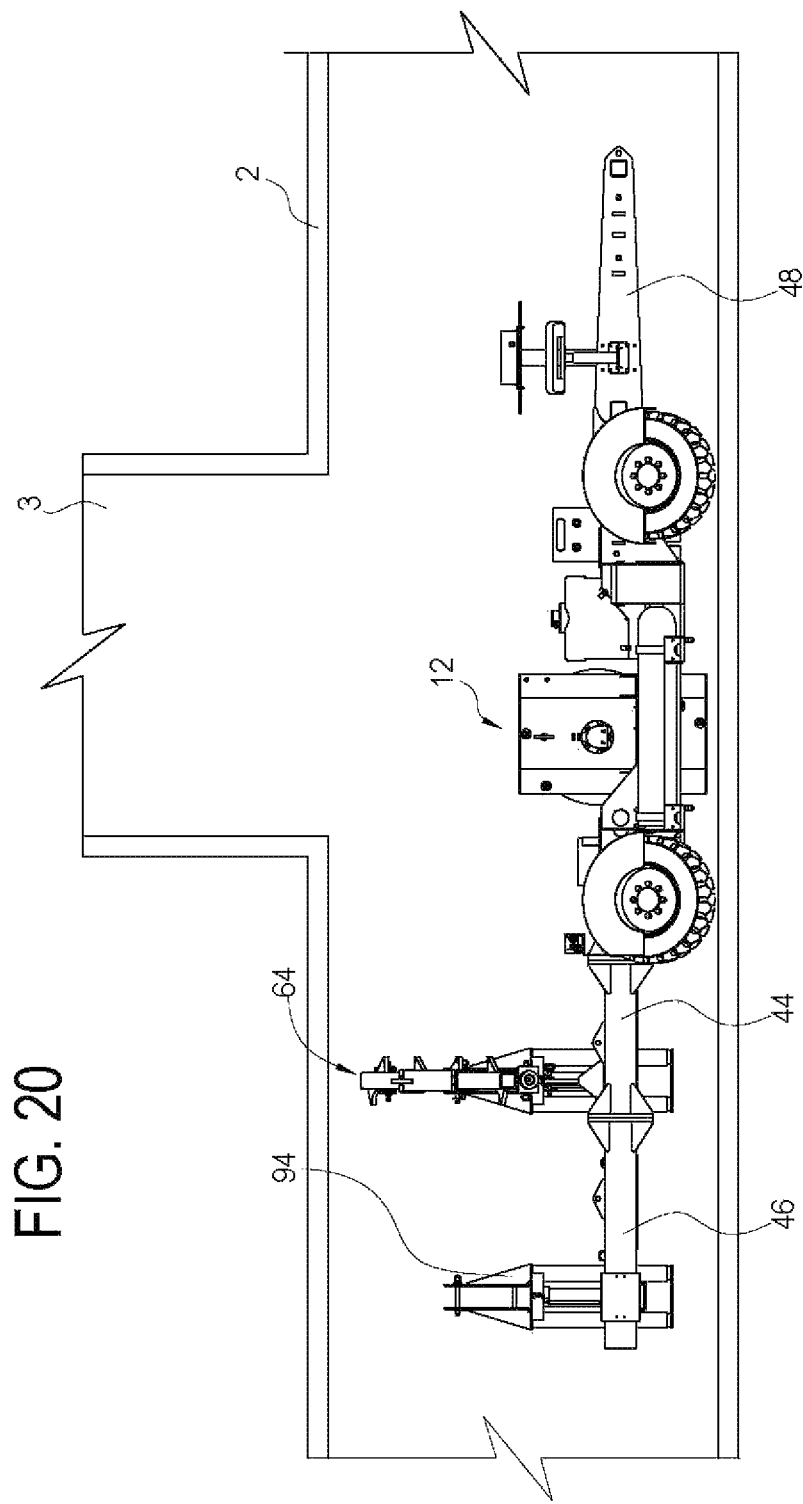
Figure 21:
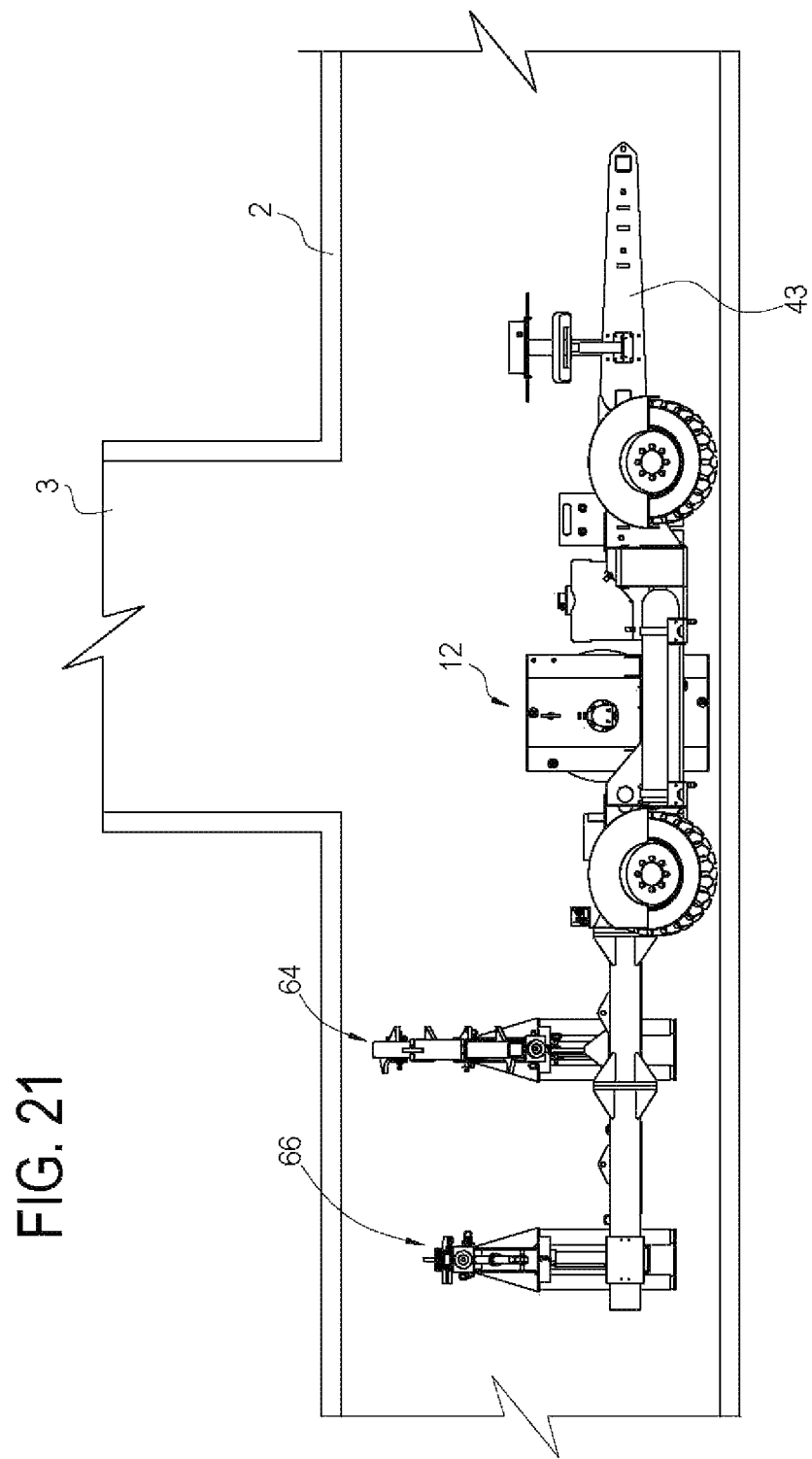
Figure 22:
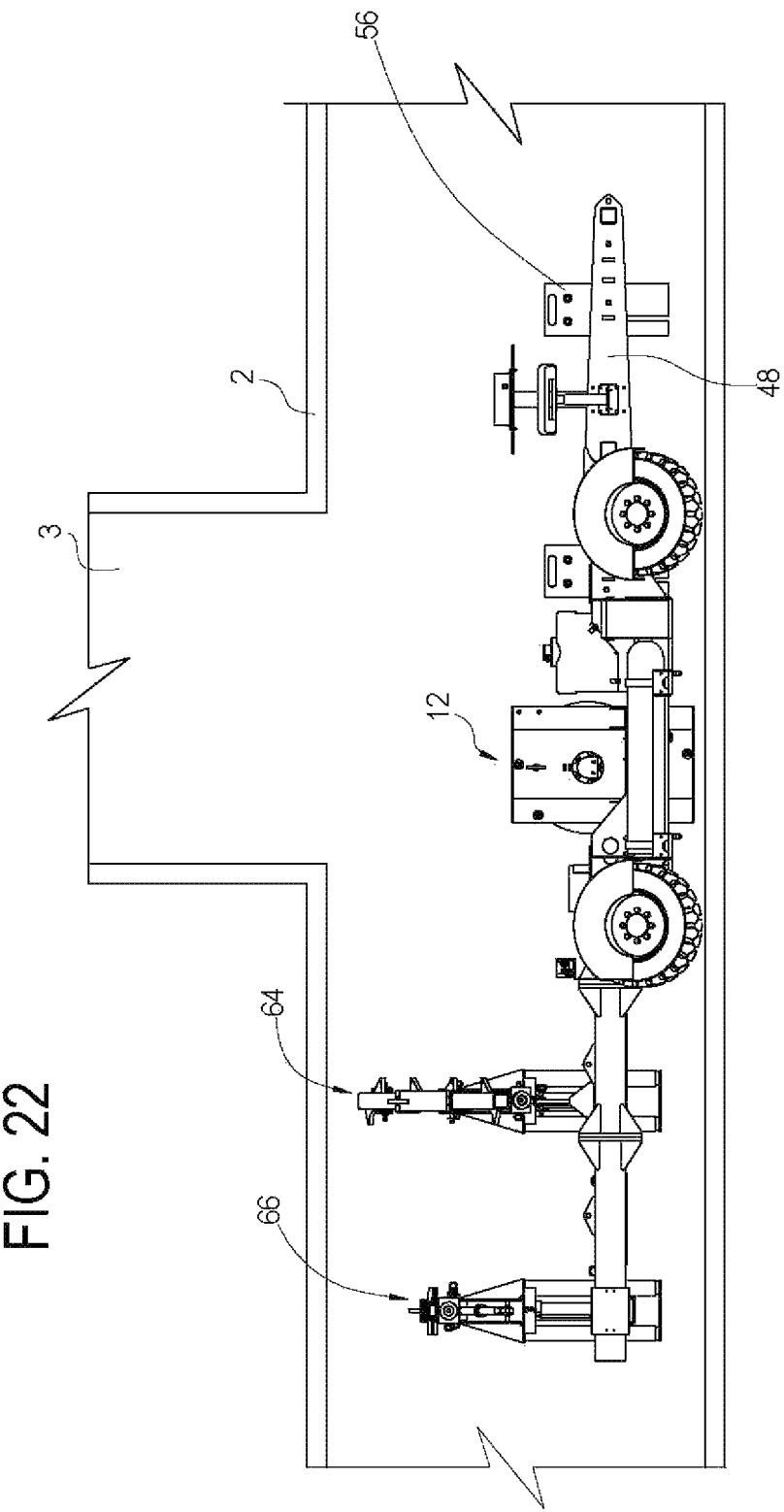
Figure 23:
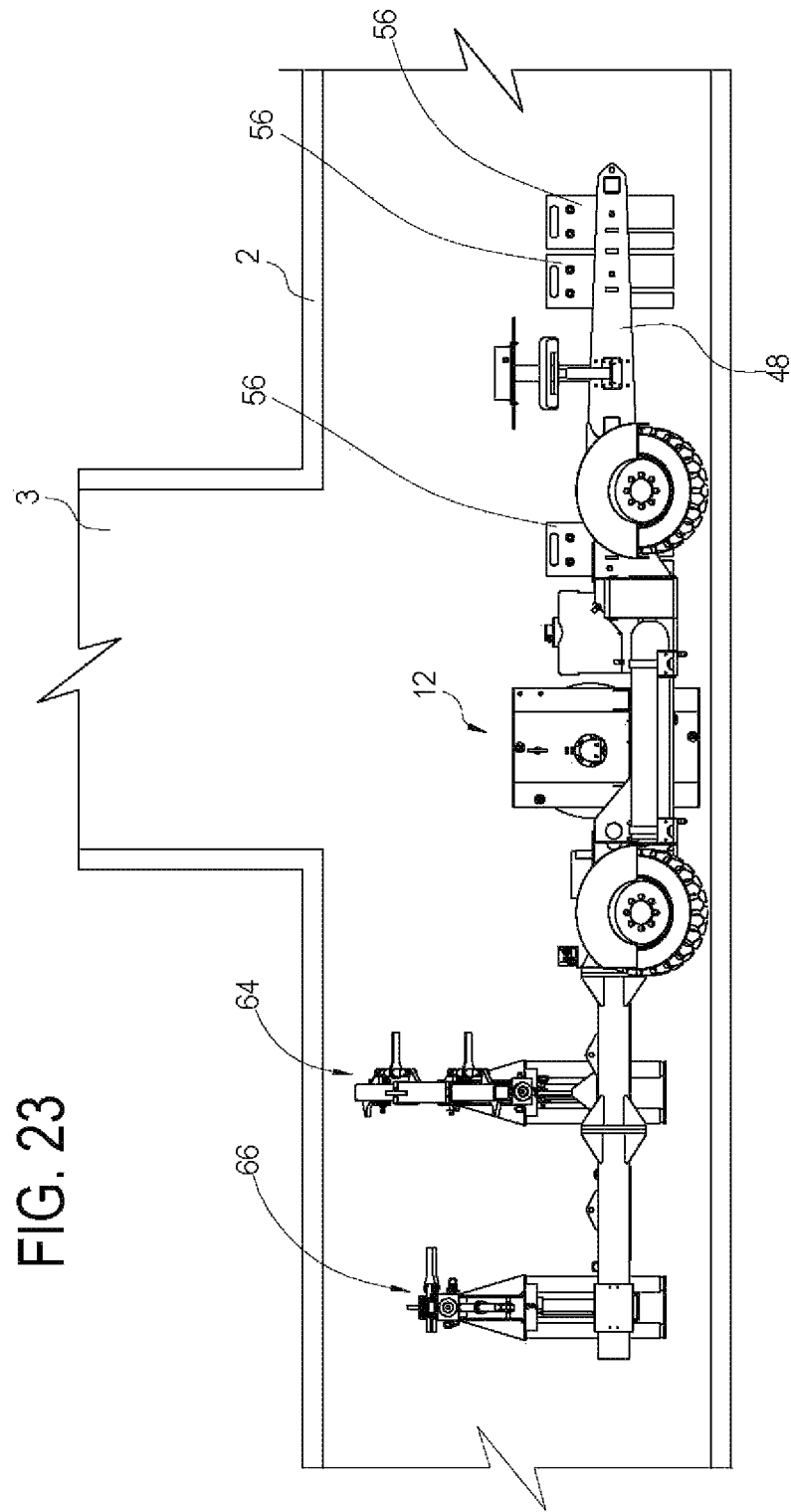

As shown in FIGS. 14-23, the carrier assembly 10 is typically assembled underwater in 5 discrete component groups. First, and as shown in FIG. 14, the main body, or chassis assembly 12, and hydraulic and electrical components will be lowered down the access shaft. It is understood that the hydraulic power unit 120 may be initially connected to the central portion of the chassis assembly 12. The electrical power cable 130 mounted on the spool member 132 can also be operably connected to the chassis assembly 12. One group of weighted members 56 of the counterweight system 22 may also be connected to the chassis assembly 12 more proximate to the distal ends of the elongated frame members 30, 32. It is understood that the elongated frame members 30, 32 of the chassis assembly may be split into connectable sections (e.g., the front segments and rear segments), which assists modularity and inserting the components through the access shaft. As shown in FIG. 15, the rear segments of the elongated members 30, 32 are lowered through the access shaft 3 and connected to the central section of the chassis assembly 12. Additional portions of the operator station 28 may also be connected to the chassis assembly such as shown in FIG. 16. Next, the stationary first support arm assembly 64 is lowered down the access shaft 3 with the first front segments 36, 44 and bolted on to the main body frame or chassis assembly 12 as shown in FIGS. 17-18. Next, the moveable second support arm assembly 66 and second front segments 38, 46 are lowered down the access shaft 3 and bolted on to the chassis assembly 12 as shown in FIGS. 19-21. With the connections of the first and second support arm assemblies, the additional segments of the elongated frame members are connected to the central portion of the chassis assembly. As shown in FIGS. 22-23, the counterweight members 56 are installed on the chassis assembly 12. As discussed above, the total counterweight is roughly 4000 lbs. in total and will be broken up into 36 "suitcase" style weights 56 that can be picked up and installed by the operator divers. Finally, any other miscellaneous components can be mounted onto the carrier assembly 10. It is understood that the necessary hydraulic and electrical connections are made for suitable operation of the carrier assembly 10. Thus, the carrier assembly 10 can be powered on to commence legacy pipe repair.

The example underwater carrier assembly can further function as a tunnel cleanout platform. Prior to the installation of repair pipe rings, the tunnel must be cleaned out. To facilitate this a platform can be bolted to the front forks so the placer can carry divers operating a water sprayer.

Figure 33:
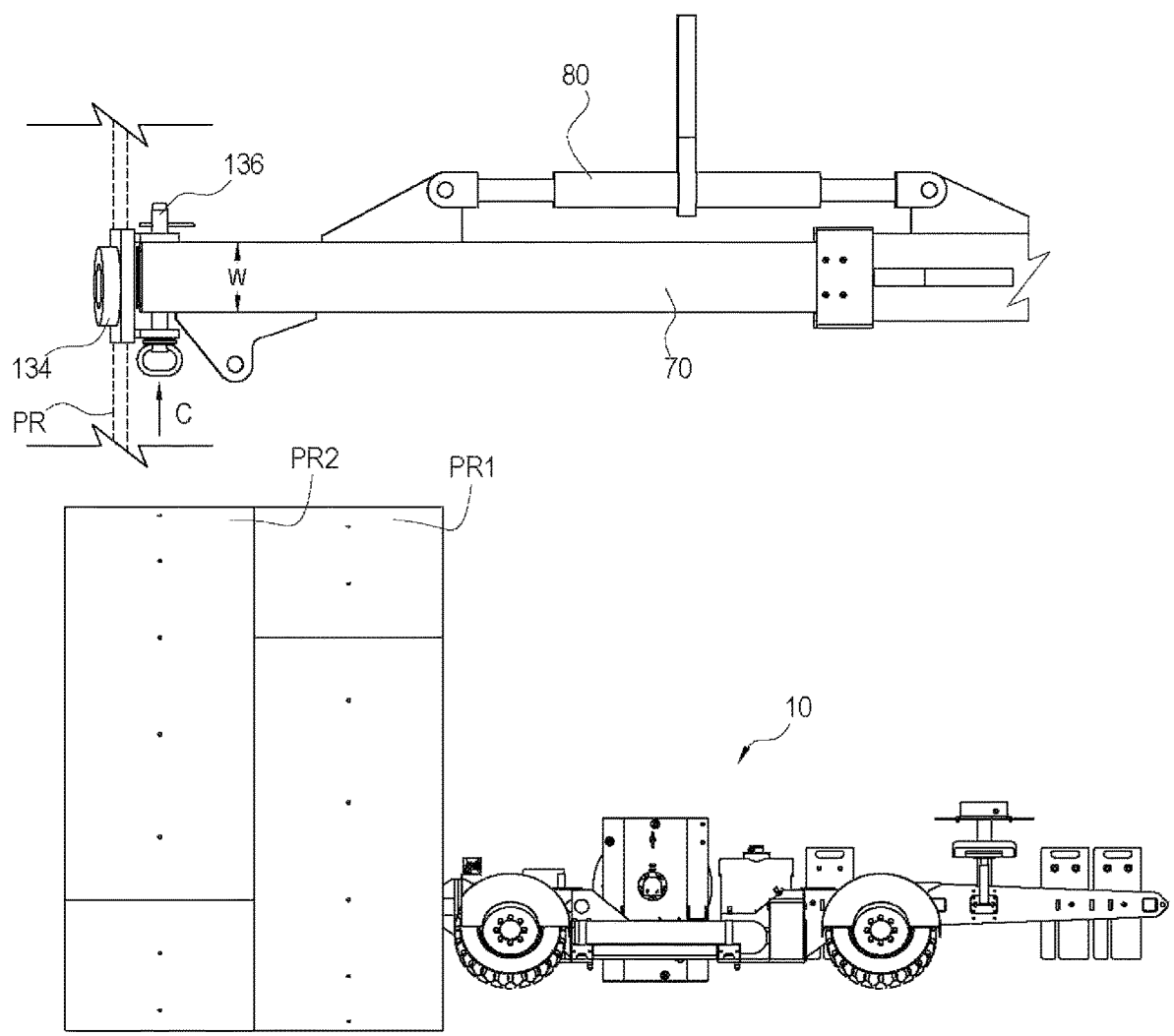
FIGS. 33-34 are side elevation views of the carrier assembly engaged with pipe rings and top plan views of an end of a support arm showing connection members for the pipe ring that allow for additional movement of the pipe ring.
Figure 34:
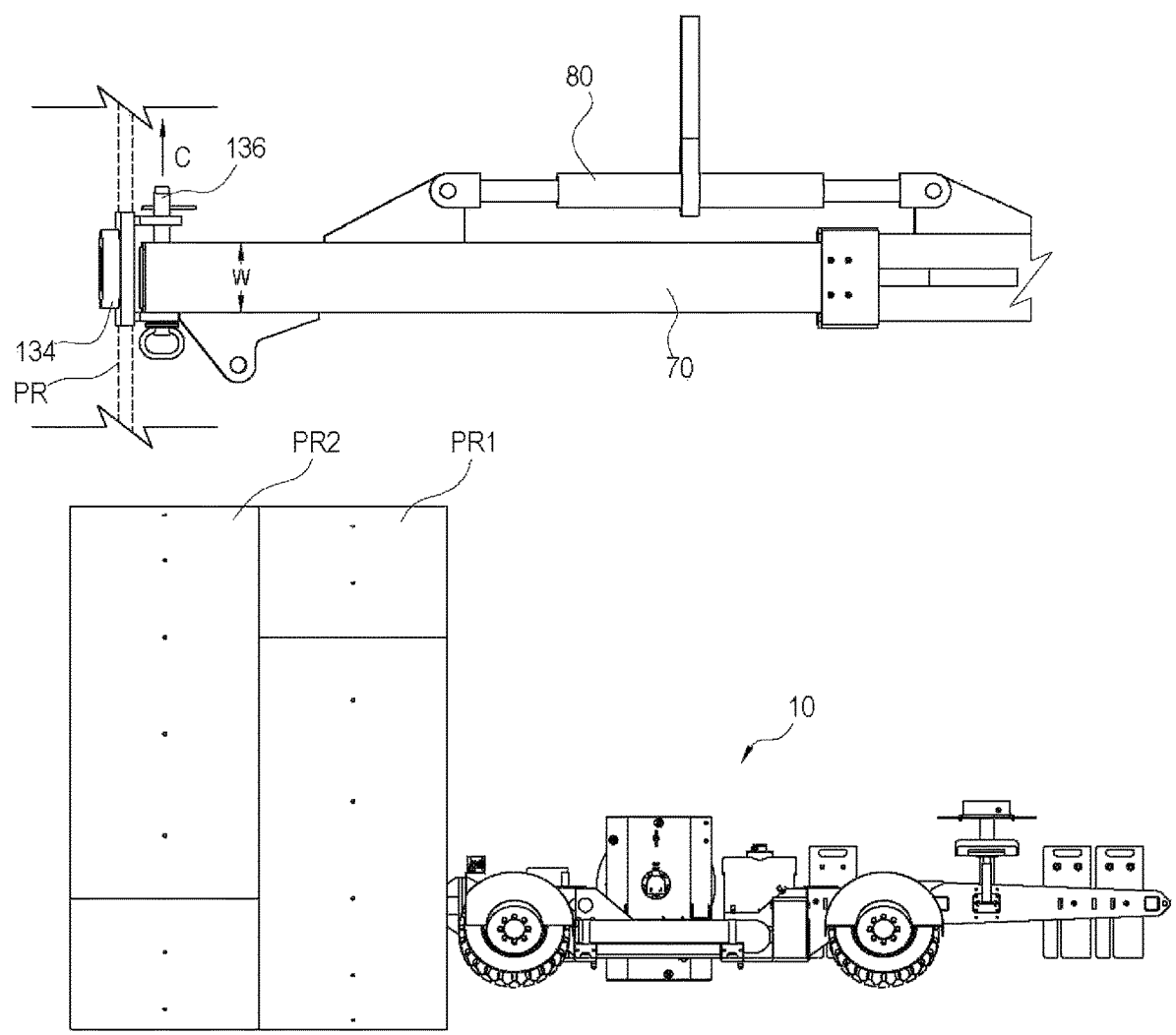

As described in greater detail below, the carrier assembly 10 is used to manipulate, displace and install pipe rings constructed from a plurality of pipe segments in the legacy pipe of a water supply system. FIG. 7 illustrates pipe ring attachment to the carrier assembly. The connection is in the form of a clevis-type attachment member. The operator diver will attach to the steel pipe rings using detachable adapters that will be bolted to the jacking screw ports of the steel pipe rings with ¾ inch fasteners, then pinned to the carrier assembly 10, and in particular to the opposed distal ends of the first support arm 70 and the second support arm 90. These adapters will be removed from the steel pipe rings after final placement in the legacy pipe. The adapters may also be attached to the steel pipe ring segments prior to lowering the segments into the pipe to offload work from the operator divers. The support arms 70, 90 can be configured to attach to 11 ft. Sin rings or 9 ft. Sin pipe rings. FIGS. 33-34 disclose the above-described connection between the pipe ring and support arm 70, 90. The detachable adapter 134 has a dowel member that engages the pipe ring PR and passes through the grout port of the steel pipe ring PR and positioned into the connection structure associated with the support arm 70, 90. A connection pin 136 passes through openings in the connection structure and also an opening in the dowel member to connect the pipe ring PR to the support arm 70, 90. Thus, the cooperative openings in the connection structure and the adapter dowel member are aligned to receive the connection pin 136. As further shown in FIGS. 33-34, the connection pin 136 has a length that is dimensioned longer than a width "w" of the support arm 70, 90. The additional dimensioned length provides for an amount of "play" where the connection pin 136 can travel linearly through the connection structure of the support arm 70, 90. With the pipe ring PR connected thereto, this allows for an additional linear movement of the pipe ring PR during repair operations represented by the arrow C in FIGS. 33-34. This "play" or slight linear movement is dimensioned to be approximately 4 inches in an exemplary embodiment.

The example underwater carrier assembly 10 further allows adjustment of pipe sections as described in FIGS. 37-47. In particular, the pipe carrier assembly 10 can be configured to pick up, adjust, and place fully assembled pipe rings. The adjustments will include picking the pipe ring up vertically with 10 in, total travel capability. The carrier assembly 10 will also have the capability of horizontal side shift and pipe ovality control with 10 in. of combined movement (5 in, in each direction). The carrier assembly 10 will also be able to roll segments/pipe rings up to 60 deg relative to a starting position. The moveable second support arm assembly will be able to move axially 10 in, so that two pipe rings may be combined on the pipe carrier assembly as described below.

FIGS. 37-47 further disclose operation of the carrier assembly 10 in the repair of legacy pipe 2 in the water supply system 1. As discussed, legacy pipe 2 in water supply systems 1 experience degradation and deterioration over time causing leaks to the system 1. The carrier assembly 10 of the present invention, assembled in the legacy pipe as described above, can be used to repair such legacy pipe 2.

Figure 26:
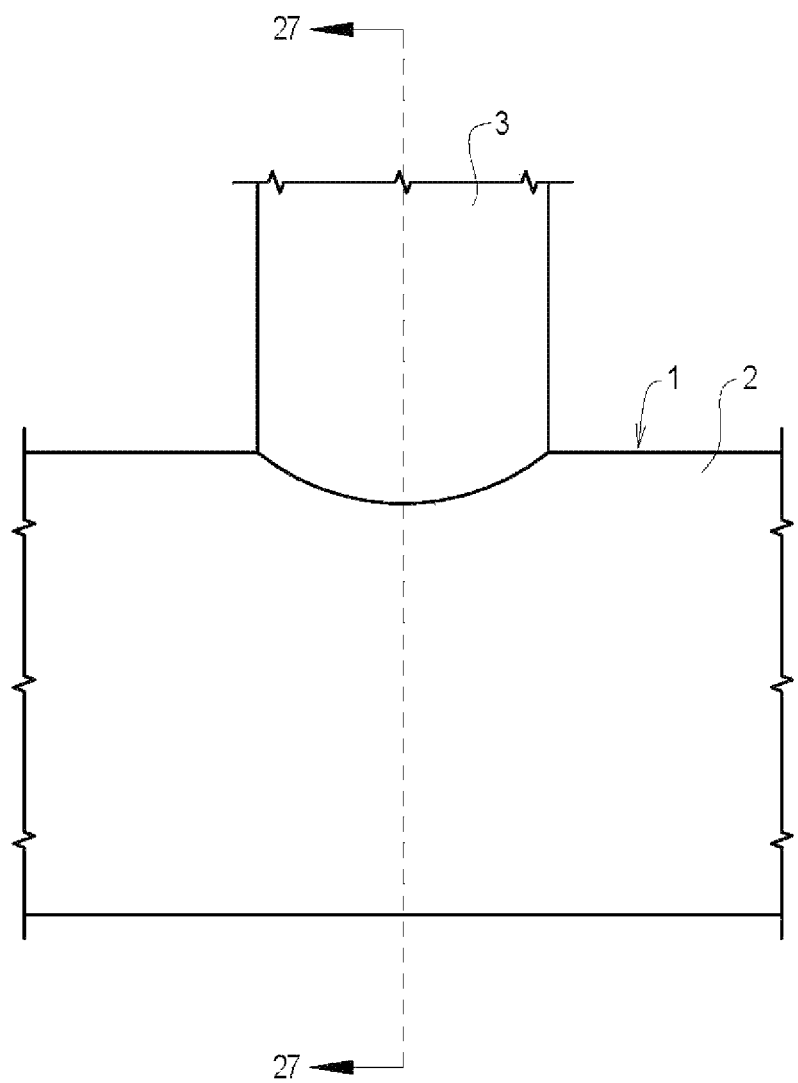
FIGS. 26-30 are partial schematic and cross-sectional views of the legacy pipe of the water supply system and showing pipe segments constructed to form a pipe ring.
Figure 27:
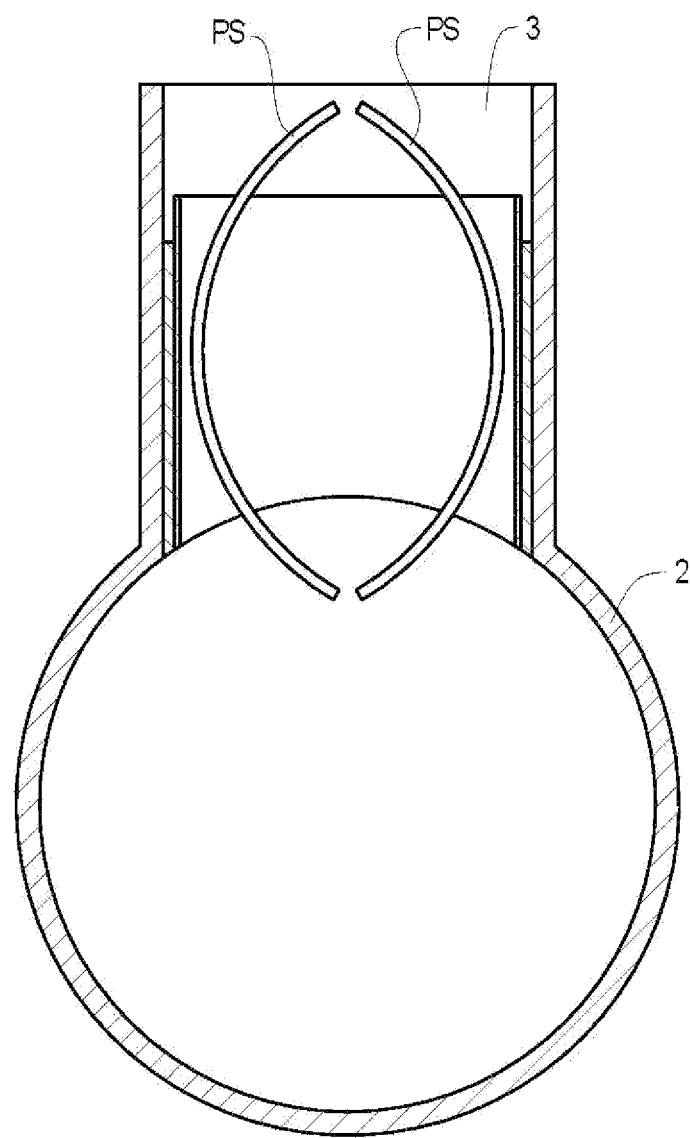
Figure 28:
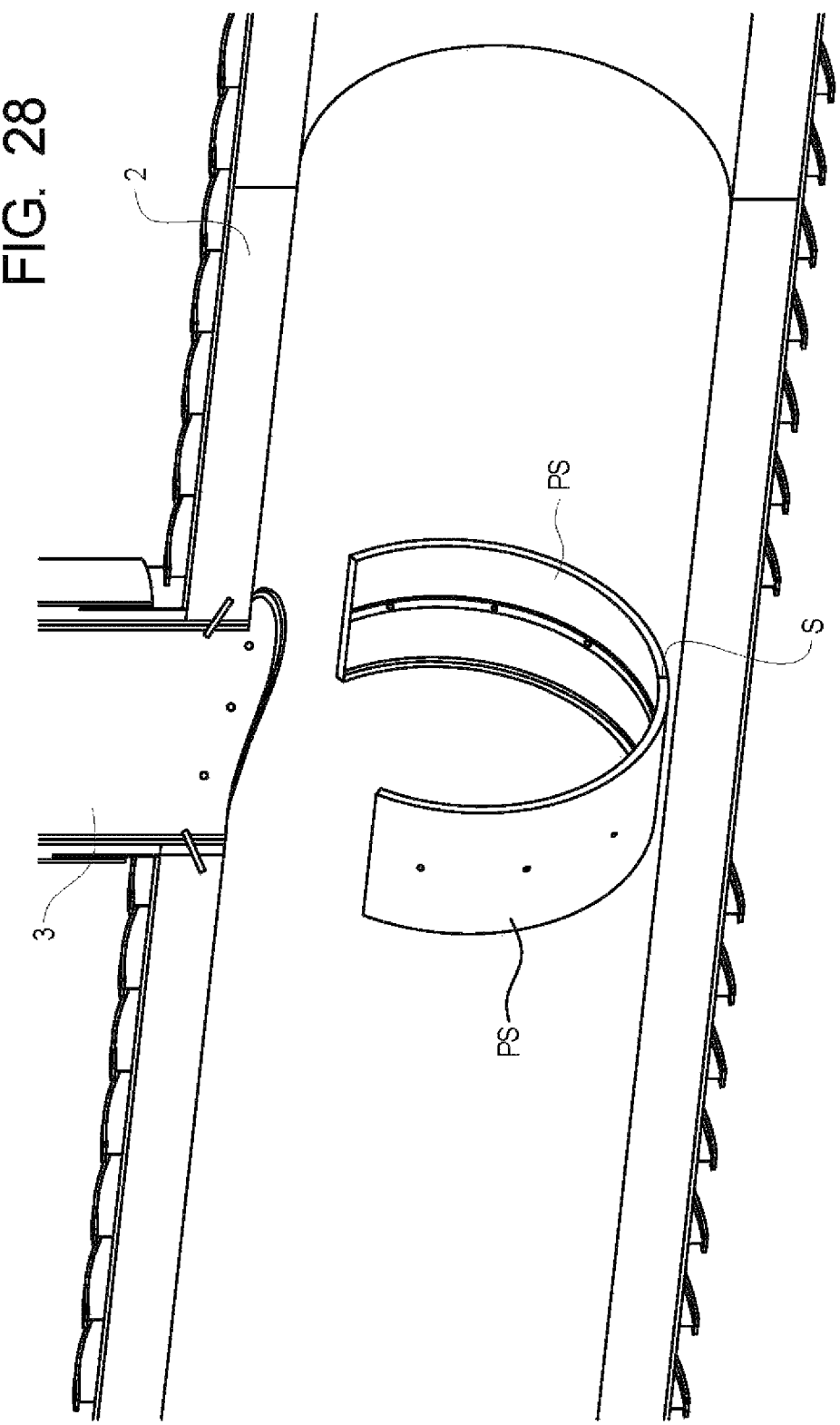
Figure 29:
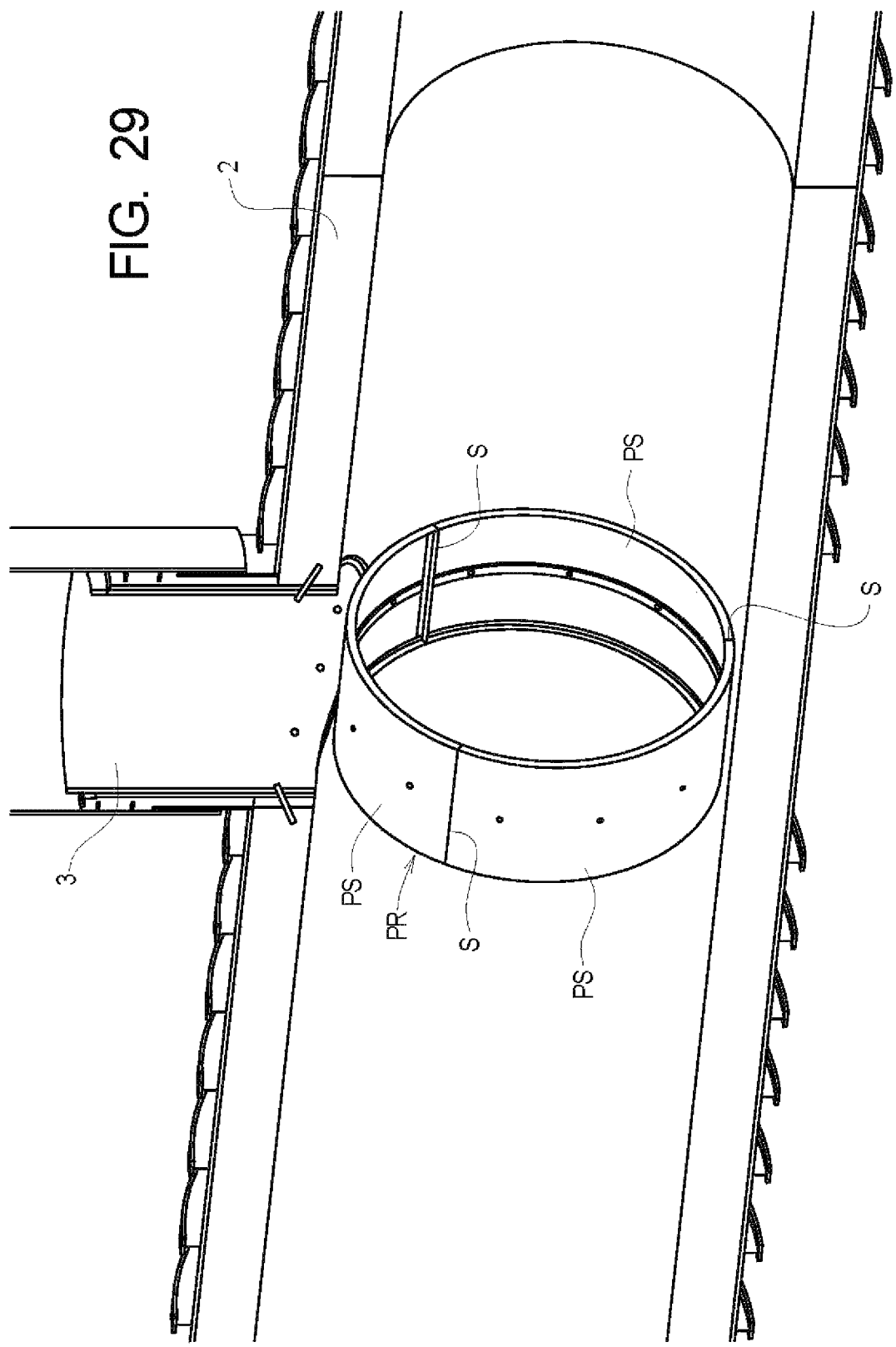
Figure 30:
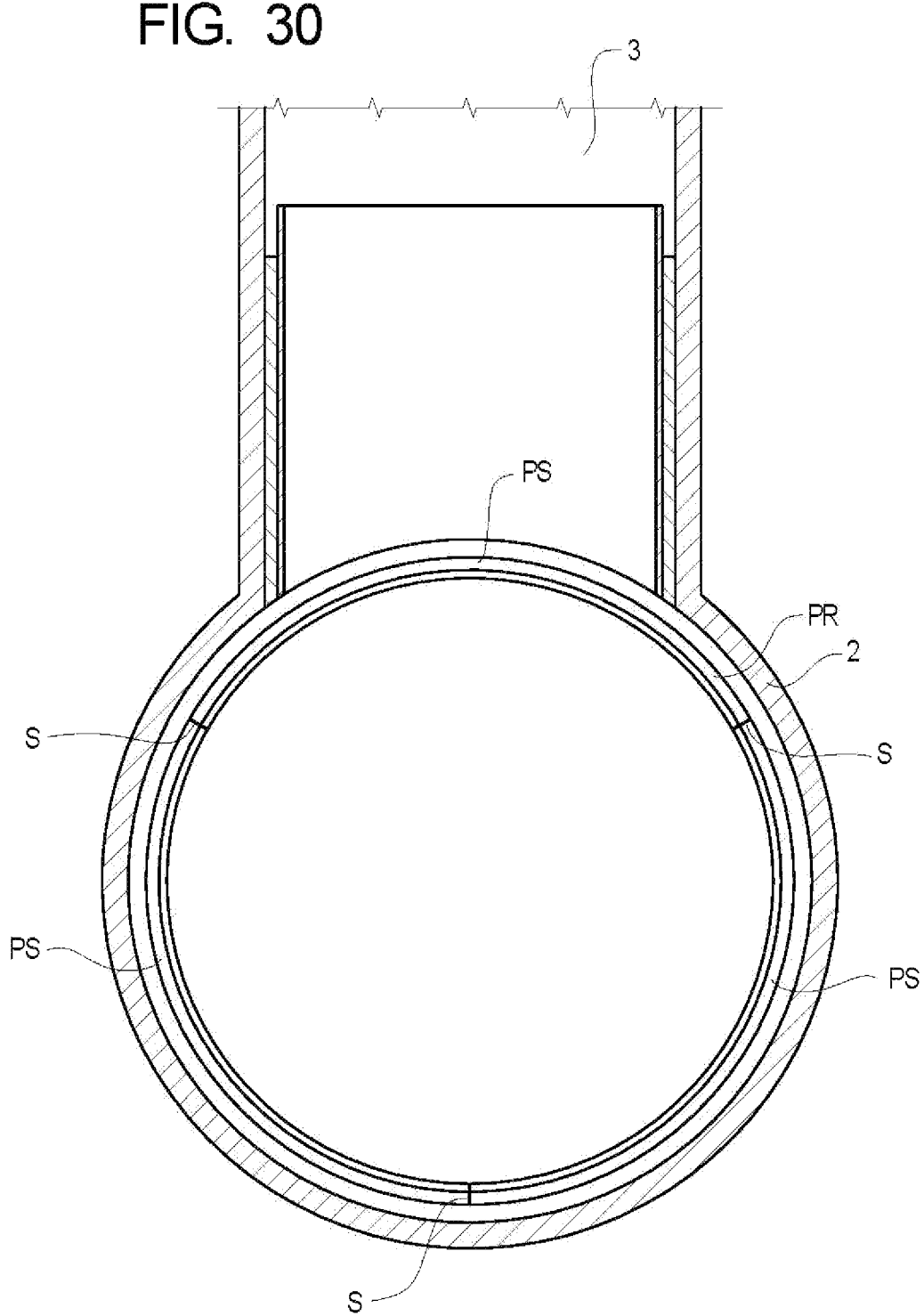

FIG. 26 shows a partial view of the legacy pipe 2 of the water supply system 1 wherein the access port 3 has been constructed into the pipe 2. In an initial step as shown in FIG. 27, a plurality of stainless steel pipe segments PS are inserted or lowered into the legacy pipe 2 through the same access port 3 used to insert the carrier assembly 10 into the legacy pipe 2. It is understood that overhead cranes located above ground are used to lower the pipe segments PS via slings and other components. In an exemplary embodiment, the pipe segments PS have a curved or curvilinear configuration. As can be appreciated from FIGS. 28-30, operator divers receive and connect together, via bolted connections, three pipe segments PS to form a pipe ring PR. The operator divers, having suitable diving equipment to be located in the legacy pipe over extended periods of time, initially manipulate the lowered pipe segments PS and connect the pipe segments PS together via suitable fasteners known in the art to form the pipe ring PR. The pipe ring PR is an annular member having a diameter slightly less than the diameter of the legacy pipe. Pipe ring seams S are defined on the pipe ring PR at the interfaces between connected pipe segments.

Figure 38:
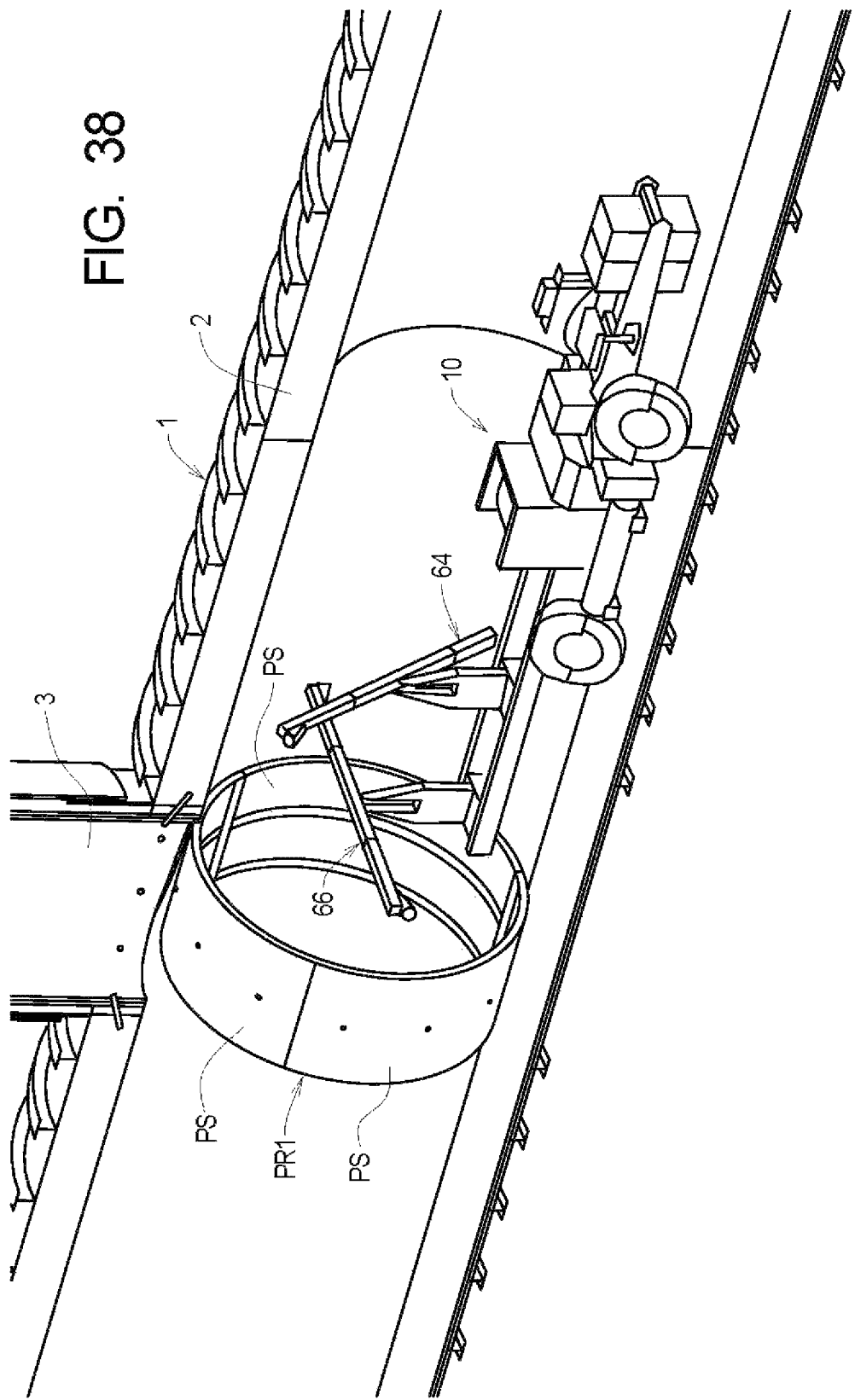
Figure 39:
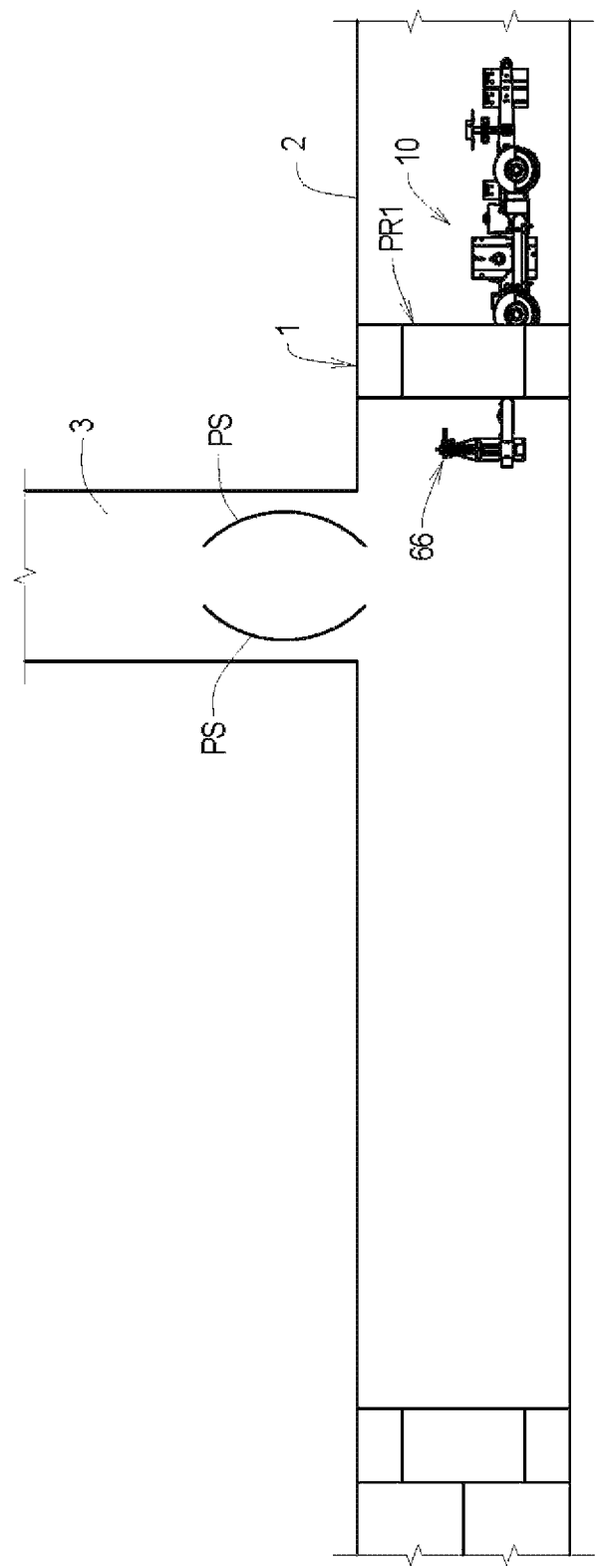

Once the operator divers form the first pipe ring PR, the operator diver that drives the carrier assembly 10, positions the carrier assembly 10 proximate the first pipe ring PR1 (FIG. 38). The operator diver controls the carrier assembly wherein the first pipe support arm assembly 66 engages the first pipe ring PR1. In particular, the clevis-type connection elements on the distal ends of the first support arm 70 are operably connected to the first pipe ring, and as can be appreciated from FIGS. 33-34. It is understood that the additional operator divers of the operator crew assist in connecting the first support arm 70 to the first pipe ring PR1. Once connected, the operator diver actuates the first hydraulic cylinder 76 to lift the first pipe ring PR1 and drives carrier assembly 10 along the legacy pipe 2 downstream of the access port 3 in the legacy pipe 2 (FIG. 39).

Three additional pipe segments PS are lowered into the legacy pipe 2 and through the access port 3. Similar to the construction of the first pipe ring PR1, the operator divers manipulate the three additional pipe segments PS and connect the segments PS together to form a second pipe ring PR2, The pipe ring seams S are also formed in the interfaces between pipe ring segments PS forming the second pipe ring PR2.

Figure 40:
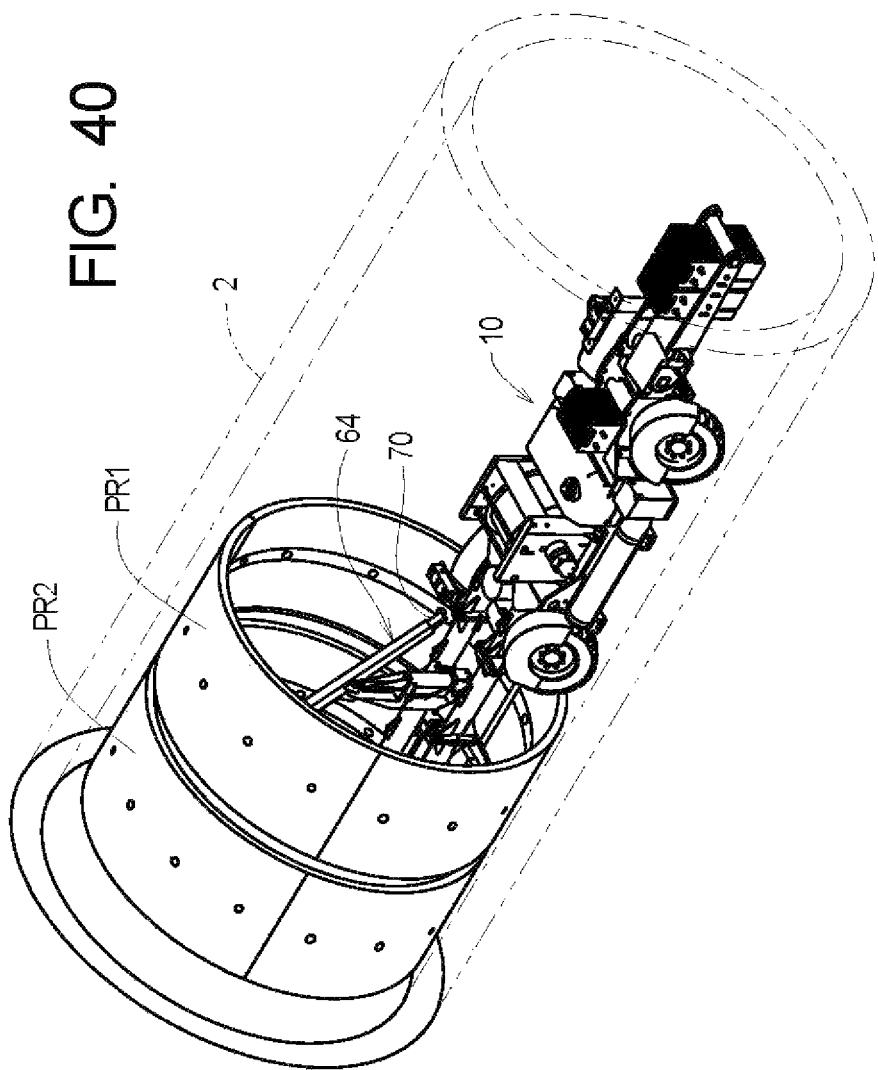

As shown in FIG. 40, upon forming the second pipe ring PR2, the operator diver drives the carrier assembly towards the second pipe ring PR2. The first pipe ring PR1 is transported along the legacy pipe 2 as the first pipe ring PR1 remains connected to the first support arm assembly 64. As further shown and appreciated from FIG. 40, the operator diver positions the carrier assembly 10 by the second pipe ring PR2 wherein the second support arm assembly 66 is positioned by the operator divers to engage and connect to the second pipe ring PR2 via the clevis connection members at distal ends of the second support arm 90. Now the carrier assembly 10 has the first support arm assembly 64 connected to the first pipe ring PR1 and the second support arm assembly 66 connected to the second pipe ring PR2. The movement capabilities of the carrier assembly 10 described above can now be used to displace and manipulate the first pipe ring PR1 and the second pipe ring PR2 with respect to one another.

Figure 41:
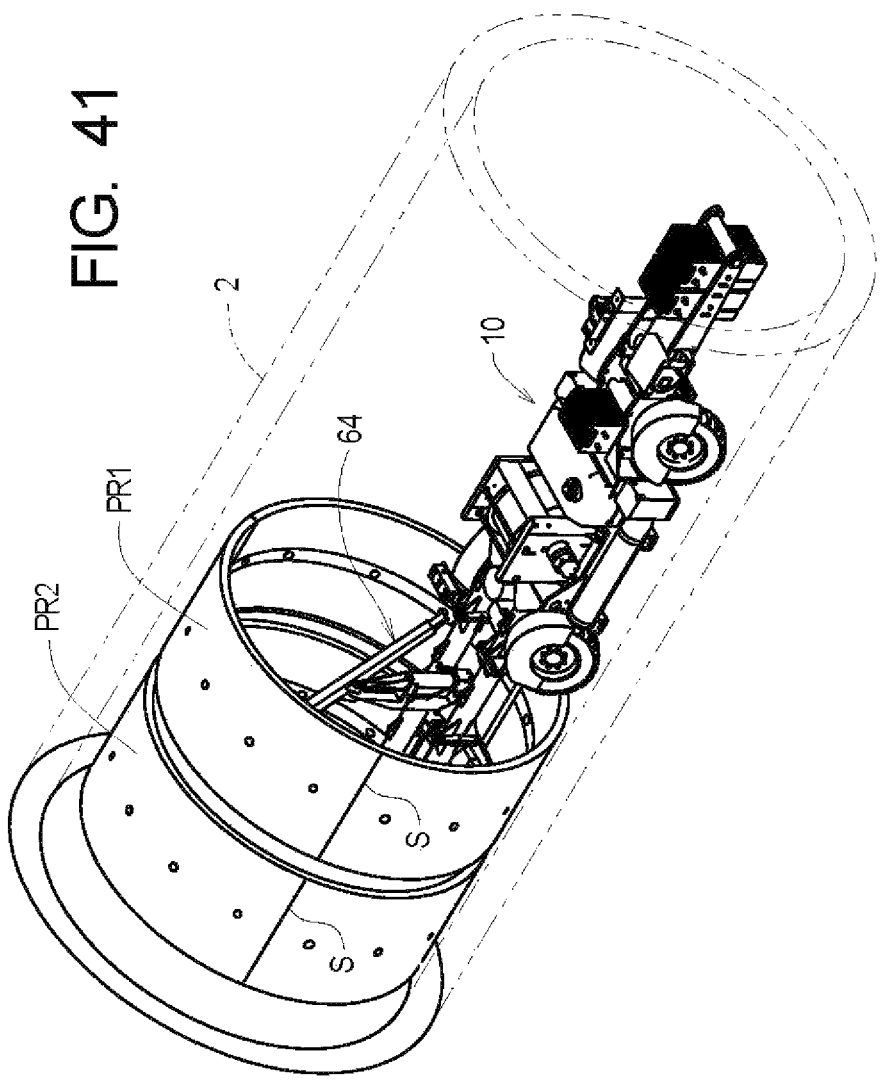
Figure 42:
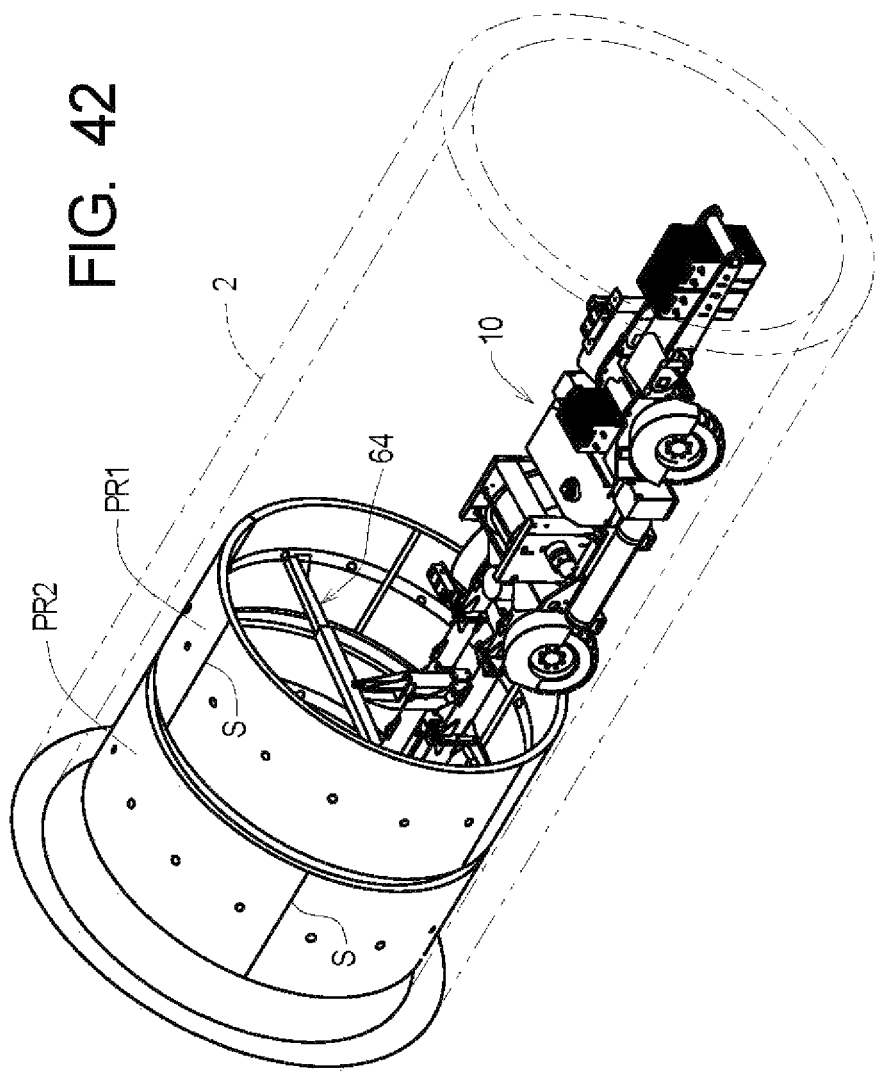

The operator diver can actuate the first hydraulic cylinder 76 and/or the second hydraulic cylinder 96 to place the first pipe ring PR1 and the second pipe ring PR2 at the same height. The operator divers in the crew can also use the first and second ratchet members 80, 82 on the first support arm 70 and the third and fourth ratchet members 100, 102 on the second support arm 90 to laterally move the first pipe ring PR1 and the second pipe ring PR2 with respect to one other to align the pipe rings (FIG. 41). FIG. 41 shows the respective seams S of the first pipe ring PR1 and the second pipe ring PR2 generally aligned. The operator divers use the first rotation ratchet member 86 and/or the second rotation ratchet member 106 to rotate the first pipe ring PR1 and/or the second pipe ring PR2 with respect to one another such that the respective pipe ring seams S of each pipe ring PR1, PR2 are misaligned or offset from one another such as shown in FIG. 42. In an exemplary embodiment, the respective pipe ring seams are offset 60° from one another, although other offset configurations are possible.

Figure 43:
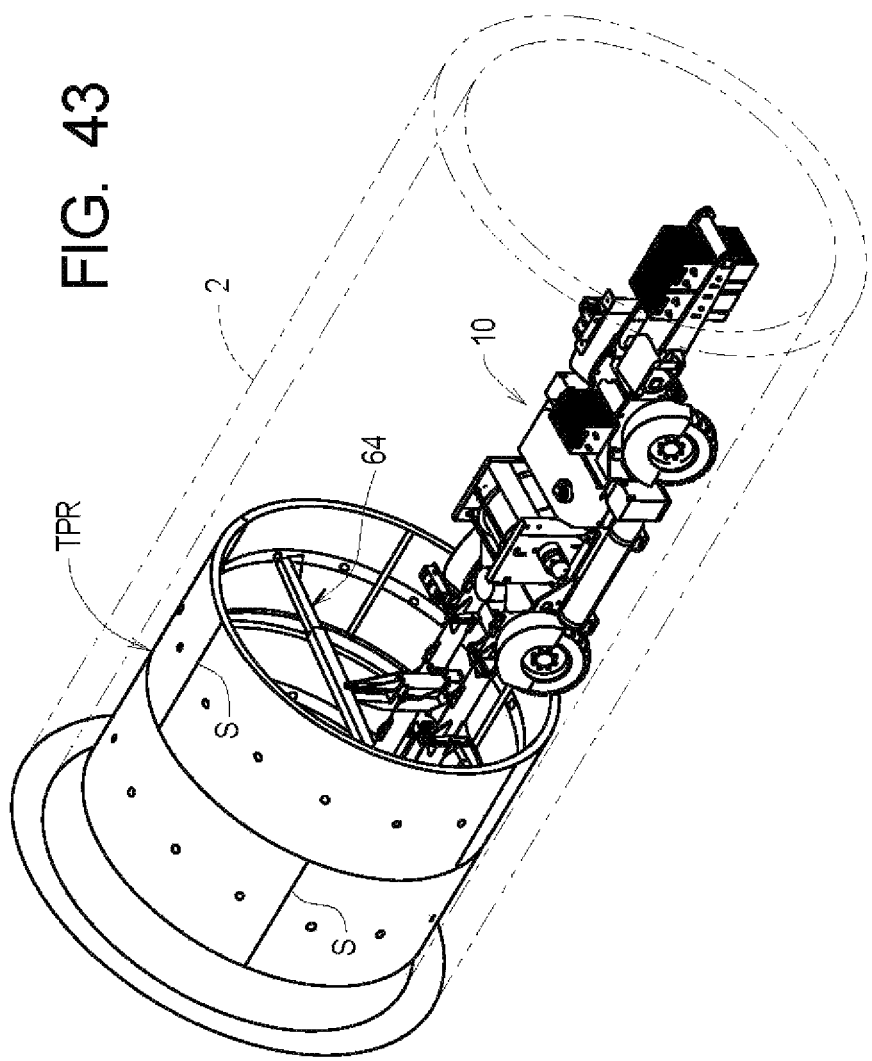
Figure 44:
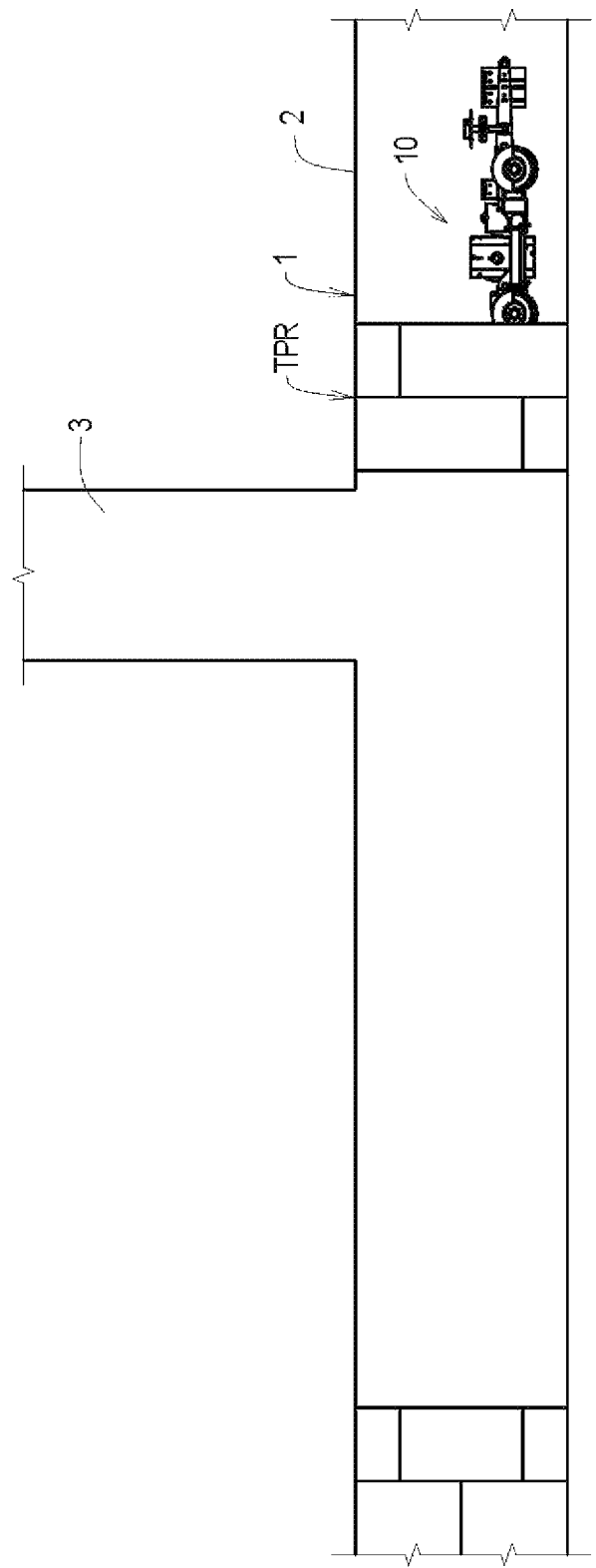

The operator divers displace and manipulate the pipe rings PR1, PR2 so that the pipe rings PR1, PR2 are now aligned end-to-end. The operator diver actuates the connection hydraulic cylinder 114 to linearly move the second pipe ring PR2 towards the first pipe ring PR1 wherein the second pipe ring engages the first pipe ring as shown in FIG. 43. The operator divers connect the second pipe ring PR2 to the first pipe ring PR1 such as with bolted fasteners known in the art. The connected first pipe ring PR1 and second pipe ring PR2 may be referenced as a tandem pipe ring assembly TPR. As described above regarding FIGS. 33-34, it is understood that there is a certain amount of clearance or "play" in the clevis connection members and the pipe rings PR1, PR2. This allows for a limited amount of axial movement of the pipe rings PR1, PR2 to assist in the engagement and suitable connection between adjacent pipe rings PR. Now the carrier assembly 10 supports the first pipe ring PR1 and the second pipe ring PR2 connected together as the tandem pipe ring assembly TPR.

As shown in FIGS. 24-25, the first rotation ratchet member 86 is capable of being disconnected from the first support arm 70. In particular, a distal end eyelet connection is disconnected from the first support arm 70. With such disconnection, the operator diver can use the second rotation ratchet member 106 to rotate the tandem pipe ring assembly TPR wherein the first pipe ring PR1 and the second pipe ring PR2 rotate in unison.

Figure 31:
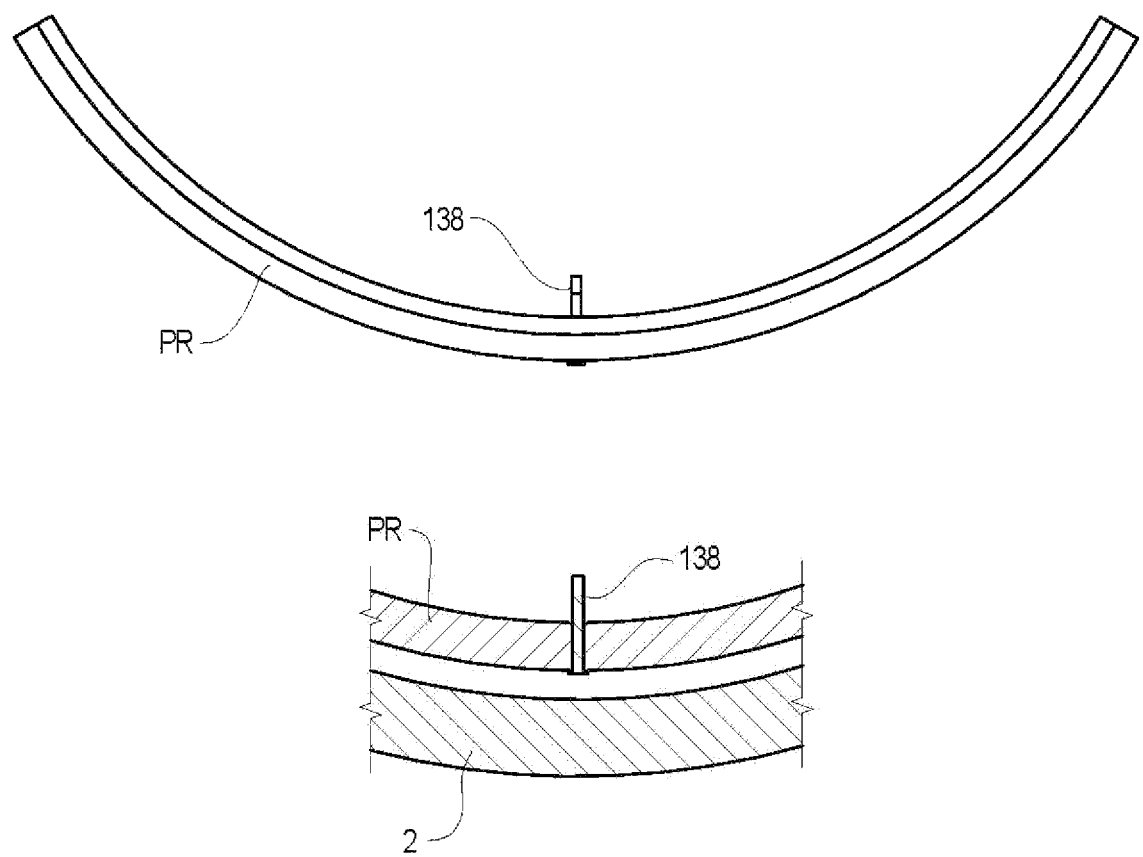
FIGS. 31-32 are partial end views and cross-sectional views showing screw jacks used with pipe rings according to the present invention.
Figure 32:
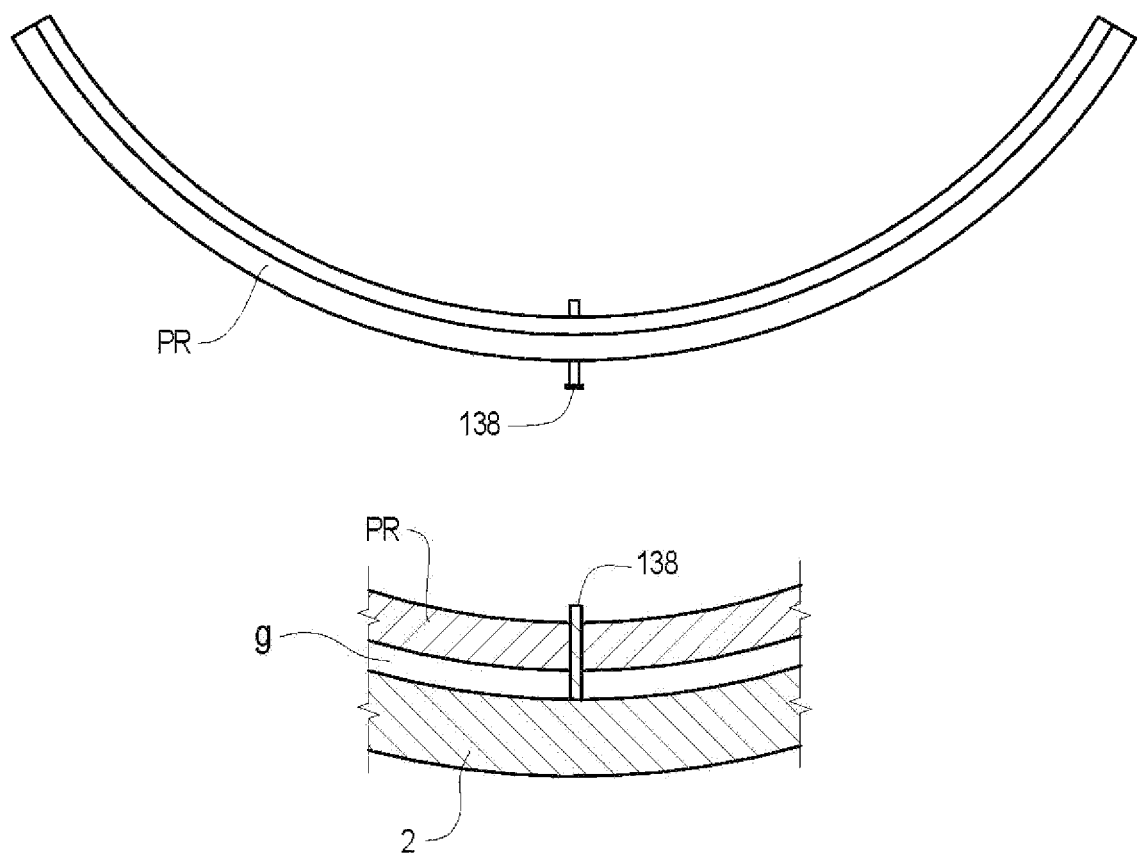

If the tandem pipe ring assembly TPR carried by the carrier assembly 10 is the first tandem pipe ring assembly TPR being installed in repair of the legacy pipe, the operator diver drives the carrier assembly down the legacy pipe 2 to the location for installation of the first tandem pipe ring assembly TPR. As shown in FIGS. 31-32, screw jack devices 138, or jacking bolts 138, are installed on pipe rings PR of the tandem pipe ring unit TPR to assist in centering the pipe ring unit within the legacy pipe 2. A gap "g" is maintained between an inner surface of the legacy pipe 2 and an outer surface of the tandem pipe ring assembly TPR. Thus, the pipe rings PR are circumjacent the legacy pipe, and maintained in spaced relation around a full periphery from the legacy pipe. In an exemplary embodiment, a 4.5 inch gap "g" is maintained although other dimensions are possible. The other movements that the carrier assembly 10 is capable of performing as described above can also be made by the operator divers. Thus, the first and second hydraulic cylinders 76, 96 can be used to raise or lower the tandem pipe ring assembly TPR and the plurality of ratchet members 80, 82, 100, 102 associated with the first and second support arms 70, 90 can be used to laterally adjust the tandem pipe ring assembly TPR. It is also understood that the operator diver can also reposition the carrier assembly 10 laterally via the wheels 52 an additional lateral amount. The operator diver can also use the second rotational ratchet member 106 to rotate the tandem pipe ring assembly TPR unit to a desired angular location. With these movements and displacements, the operator divers generally center the tandem pipe assembly TPR within the legacy pipe.

Figure 45:
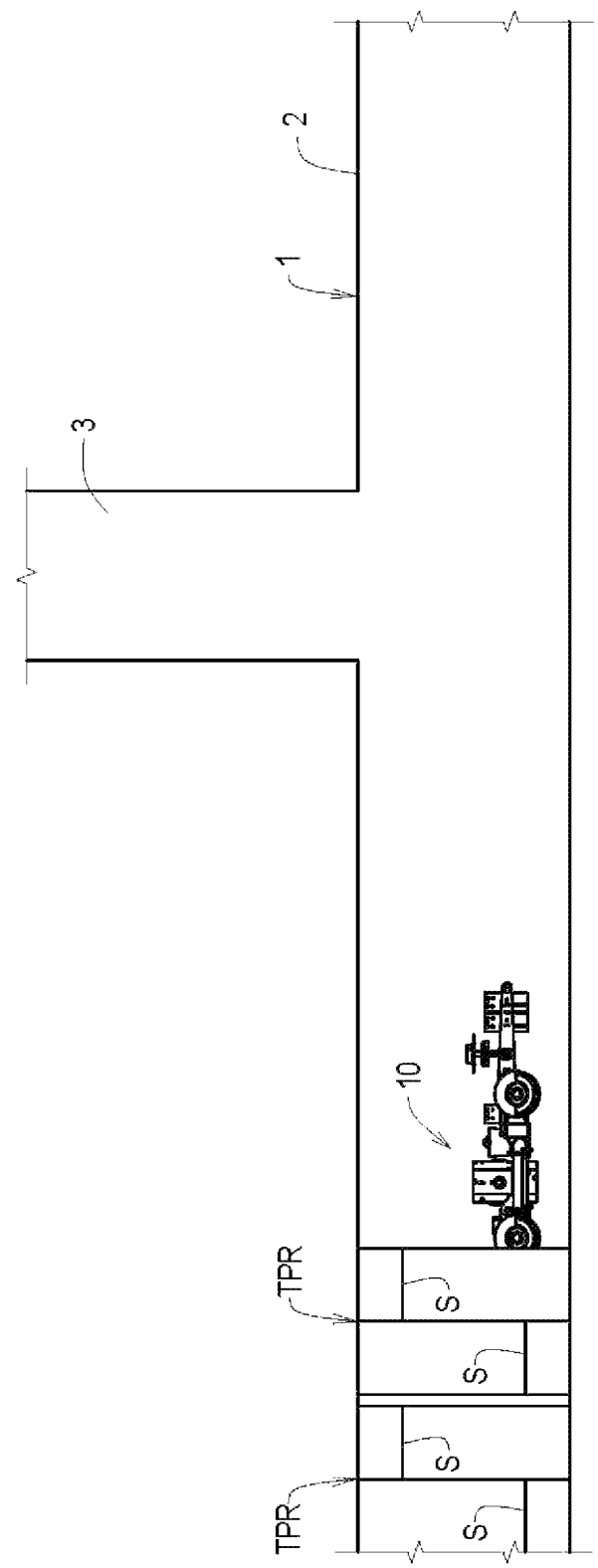
Figure 46:
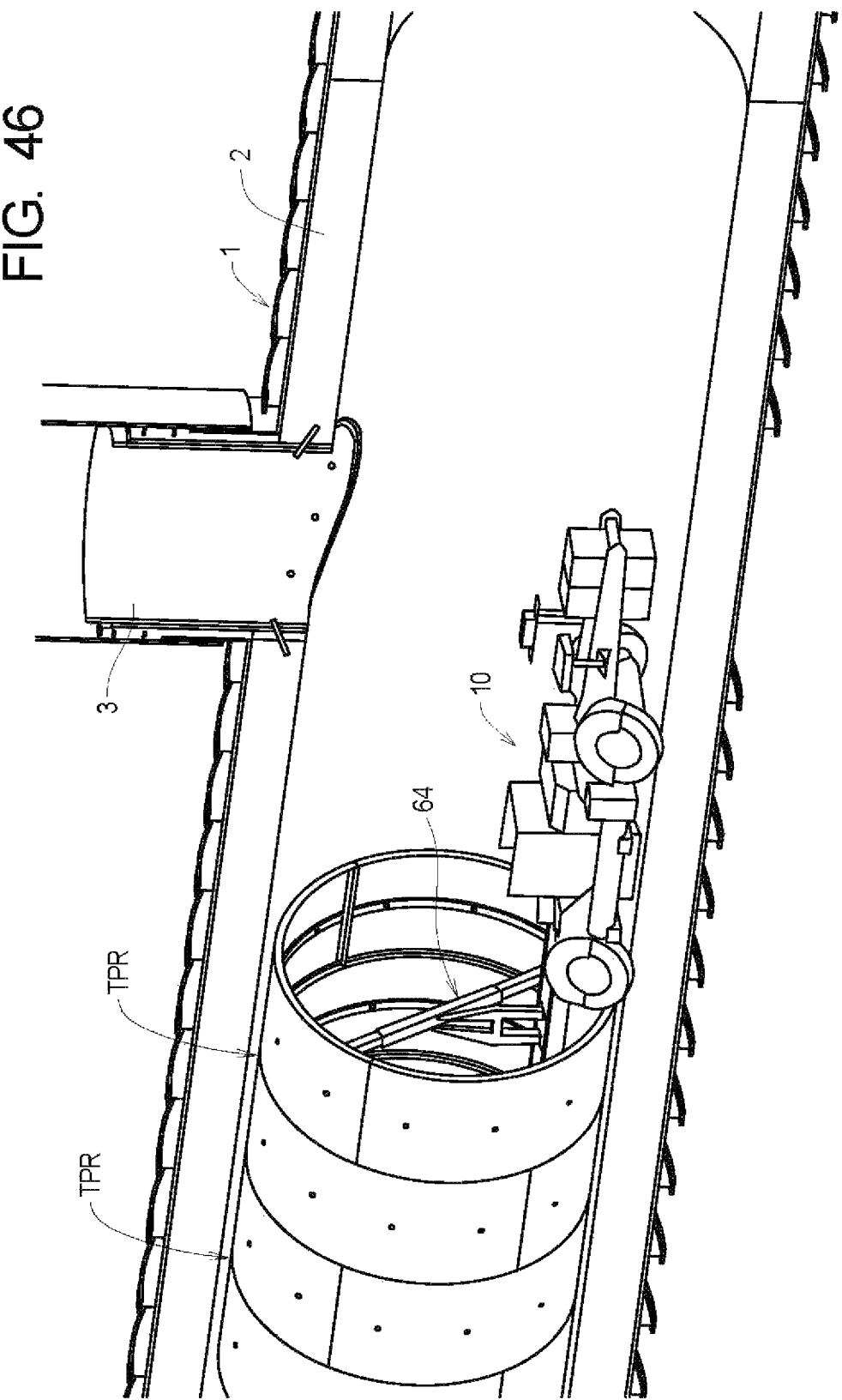
Figure 47:
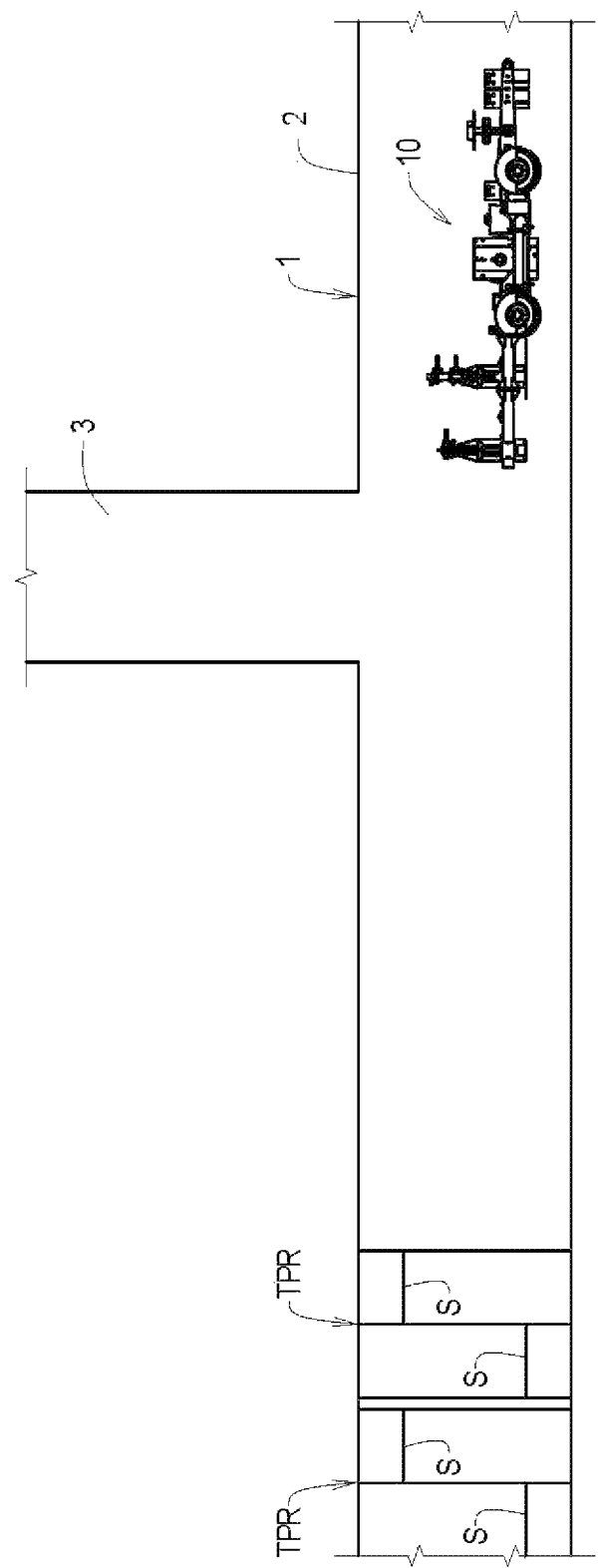

If the tandem pipe ring assembly TPR is an additional tandem pipe ring assembly TPR constructed on the carrier assembly 10, e.g., a second tandem pipe ring assembly TPR, the operator diver drives the carrier assembly 10 down the legacy pipe 2 wherein the second tandem pipe ring assembly TPR is positioned adjacent the previously positioned tandem pipe ring assembly TPR as shown in FIG. 45. As discussed, it is desirable to offset the pipe ring seams S in adjacent connected pipe rings. As can be appreciated from FIG. 45, the operator divers use the second rotation ratchet member 106 to rotate the second tandem pipe ring assembly TPR such that the seams S on the adjacent tandem pipe ring assembly TPR are offset or spaced from the seams S on the tandem pipe ring assembly TPR previously positioned. In an exemplary embodiment, the pipe seams S are angularly spaced 60° apart. Similar to the steps as described above, the operator divers again utilize the movements of the carrier assembly 10 to align the second tandem pipe ring assembly TPR with the previously positioned tandem pipe ring assembly TPR and centered in the legacy pipe 2. It is also understood that the first support arm 70 could be disconnected from the pipe ring wherein the connection hydraulic cylinder 114 could also be actuated to linearly move the tandem pipe ring assembly TPR linearly along the legacy pipe 2 for positioning. The adjacent pipe ring of the previously positioned tandem pipe ring assembly TPR and the pipe ring of the second tandem pipe ring assembly TPR are connected together via fasteners as known in the art such as bolted connections. It is understood that carrier assembly 10 could be configured to move a single pipe ring PR and connect to a previously positioned pipe ring PR in the legacy pipe. Thus, the carrier assembly 10 could install a single pipe ring PR at a time if desired. It is further understood that the support arms 70, 90 can be changed out with support arms 70, 90 having different lengths depending on the size of the pipe rings PR being installed.

The operator divers continue to repeat the above steps in forming a first pipe ring PR1 and a second pipe ring PR2 and connecting the pipe rings together to form additional tandem pipe ring assemblies TPR. The operator divers continue to move and displace and otherwise align the additional tandem pipe ring assemblies TPR via the carrier assembly 10 to the previously positioned tandem pipe ring assemblies TPR as can be appreciated from FIG. 46. As described above, the gap "g" is defined between an inner surface of the legacy pipe 2 and an outer surface of the connected tandem pipe ring assemblies TPR. It is understood that operators fill the gap "g" with grout injected into the gap "g" to provide additional sealing of the water supply system. In further exemplary embodiments, the carrier assembly 10 may be equipped with a grout pump mounted on the chassis assembly 12 for injection of grout. It is understood that the tandem pipe ring assemblies TPR are installed and eventually reach the location of the access port 3. It is understood that additional access ports are formed in the legacy pipe 2 downstream of the location of the first access port 3 as needed depending the length of the legacy pipe requiring repair. It is further understood that the electrical supply cable 130 can then be repositioned to other access ports and reconnected to an electrical power source to continue with pipe repair.

The support arm assemblies 64, 66 disclosed herein are articulatable in a plurality of different directions. In exemplary embodiments, vertically raising and lowering the support arms 70, 90 is achieved via hydraulic cylinders. Lateral movement of the support arms 70, 90 as well as rotation of the support arms 70, 90 are achieved via the ratchet members. It is understood that additional movement mechanisms could be utilized. For example, hydraulics could also be used for the lateral and rotational movements. Other mechanical articulating mechanisms such as scissor-lifts or other mechanical linkages could also be used.

The above description provides a method of a plurality of steps the operator crew completes in preparing the chassis assembly 12 as well completing repair of the legacy pipe 2 of a water supply system 1. It is understood that several exemplary embodiments and features are disclosed and described in the present application. The various exemplary embodiments share certain features and also utilized different features in certain embodiments. It is understood that the various features can be used in various combinations in yet further embodiments. In additional embodiments, a front end attachment can be connected to the chassis assembly 12 and have cleaning mechanisms or dredging features for clearing legacy pipe prior to installation of pipe rings PR.

The carrier assembly 10 of the present invention provides several benefits. The carrier assembly provides a stand-alone unit capable of repairing legacy pipe members in a water supply system. Diver operators are capable of operating the carrier assembly while the water supply system remains operational. Thus, there is no need to shut down the water supply system or portions thereof. The carrier assembly has the ability to manipulate, displace and install pipe rings in multiple directions to install the pipe ring efficiently in the legacy pipe of the water supply system. The carrier assembly is sized to operate within the legacy pipe of the water supply system. The carrier assembly can also be separated into modules and be re-assembled in the legacy pipe. The carrier assembly further allows for additional "play" in the connections to the pipe rings to assist in more efficient installation. The chassis assembly is equipped with hydraulic manifolds to allow for operator divers to attach various tools to assist in installation of the pipe rings. The chassis assembly further stores emergency air sources for the operator divers.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

What is claimed is:

1. A carrier assembly for installing a pipe ring in an existing pipeline to repair the existing pipeline, the carrier assembly comprising:
    a chassis assembly;
    at least one support arm assembly operably connected to the chassis assembly;
    a drive system operably connected to the chassis assembly wherein the chassis assembly is configured to move along the pipeline, and wherein the at least one support arm assembly is configured to engage the pipe ring wherein the at least one support arm assembly is moveable relative to the chassis assembly to displace the pipe ring relative to the chassis assembly for installation in the existing pipeline; wherein
    the at least one support arm assembly comprises a first support arm assembly having a first support arm having a first end and a second end, the first end and the second end configured to engage the pipe ring, the first support arm slidably supported by a first base;
    the first support arm assembly further comprises a first support post assembly operably connected to the chassis assembly, the first support post assembly having a first base post member and a first extendable post member and a first hydraulic cylinder operably connected between the first base post member and the first extendable post member, the first extendable post member connected to the first base, the first hydraulic cylinder operably connected to the drive system to raise and lower the first extendable post member with respect to the first base post member; and
    the first support arm assembly further comprises a first ratchet member operably connected between the first base and proximate the first end of the first support arm, and a second ratchet member operably connected between the first base and proximate the second end of the first support arm, wherein the first ratchet and the second ratchet cooperatively move the first support arm with respect to the first base.

2. The carrier assembly of claim 1 wherein the first base is pivotally connected to the first extendable post member and wherein the first support arm assembly further comprises a first rotational ratchet member operably connected between the first base and the first extendable post member to rotate the first support arm about the first extendable post member.

3. The carrier assembly of claim 2 further comprising a second support arm assembly operably connected to the chassis assembly generally adjacent to the first support arm assembly, the second support arm assembly having a second support arm member having a first end and a second end, the first end and the second end configured to engage a second pipe ring, the second support arm member slidably supported by a second base.

4. The carrier assembly of claim 3 wherein the second support arm assembly further comprises a second support post assembly operably connected to the chassis assembly, the second support post assembly having second base post member and a second extendable post member and a second hydraulic cylinder operably connected between the second base post member and the second extendable post member, the second extendable post member connected to the second base, the second hydraulic cylinder operably connected to the drive system to raise and lower the second extendable post member with respect to the second base post member.

5. The carrier assembly of claim 4 wherein the second support arm assembly further comprises a third ratchet member operably connected between the second base and proximate the first end of the second support arm, and a fourth ratchet member operably connected between the second base and proximate the second end of the second support arm, wherein the third ratchet and the fourth ratchet cooperatively move the second support arm with respect to the second base.

6. The carrier assembly of claim 5 wherein the second base is pivotally connected to the second extendable post member and wherein the second support arm assembly further comprises a second rotational ratchet member operably connected between the second base and the second extendable post member to rotate the second support arm member about the second extendable post member.

7. The carrier assembly of claim 6 wherein the second base post member defines a carriage movably supported on the chassis assembly, and further comprising a third hydraulic cylinder operably connected between the chassis assembly and the carriage to move the second support arm assembly with respect to the first support arm assembly.

8. The carrier assembly of claim 1 wherein the support arm assembly further comprises a second support arm assembly operably connected to the chassis assembly generally adjacent to the first support arm assembly, the second support arm assembly having a second support post assembly operably connected to the chassis assembly, the second support post assembly having a second base post member and a second extendable post member and a second hydraulic cylinder operably connected between the second base post member and the second extendable post member to raise and lower the second extendable post member with respect to the second base post member, and a second support arm having a first end and a second end, the first end and the second configured to engage a second pipe ring, the second support arm slidably supported by a second base, the second base pivotally connected to the second extendable post member, a third ratchet member operably connected between the second base and proximate the first end of the second support arm, and a fourth ratchet member operably connected between the second base and proximate the second end of the second support arm, wherein the third ratchet and the fourth ratchet cooperatively move the second support arm with respect to the second base, a second rotational ratchet member operably connected between the second base and the second extendable post member to rotate the second support arm member about the second extendable post member.

9. The carriage assembly of claim 8 wherein the second base post member defines a carriage movably supported on the chassis assembly, and further comprising a third hydraulic cylinder operably connected between the chassis assembly and the carriage to move the second support arm assembly with respect to the first support arm assembly.

10. The carriage assembly of claim 1 wherein the at least one support arm assembly has a first support arm, the support arm has a detachable adapter configured to engage the pipe ring, and further comprising a connection pin having a length that passes through cooperative openings in the adapter and support arm to be configured to attach to the pipe ring, wherein the length of the connection pin is longer than a width of the support arm, wherein the pipe ring is configured to move linearly with respect to the support arm.

11. The carrier assembly of claim 1 wherein the support arm assembly defines a carriage movably supported on the chassis assembly, and further comprising a connection hydraulic cylinder operably connected to the drive system, the connection hydraulic cylinder operably connected between the chassis assembly and the carriage to move the support arm assembly with respect to the chassis assembly.

12. A carrier assembly for installing a pipe ring in an existing pipeline to repair the existing pipeline, the carrier assembly comprising:
 a chassis assembly;
 a support arm assembly having a support post assembly and a support arm, the support post assembly having a base post member operably connected to an extendable post member, the base post member operably connected to the chassis assembly, and the support arm operably connected to the extendable post member, the support arm having a first end and a second end, the first end and the second end configured to engage the pipe ring; and
 a drive system operably connected to the chassis assembly wherein the chassis assembly is configured to move along the pipeline, and wherein the drive system is operably connected to a hydraulic cylinder, the hydraulic cylinder operably connected between the base post member and the second extendable post member to raise and lower the second extendable post member with respect to the second base post member, wherein the support arm is moveable relative to the chassis assembly to displace the pipe ring relative to the chassis assembly for installation in the existing pipeline; wherein
 the support arm is operably connected to the extendable post member by a base connected to the extendable post member, the support arm slidably supported by the base, and wherein the support arm assembly further comprises a first ratchet member operably connected between the base and proximate the first end of the support arm, and a second ratchet member operably connected between the base and proximate the second end of the second support arm, wherein the first ratchet member and the second ratchet member cooperatively move the support arm with respect to the base.

13. The carrier assembly of claim 12 wherein the base is pivotally connected to the extendable post member and wherein the support arm assembly further comprises a second rotational ratchet member operably connected between the base and the second extendable post member to rotate the support arm about the second extendable post member.

14. The carrier assembly of claim 13 wherein the base post member defines a carriage movably supported on the chassis assembly, and further comprising a connection hydraulic cylinder operably connected to the drive system, the connection hydraulic cylinder operably connected between the chassis assembly and the carriage to move the support arm assembly with respect to the chassis assembly.

15. An underwater carrier assembly for installing a plurality of pipe rings in an existing legacy pipe to repair the legacy pipe, the carrier assembly comprising:
 a chassis assembly having a first elongated frame member and a second elongated frame connected together in spaced relation by at least one cross-member, the chassis assembly having four wheels operably connected thereto configured to move the chassis assembly along the legacy pipe, each wheel angled inwardly towards the elongated frame members, the chassis assembly further having a counterweight member connected proximate distal ends of the frame members;
 a support arm assembly comprising:
 a first support arm assembly operably connected to the chassis assembly, the first support arm assembly having a first support post assembly operably connected to the first elongated frame member and the second elongated frame member,
 the first support post assembly having a first base post member and a first extendable post member and a first hydraulic cylinder operably connected between the first base post member and the first extendable post member to raise and lower the first extendable post member with respect to the first base post member,
 and a first support arm member having a first end and a second end, the first end and the second configured to engage a first pipe ring, the first support arm member slidably supported by a first base, the first base pivotally connected to the first extendable post member, a first ratchet member operably connected between the first base and proximate the first end of the first support arm member, and a second ratchet member operably connected between the first base and proximate the second end of the first support arm member, wherein the first ratchet and the second ratchet cooperatively move the first support arm with respect to the first base, a first rotational ratchet member operably connected between the first base and the first extendable post member to rotate the first support arm member about the first extendable post member, a second support arm assembly operably connected to the chassis assembly generally adjacent to the first support arm assembly, the second support arm assembly having a second support post assembly operably connected to the first elongated frame member and the second elongated frame member, the second support post assembly having second base post member and a second extendable post member and a second hydraulic cylinder operably connected between the second base post member and the second extendable post member to raise and lower the second extendable post member with respect to the second base post member, and a second support arm member having a first end and a second end, the first end and the second configured to engage a second pipe ring, the second support arm member slidably supported by a second base, the second base pivotally connected to the second extendable post member, a third ratchet member operably connected between the second base and proximate the first end of the second support arm member, and a fourth ratchet member operably connected between the second base and proximate the second end of the second support arm member, wherein the third ratchet and the fourth ratchet cooperatively move the second support arm with respect to the second base, a second rotational ratchet member operably connected between the second base and the second extendable post member to rotate the second support arm member about the second extendable post member, the second base post member defining a carriage movably supported on the first elongated frame member and the second elongated frame member, and further comprising a third hydraulic cylinder operably connected between the chassis assembly and the carriage to move the second support arm assembly along the chassis assembly with respect to the first support arm assembly;

a drive system supported by the chassis assembly and operably connected to the chassis assembly and the support arm assembly, the drive system having a hydraulic power unit having a hydraulic pump in fluid communication with a hydraulic fluid reservoir, and further having a plurality of hydraulic fluid lines in fluid communication with the first hydraulic cylinder, the second hydraulic cylinder and the third hydraulic cylinder to extend and retract the hydraulic cylinders, and an electrical power cable operably connected to the hydraulic pump and chassis assembly, the electrical power cable configured to be connected to an electrical power source, wherein a plurality of pipe segments are connected together in the legacy pipe to form a first pipe ring and a second pipe ring wherein the first support arm assembly is configured to engage and displace the first pipe ring relative to the chassis assembly and the second support arm assembly is configured to engage and displace the second pipe ring relative to the chassis assembly, wherein the first pipe ring is connected to the second pipe ring and installed in the legacy pipe.

16. The carrier assembly of claim 15 wherein the first rotational ratchet member is capable of being detached from the first base wherein the second rotational ratchet member is capable of rotating together the first pipe ring connected to the second pipe ring.

* * * * *